US011200666B2

(12) United States Patent
Choi

(10) Patent No.: US 11,200,666 B2
(45) Date of Patent: Dec. 14, 2021

(54) METHOD FOR DIAGNOSING, PREDICTING, DETERMINING PROGNOSIS, MONITORING, OR STAGING DISEASE BASED ON VASCULARIZATION PATTERNS

(71) Applicant: Caroline Choi, Sherman Oaks, CA (US)

(72) Inventor: Caroline Choi, Sherman Oaks, CA (US)

(*) Notice: Subject to any disclaimer, the term of this patent is extended or adjusted under 35 U.S.C. 154(b) by 129 days.

(21) Appl. No.: 16/458,737

(22) Filed: Jul. 1, 2019

(65) Prior Publication Data

US 2020/0013163 A1 Jan. 9, 2020

Related U.S. Application Data

(60) Provisional application No. 62/693,852, filed on Jul. 3, 2018.

(51) Int. Cl.
*G06T 7/00* (2017.01)
*G06N 20/00* (2019.01)

(52) U.S. Cl.
CPC .......... *G06T 7/0012* (2013.01); *G06N 20/00* (2019.01); *G06T 2207/20081* (2013.01); *G06T 2207/30101* (2013.01)

(58) Field of Classification Search
CPC .............. G16H 50/20; G06T 2211/404; G06T 2207/30101; A61B 5/02007; A61B 6/504
See application file for complete search history.

(56) References Cited

U.S. PATENT DOCUMENTS

| | | | |
|---|---|---|---|
| 7,640,051 B2 | 12/2009 | Krishnan et al. | |
| 8,090,164 B2 | 1/2012 | Bullitt et al. | |
| 8,233,681 B2 | 7/2012 | Aylward et al. | |
| 8,787,638 B2 | 7/2014 | Zee et al. | |
| 9,607,130 B2 | 3/2017 | Grady et al. | |
| 9,858,387 B2 | 1/2018 | Lavi et al. | |
| 9,977,869 B2 | 5/2018 | Lavi et al. | |
| 10,064,594 B2 | 9/2018 | Madabhushi et al. | |
| 10,235,756 B2 | 3/2019 | Brauner et al. | |
| 2018/0220984 A1 | 8/2018 | Brauner et al. | |
| 2018/0242906 A1* | 8/2018 | Madabhushi | G06T 7/337 |
| 2018/0253531 A1* | 9/2018 | Sharma | G06K 9/6282 |

OTHER PUBLICATIONS

Definition and Evaluation of Transient Ischemic Attack. (2009). American Stroke Association. doi:https://doi.org/10.1161/STROKEAHA.108.192218.

(Continued)

*Primary Examiner* — Vincent Rudolph
*Assistant Examiner* — Raphael Schwartz
(74) *Attorney, Agent, or Firm* — Trojan Law Offices

(57) ABSTRACT

Methods, computer programs, and systems for detecting disease in vasculature. The method includes obtaining images of the vasculature. The method includes extracting vessel measurements from the obtained images. The method includes determining features of the vasculature in the obtained images based on the extracted vessel measurements. The method includes applying artificial intelligence algorithms to determine if the disease is present in the vasculature based on these vascular features.

8 Claims, 78 Drawing Sheets

(56) References Cited

OTHER PUBLICATIONS

Kim, A. S., & Johnston, S. C. (2013). Temporal and Geographic Trends in the Global Stroke Epidemic. Stroke,44(6, Supplement 1). doi:10.1161/strokeaha.111.000067.

Li, W., & Wang, Y. (2017). Angiogenesis and Neurogenesis After Ischemic Stroke. Translational Medicine Research Translational Research in Stroke,297-317. doi:10.1007/978-981-10-5804-2_14.

Logistic Regression. (n.d.). Retrieved from http://ufldl.stanford.edu/tutorial/supervised/LogisticRegression/.

Naïve Bayes classifier. (2015). Data Mining Algorithms,118-133. doi:10.1002/9781118950951.ch4.

Newberry, M. G., Ennis, D. B., & Savage, V. M. (2015). Testing Foundations of Biological Scaling Theory Using Automated Measurements of Vascular Networks. PLOS Computational Biology,11(8). doi:10.1371/journal.pcbi.1004455.

TIA (Transient Ischemic Attack). (n.d.). Retrieved from http://www.strokeassociation.org/STROKEORG/AboutStroke/TypesofStroke/TIA/Transient-Ischemic-Attack-TIA_UCM_492003_SubHomePage.jsp.

Tyan, Y., Wu, M., Chin, C., Kuo, Y., Lee, M., & Chang, H. (2014). Ischemic Stroke Detection System with a Computer-Aided Diagnostic Ability Using an Unsupervised Feature Perception Enhancement Method. International Journal of Biomedical Imaging,2014, 1-12. doi:10.1155/2014/947539.

"Why Is Early Diagnosis Important?" Cancer Research UK, www.cancerresearchuk.org/about-cancer/cancer-symptoms/why-is-early-diagnosis-important.

Nishida, Naoyo et al. "Angiogenesis in Cancer." Vascular Health and Risk Management 2.3 (2006): 213-219. Print.

Siemann, Dietmar W. "The Unique Characteristics of Tumor Vasculature and Preclinical Evidence for Its Selective Disruption by Tumor-Vascular Disrupting Agents." Cancer treatment reviews 37.1 (2011): 63-74. PMC. Web. Nov. 30, 2017.

Savage VM, Deeds EJ, Fontana W (2008) Sizing Up Allometric Scaling Theory. PLoS Computational Biology 4 (9): e1000171. doi:10.1371/journal.pcbi.10001717.s005.

* cited by examiner

| Data Set | Logistic Regression Test Accuracies | Naïve Bayes Classifier Test Accuracies |
|---|---|---|
| Average Distribution-Based Scaling Exponent *b* vs. Average Distribution-Based Scaling Exponent *a* | 75.0% | 50.0% |
| Average Regression-Based Scaling Exponent *b* vs. Average Regression-Based Scaling Exponent *a* | 75.0% | 75.0% |
| Average Local Scaling Exponent vs. Average Network Scaling Exponent | 75.0% | 50.0% |
| Average and Median Conservation-Based Scaling Exponent *b* vs. Average and Median Conservation-Based Scaling Exponent *a* | 62.5% | 62.5% |
| Average and Median Ratio-Based Scaling Exponent *b* vs. Average and Median Ratio-Based Scaling Exponent *a* | 62.5% | 62.5% |
| Average and Median HA-Based Scaling Exponent *b* vs. Average and Median HA-Based Scaling Exponent *a* | 75.0% | 62.5% |
| Average Ratio of Radius to Length vs. Average Number of Tips | 85.7% | 50.0% |
| Average Ratio of Radius to Length vs. Average Number of Vessel Children | 75.0% | 62.5% |
| Average Radius vs. Average Length | 85.7% | 62.5% |

FIG. 7

Sample Output Angicart++ Data Files (1)

| name | vol(cu.µm) | len(µm) | <r>_vl(µm) | <r>_obs(µm) | par | num_child | children... | | |
|---|---|---|---|---|---|---|---|---|---|
| 104.1 | 38.663 | 7.73881 | 1.26106 | 2.04292 | N/A | 2 | 75.1 | 103.1 | |
| 75.1 | 13.8682 | 3.21851 | 1.17114 | 1.7653 | 104.1 | 2 | 50.1 | 76.1 | |
| 50.1 | 49.5335 | 27.1688 | 0.761796 | 0.965983 | 75.1 | 2 | 51.1 | 30.1 | |
| 51.1 | 35.8613 | 14.9241 | 0.874571 | 1.33058 | 50.1 | 0 | | | |
| 30.1 | 7.14425 | 1.05661 | 1.46706 | 1.78157 | 50.1 | 2 | 31.1 | 19.1 | |
| 31.1 | 4.79085 | 2.26564 | 0.82042 | 0.780455 | 30.1 | 0 | | | |
| 19.1 | 17.1462 | 8.61558 | 0.795915 | 1.04664 | 30.1 | 2 | 20.1 | 12.1 | |
| 20.1 | 33.1017 | 12.2999 | 0.925548 | 1.15013 | 19.1 | 2 | 32.1 | 33.1 | |
| 32.1 | 58.0785 | 15.3193 | 1.09854 | 1.66572 | 20.1 | 0 | | | |
| 33.1 | 145.252 | 47.1223 | 0.990543 | 1.53064 | 20.1 | 0 | | | |
| 12.1 | 167.68 | 31.123 | 1.30956 | 1.98296 | 19.1 | 2 | 11.1 | 6.1 | |
| 11.1 | 1.0086 | 0.22 | 1.20802 | 0 | 12.1 | 2 | 17.1 | 18.1 | |
| 17.1 | 55.2489 | 14.9546 | 1.08443 | 1.3028 | 11.1 | 3 | 25.1 | 26.1 | 27.1 |
| 25.1 | 29.4455 | 11.773 | 0.89226 | 1.62477 | 17.1 | 2 | 40.1 | 41.1 | |
| 40.1 | 14.4706 | 4.79109 | 0.980508 | 1.5473 | 25.1 | 2 | 61.1 | 62.1 | |
| 61.1 | 17.4404 | 7.02186 | 0.889154 | 0.839664 | 40.1 | 2 | 89.1 | 90.1 | |
| 89.1 | 10.0019 | 5.0319 | 0.795429 | 1.1792 | 61.1 | 2 | 110.1 | 111.1 | |
| 110.1 | 1.09265 | 1.29321 | 0.518598 | 0.381771 | 89.1 | 0 | | | |
| 111.1 | 26.3917 | 13.8267 | 0.779471 | 0.864699 | 89.1 | 2 | 127.1 | 128.1 | |
| 127.1 | 38.5789 | 10.9799 | 1.05755 | 1.52813 | 111.1 | 0 | | | |
| 128.1 | 29.7957 | 7.80639 | 1.10224 | 1.46869 | 111.1 | 2 | 143.1 | 145.1 | |
| 143.1 | 9.62372 | 1.53127 | 1.41439 | 2.08361 | 128.1 | 2 | 144.1 | 125.1 | |
| 144.1 | 38.1587 | 12.2505 | 0.995737 | 1.55659 | 143.1 | 0 | | | |
| 125.1 | 17.9026 | 2.74529 | 1.44075 | 1.97648 | 143.1 | 2 | 105.1 | 126.1 | |
| 105.1 | 18.2388 | 3.86868 | 1.22502 | 1.39752 | 125.1 | 2 | 80.1 | 106.1 | |
| 80.1 | 28.2408 | 5.73673 | 1.25179 | 1.70711 | 105.1 | 2 | 81.1 | 54.1 | |
| 81.1 | 23.1137 | 5.67788 | 1.13833 | 1.28006 | 80.1 | 2 | 107.1 | 108.1 | |
| 107.1 | 18.9953 | 12.1135 | 0.706503 | 0.732079 | 81.1 | 0 | | | |
| 108.1 | 18.491 | 8.16994 | 0.848781 | 1.26979 | 81.1 | 0 | | | |
| 54.1 | 48.5529 | 5.23818 | 1.71768 | 2.21188 | 80.1 | 2 | 35.1 | 55.1 | |
| 35.1 | 65.7551 | 7.43334 | 1.67802 | 2.0335 | 54.1 | 2 | 34.1 | 21.1 | |
| 34.1 | 77.7561 | 15.7744 | 1.25261 | 1.94196 | 35.1 | 2 | 52.1 | 53.1 | |
| 52.1 | 29.2536 | 7.11397 | 1.14409 | 1.96573 | 34.1 | 2 | 77.1 | 57.1 | |
| 77.1 | 21.839 | 5.82449 | 1.09248 | 1.67073 | 52.1 | 2 | 88.1 | 60.1 | |
| 88.1 | 3.61415 | 2.03127 | 0.752565 | 0.622164 | 77.1 | 0 | | | |
| 60.1 | 4.8749 | 1.75546 | 0.940182 | 1.11239 | 77.1 | 2 | 38.1 | 44.1 | |

FIG. 11A

| name | vol(cu.μm) | len(μm) | <r>_vl(μm) | <r>_obs(μm) | par | num_child | children... | |
|---|---|---|---|---|---|---|---|---|
| 38.1 | 15.0449 | 4.85352 | 0.993327 | 1.31858 | 60.1 | 2 | 23.1 | 39.1 |
| 23.1 | 32.6114 | 12.8565 | 0.898562 | 1.42282 | 38.1 | 2 | 24.1 | 15.1 |
| 24.1 | 7.48045 | 3.94352 | 0.777047 | 0.955821 | 23.1 | 0 | | |
| 15.1 | 18.4069 | 6.56043 | 0.945039 | 1.33701 | 23.1 | 2 | 16.1 | 8.1 |
| 16.1 | 2.77365 | 1.79321 | 0.701673 | 0.545095 | 15.1 | 0 | | |
| 8.1 | 74.8465 | 17.1917 | 1.1772 | 2.39182 | 15.1 | 2 | 7.1 | 3.1 |
| 7.1 | 2.1853 | 0.22 | 1.77815 | 1.22931 | 8.1 | 2 | 13.1 | 14.1 |
| 13.1 | 186.885 | 45.2789 | 1.14621 | 2.07506 | 7.1 | 1 | 22.1 | |
| 22.1 | 87.6221 | 19.2192 | 1.20466 | 2.03495 | 13.1 | 2 | 36.1 | 37.1 |
| 36.1 | 32.1631 | 11.5141 | 0.942953 | 1.35761 | 22.1 | 1 | 56.1 | |
| 56.1 | 29.1233 | 5.29691 | 1.32292 | 1.63519 | 36.1 | 2 | 82.1 | 83.1 |
| 82.1 | 32.3592 | 12.6286 | 0.903123 | 1.06371 | 56.1 | 0 | | |
| 83.1 | 122.083 | 31.6572 | 1.10794 | 1.486 | 56.1 | 2 | 87.1 | 109.1 |
| 87.1 | 45.6391 | 15.683 | 0.962453 | 1.30339 | 83.1 | 2 | 59.1 | 86.1 |
| 59.1 | 35.6792 | 14.6991 | 0.878997 | 0.908846 | 87.1 | 1 | 58.1 | |
| 58.1 | 23.9683 | 5.17058 | 1.21471 | 1.69646 | 59.1 | 2 | 84.1 | 85.1 |
| 84.1 | 87.6081 | 29.1977 | 0.977288 | 1.21086 | 58.1 | 0 | | |
| 85.1 | 141.12 | 38.499 | 1.08018 | 1.46974 | 58.1 | 0 | | |
| 86.1 | 7.64855 | 1.92529 | 1.12452 | 1.08357 | 87.1 | 0 | | |
| 109.1 | 2.64757 | 2.87 | 0.541886 | 0.422257 | 83.1 | 0 | | |
| 37.1 | 135.601 | 39.3415 | 1.04744 | 1.31493 | 22.1 | 0 | | |
| 14.1 | 67.8704 | 14.4638 | 1.22215 | 1.46763 | 7.1 | 0 | | |
| 3.1 | 242.4 | 65.6446 | 1.08416 | 1.58141 | 8.1 | 2 | 4.1 | 1.1 |
| 4.1 | 2.5215 | 1.63643 | 0.700334 | 0.613062 | 3.1 | 0 | | |
| 1.1 | 3.61415 | 1.26564 | 0.953397 | 1.00985 | 3.1 | 2 | 2.1 | 0.1 |
| 2.1 | 29.9078 | 6.55885 | 1.20477 | 2.0172 | 1.1 | 1 | 5.1 | |
| 5.1 | 155.507 | 27.7534 | 1.33549 | 2.09422 | 2.1 | 2 | 9.1 | 10.1 |
| 9.1 | 28.3669 | 13.4109 | 0.820544 | 0.894728 | 5.1 | 0 | | |
| 10.1 | 100.398 | 26.6201 | 1.09568 | 1.72185 | 5.1 | 0 | | |
| 0.1 | 83.9239 | 24.4314 | 1.04567 | 1.612 | 1.1 | 0 | | |
| 39.1 | 7.7326 | 5.29109 | 0.682048 | 0.880529 | 38.1 | 0 | | |
| 44.1 | 59.6055 | 13.493 | 1.18581 | 1.52157 | 60.1 | 1 | 45.1 | |
| 45.1 | 58.3447 | 13.7266 | 1.16317 | 1.48363 | 44.1 | 2 | 65.1 | 66.1 |
| 65.1 | 61.0063 | 22.9531 | 0.919797 | 1.23819 | 45.1 | 0 | | |
| 66.1 | 4.11845 | 1.91224 | 0.827981 | 0.84363 | 45.1 | 0 | | |
| 57.1 | 86.7396 | 22.2326 | 1.11439 | 1.57422 | 52.1 | 0 | | |
| 53.1 | 135.152 | 57.0217 | 0.868594 | 1.36473 | 34.1 | 2 | 78.1 | 79.1 |
| 78.1 | 2.47947 | 1.91224 | 0.642441 | 0.604085 | 53.1 | 0 | | |

FIG. 11B

| name | vol(cu.μm) | len(μm) | <r>_vl(μm) | <r>_obs(μm) | par | num_child | children... | |
|---|---|---|---|---|---|---|---|---|
| 79.1 | 35.343 | 14.4125 | 0.883502 | 0.970478 | 53.1 | 0 | | |
| 21.1 | 56.0613 | 5.60753 | 1.7839 | 2.19066 | 35.1 | 0 | | |
| 55.1 | 58.905 | 16.6729 | 1.06046 | 1.20256 | 54.1 | 0 | | |
| 106.1 | 26.3076 | 11.268 | 0.86207 | 1.25715 | 105.1 | 0 | | |
| 126.1 | 12.3553 | 3.03127 | 1.13904 | 1.00036 | 125.1 | 0 | | |
| 145.1 | 10.8424 | 2.70691 | 1.12915 | 1.10265 | 128.1 | 0 | | |
| 90.1 | 8.5731 | 3.58643 | 0.872294 | 1.04459 | 61.1 | 0 | | |
| 62.1 | 13.7842 | 4.84982 | 0.951159 | 1.41427 | 40.1 | 0 | | |
| 41.1 | 1.48488 | 0.765637 | 0.785705 | 1.07771 | 25.1 | 0 | | |
| 26.1 | 39.7556 | 15.2986 | 0.909492 | 1.42632 | 17.1 | 2 | 42.1 | 43.1 |
| 42.1 | 30.3 | 21.5328 | 0.669262 | 0.680019 | 26.1 | 2 | 63.1 | 64.1 |
| 63.1 | 3.50208 | 1.97966 | 0.750401 | 0.929231 | 42.1 | 2 | 91.1 | 92.1 |
| 91.1 | 9.99635 | 5.60816 | 0.753244 | 0.86964 | 63.1 | 0 | | |
| 92.1 | 4.61434 | 1.75546 | 0.914711 | 1.12127 | 63.1 | 2 | 112.1 | 113.1 |
| 112.1 | 4.79085 | 3.79321 | 0.634056 | 0.551035 | 92.1 | 0 | | |
| 113.1 | 27.9466 | 27.167 | 0.572228 | 0.73587 | 92.1 | 0 | | |
| 64.1 | 2.26935 | 2.34982 | 0.554445 | 0.694388 | 42.1 | 0 | | |
| 43.1 | 16.5999 | 5.05885 | 1.022 | 0.988962 | 26.1 | 0 | | |
| 27.1 | 56.6497 | 6.30639 | 1.69096 | 2.36736 | 17.1 | 0 | | |
| 18.1 | 44.9667 | 6.58431 | 1.4744 | 2.14369 | 11.1 | 2 | 28.1 | 29.1 |
| 28.1 | 55.0948 | 10.3811 | 1.29975 | 2.04758 | 18.1 | 2 | 46.1 | 47.1 |
| 46.1 | 29.3334 | 6.5422 | 1.19466 | 2.09858 | 28.1 | 2 | 67.1 | 68.1 |
| 67.1 | 34.2924 | 13.4654 | 0.900356 | 1.11834 | 46.1 | 2 | 93.1 | 94.1 |
| 93.1 | 13.392 | 6.87316 | 0.787533 | 1.26424 | 67.1 | 2 | 114.1 | 115.1 |
| 114.1 | 3.08183 | 2.44127 | 0.633901 | 0.677704 | 93.1 | 0 | | |
| 115.1 | 16.7259 | 5.34915 | 0.997649 | 1.57093 | 93.1 | 2 | 129.1 | 130.1 |
| 129.1 | 11.3467 | 7.42528 | 0.697436 | 0.939705 | 115.1 | 0 | | |
| 130.1 | 33.2838 | 12.9632 | 0.904037 | 1.19214 | 115.1 | 0 | | |
| 94.1 | 13.1958 | 13.5617 | 0.556528 | 0.513303 | 67.1 | 0 | | |
| 68.1 | 32.8635 | 7.01829 | 1.22086 | 1.66494 | 46.1 | 2 | 95.1 | 96.1 |
| 95.1 | 0.8405 | 0.22 | 1.10276 | 0 | 68.1 | 2 | 116.1 | 117.1 |
| 116.1 | 17.7626 | 4.1111 | 1.17273 | 1.17735 | 95.1 | 2 | 131.1 | 132.1 |
| 131.1 | 31.939 | 11.0901 | 0.957453 | 1.29403 | 116.1 | 0 | | |
| 132.1 | 17.9867 | 4.23449 | 1.16279 | 1.38457 | 116.1 | 2 | 146.1 | 147.1 |
| 146.1 | 111.534 | 16.1439 | 1.48294 | 2.22556 | 132.1 | 2 | 151.1 | 152.1 |
| 151.1 | 70.9942 | 26.1849 | 0.928991 | 1.43192 | 146.1 | 0 | | |
| 152.1 | 86.5715 | 26.5155 | 1.01944 | 1.27742 | 146.1 | 0 | | |
| 147.1 | 44.7426 | 19.0011 | 0.865757 | 1.28483 | 132.1 | 2 | 153.1 | 154.1 |

FIG. 11C

| name | vol(cu.µm) | len(µm) | <r>_vl(µm) | <r>_obs(µm) | par | num_child | children... | |
|---|---|---|---|---|---|---|---|---|
| 153.1 | 5.16907 | 1.94127 | 0.920636 | 1.0213 | 147.1 | 0 | | |
| 154.1 | 67.8704 | 29.0042 | 0.863048 | 1.05155 | 147.1 | 2 | 159.1 | 160.1 |
| 159.1 | 150.604 | 37.3555 | 1.13283 | 2.37698 | 154.1 | 2 | 161.1 | 162.1 |
| 161.1 | 24.1083 | 13.336 | 0.758569 | 0.929117 | 159.1 | 0 | | |
| 162.1 | 3.89432 | 1.34546 | 0.959853 | 0.898816 | 159.1 | 0 | | |
| 160.1 | 13.9523 | 6.43335 | 0.830863 | 0.919913 | 154.1 | 0 | | |
| 117.1 | 16.1166 | 4.05885 | 1.12424 | 1.32587 | 95.1 | 2 | 133.1 | 134.1 |
| 133.1 | 85.8991 | 25.0976 | 1.04377 | 2.21522 | 117.1 | 2 | 148.1 | 138.1 |
| 148.1 | 5.63135 | 2.94352 | 0.780365 | 0.702852 | 133.1 | 2 | 155.1 | 156.1 |
| 155.1 | 8.02677 | 4.29691 | 0.771112 | 0.74231 | 148.1 | 0 | | |
| 156.1 | 3.27795 | 1.17564 | 0.942084 | 1.00863 | 148.1 | 0 | | |
| 138.1 | 90.0175 | 25.4582 | 1.0609 | 1.95079 | 133.1 | 2 | 137.1 | 121.1 |
| 137.1 | 4.95895 | 2.46885 | 0.7996 | 1.00663 | 138.1 | 0 | | |
| 121.1 | 25.6773 | 6.74898 | 1.10048 | 1.65655 | 138.1 | 2 | 120.1 | 99.1 |
| 120.1 | 48.3287 | 16.5059 | 0.965403 | 1.33003 | 121.1 | 0 | | |
| 99.1 | 3.5301 | 0.765637 | 1.21145 | 0 | 121.1 | 2 | 100.1 | 72.1 |
| 100.1 | 37.9486 | 14.7201 | 0.905874 | 1.06697 | 99.1 | 0 | | |
| 72.1 | 45.8213 | 12.2207 | 1.09247 | 1.71555 | 99.1 | 2 | 71.1 | 48.1 |
| 71.1 | 17.3983 | 6.20123 | 0.945019 | 1.0389 | 72.1 | 0 | | |
| 48.1 | 20.7043 | 3.90495 | 1.29912 | 1.781 | 72.1 | 1 | 49.1 | |
| 49.1 | 26.2236 | 3.91224 | 1.46069 | 1.90138 | 48.1 | 2 | 73.1 | 74.1 |
| 73.1 | 37.1921 | 5.19528 | 1.50954 | 2.15587 | 49.1 | 2 | 101.1 | 102.1 |
| 101.1 | 48.9591 | 10.6889 | 1.20747 | 1.83499 | 73.1 | 2 | 122.1 | 123.1 |
| 122.1 | 21.2226 | 6.14736 | 1.04829 | 1.50167 | 101.1 | 2 | 139.1 | 140.1 |
| 139.1 | 6.97615 | 3.26564 | 0.824611 | 1.1668 | 122.1 | 0 | | |
| 140.1 | 125.361 | 36.4589 | 1.04617 | 1.46667 | 122.1 | 0 | | |
| 123.1 | 51.9429 | 12.6364 | 1.14387 | 1.73571 | 101.1 | 1 | 124.1 | |
| 124.1 | 40.7502 | 7.44784 | 1.3197 | 2.03091 | 123.1 | 2 | 141.1 | 142.1 |
| 141.1 | 61.5526 | 16.3376 | 1.0951 | 1.77335 | 124.1 | 0 | | |
| 142.1 | 8.51707 | 3.29321 | 0.907319 | 1.04757 | 124.1 | 0 | | |
| 102.1 | 35.301 | 15.3199 | 0.856428 | 0.997966 | 73.1 | 0 | | |
| 74.1 | 58.4147 | 21.4079 | 0.931964 | 1.04128 | 49.1 | 0 | | |
| 134.1 | 56.3975 | 10.4081 | 1.31332 | 1.81619 | 117.1 | 2 | 149.1 | 150.1 |
| 149.1 | 79.2171 | 27.8792 | 0.951031 | 1.23305 | 134.1 | 0 | | |
| 150.1 | 18.491 | 2.99788 | 1.40119 | 2.33351 | 134.1 | 2 | 157.1 | 158.1 |
| 157.1 | 68.2066 | 25.2447 | 0.92737 | 1.27758 | 150.1 | 0 | | |
| 158.1 | 42.025 | 11.2998 | 1.08804 | 1.71159 | 150.1 | 0 | | |
| 96.1 | 29.1583 | 5.6214 | 1.28494 | 1.21149 | 68.1 | 0 | | |

FIG. 11D

| name | vol(cu.μm) | len(μm) | <r>_vl(μm) | <r>_obs(μm) | par | num_child | children... | |
|---|---|---|---|---|---|---|---|---|
| 47.1 | 37.8785 | 7.44203 | 1.27285 | 1.78671 | 28.1 | 2 | 69.1 | 70.1 |
| 69.1 | 75.4629 | 18.1991 | 1.14886 | 1.41664 | 47.1 | 0 | | |
| 70.1 | 19.7097 | 6.15685 | 1.00945 | 1.3519 | 47.1 | 2 | 97.1 | 98.1 |
| 97.1 | 52.6573 | 12.0313 | 1.18031 | 1.7014 | 70.1 | 2 | 118.1 | 119.1 |
| 118.1 | 58.2046 | 23.9016 | 0.88042 | 1.23667 | 97.1 | 2 | 135.1 | 136.1 |
| 135.1 | 8.61512 | 5.67788 | 0.694965 | 0.720148 | 118.1 | 0 | | |
| 136.1 | 24.0383 | 9.5241 | 0.896324 | 1.27988 | 118.1 | 0 | | |
| 119.1 | 70.8541 | 20.2986 | 1.05408 | 1.65707 | 97.1 | 0 | | |
| 98.1 | 23.1137 | 6.67788 | 1.04964 | 0.902834 | 70.1 | 0 | | |
| 29.1 | 65.7271 | 9.47109 | 1.48627 | 1.69942 | 18.1 | 0 | | |
| 6.1 | 115.989 | 22.5859 | 1.27854 | 1.49202 | 12.1 | 0 | | |
| 76.1 | 68.3326 | 24.5235 | 0.941776 | 1.1252 | 75.1 | 0 | | |
| 103.1 | 69.6354 | 17.7791 | 1.11657 | 1.63126 | 104.1 | 0 | | |
| 2.2 | 17.1602 | 7.45868 | 0.855767 | 1.48647 | N/A | 2 | 0.2 | 1.2 |
| 0.2 | 15.6193 | 10.9443 | 0.674004 | 0.722152 | 2.2 | 0 | | |
| 1.2 | 4.23052 | 2.40207 | 0.748736 | 0.685478 | 2.2 | 2 | 3.2 | 4.2 |
| 3.2 | 14.6667 | 7.67788 | 0.779778 | 0.744001 | 1.2 | 0 | | |
| 4.2 | 15.3111 | 12.1952 | 0.63217 | 0.770952 | 1.2 | 0 | | |
| 2.3 | 45.2609 | 12.4456 | 1.07592 | 1.55635 | N/A | 2 | 0.3 | 1.3 |
| 0.3 | 26.98 | 11.5255 | 0.863209 | 1.04941 | 2.3 | 0 | | |
| 1.3 | 2.39542 | 0.646607 | 1.08592 | 1.09364 | 2.3 | 0 | | |
| 2.4 | 88.1684 | 32.7872 | 0.925187 | 1.14305 | N/A | 2 | 0.4 | 1.4 |
| 0.4 | 60.6981 | 22.9946 | 0.916643 | 1.03858 | 2.4 | 0 | | |
| 1.4 | 6.03759 | 2.17788 | 0.939377 | 0.863525 | 2.4 | 0 | | |
| 0.5 | 5.043 | 2.67788 | 0.774237 | 0.946991 | N/A | 2 | 1.5 | 2.5 |
| 1.5 | 5.79945 | 3.17788 | 0.762166 | 0.881575 | 0.5 | 0 | | |
| 2.5 | 10.8424 | 11.0814 | 0.558074 | 0.713829 | 0.5 | 0 | | |
| 0.6 | 96.9096 | 5.34625 | 2.40206 | 4.79019 | N/A | 0 | | |
| 0.7 | 55.9773 | 9.92752 | 1.33971 | 2.42559 | N/A | 0 | | |
| 0.8 | 62.197 | 12.8717 | 1.2402 | 1.87063 | N/A | 0 | | |

FIG. 11E

Sample Output Angicart++ Data Files (2)

| name | vol(cu.μm) | len(μm) | <r>_vl(μm) | <r>_obs(μm) | par | num_child | children... | |
|---|---|---|---|---|---|---|---|---|
| 128.1 | 88.2945 | 29.2232 | 0.980682 | 1.62505 | N/A | 2 | 127.1 | 112.1 |
| 127.1 | 16.9221 | 4.10093 | 1.14607 | 1.39834 | 128.1 | 2 | 141.1 | 142.1 |
| 141.1 | 2.95576 | 2.34982 | 0.632765 | 0.556422 | 127.1 | 0 | | |
| 142.1 | 5.043 | 2.17788 | 0.858524 | 0.841015 | 127.1 | 0 | | |
| 112.1 | 2.77365 | 1.64661 | 0.732244 | 0.579828 | 128.1 | 2 | 113.1 | 92.1 |
| 113.1 | 20.9284 | 9.7788 | 0.825374 | 0.940178 | 112.1 | 0 | | |
| 92.1 | 6.93412 | 3.14661 | 0.837529 | 0.93278 | 112.1 | 2 | 93.1 | 77.1 |
| 93.1 | 42.9075 | 21.5648 | 0.795827 | 0.953979 | 92.1 | 0 | | |
| 77.1 | 6.724 | 3.95643 | 0.735507 | 0.663347 | 92.1 | 2 | 78.1 | 66.1 |
| 78.1 | 2.8577 | 1.14661 | 0.890689 | 0.745294 | 77.1 | 0 | | |
| 66.1 | 6.3878 | 2.11321 | 0.98091 | 1.4729 | 77.1 | 2 | 50.1 | 67.1 |
| 50.1 | 14.5687 | 8.45431 | 0.740621 | 0.842504 | 66.1 | 2 | 49.1 | 39.1 |
| 49.1 | 40.9323 | 23.4178 | 0.745908 | 0.889858 | 50.1 | 2 | 60.1 | 65.1 |
| 60.1 | 6.80805 | 4.56754 | 0.688804 | 0.966937 | 49.1 | 2 | 59.1 | 45.1 |
| 59.1 | 3.27795 | 2.87304 | 0.602636 | 0.561184 | 60.1 | 0 | | |
| 45.1 | 4.5387 | 3.57771 | 0.63546 | 0.619494 | 60.1 | 2 | 35.1 | 46.1 |
| 35.1 | 17.1462 | 10.1533 | 0.733171 | 0.830629 | 45.1 | 2 | 26.1 | 36.1 |
| 26.1 | 5.22511 | 1.15966 | 1.19759 | 1.14863 | 35.1 | 2 | 25.1 | 16.1 |
| 25.1 | 47.4042 | 29.607 | 0.713898 | 0.796103 | 26.1 | 0 | | |
| 16.1 | 11.6689 | 3.58643 | 1.01768 | 0.984344 | 26.1 | 2 | 9.1 | 15.1 |
| 9.1 | 28.3669 | 9.2904 | 0.985856 | 1.13425 | 16.1 | 2 | 6.1 | 10.1 |
| 6.1 | 7.43002 | 3.28885 | 0.848004 | 1.42695 | 9.1 | 2 | 5.1 | 2.1 |
| 5.1 | 21.9791 | 16.2268 | 0.656619 | 0.684858 | 6.1 | 0 | | |
| 2.1 | 12.9521 | 6.99576 | 0.767676 | 0.915219 | 6.1 | 2 | 1.1 | 0.1 |
| 1.1 | 5.16907 | 4.85639 | 0.582069 | 0.693031 | 2.1 | 2 | 3.1 | 4.1 |
| 3.1 | 3.40402 | 2.82224 | 0.619618 | 0.59983 | 1.1 | 0 | | |
| 4.1 | 5.29515 | 5.62203 | 0.547542 | 0.656612 | 1.1 | 2 | 7.1 | 8.1 |
| 7.1 | 1.82108 | 1.39983 | 0.643506 | 0.524146 | 4.1 | 2 | 11.1 | 12.1 |
| 11.1 | 25.7193 | 17.5293 | 0.683396 | 0.718126 | 7.1 | 0 | | |
| 12.1 | 1.97517 | 0.765637 | 0.906184 | 0.613217 | 7.1 | 2 | 19.1 | 20.1 |
| 19.1 | 10.4922 | 10.2055 | 0.572059 | 0.727464 | 12.1 | 2 | 29.1 | 30.1 |
| 29.1 | 11.0526 | 6.18736 | 0.754057 | 0.949716 | 19.1 | 0 | | |
| 30.1 | 2.42344 | 1.26564 | 0.780705 | 0.543615 | 19.1 | 0 | | |
| 20.1 | 62.6453 | 25.0896 | 0.891501 | 1.11137 | 12.1 | 0 | | |
| 8.1 | 18.9393 | 6.3738 | 0.97254 | 1.56468 | 4.1 | 2 | 13.1 | 14.1 |
| 13.1 | 7.0602 | 3.44127 | 0.808116 | 0.780162 | 8.1 | 0 | | |

FIG. 12A

| name | vol(cu.μm) | len(μm) | <r>_vl(μm) | <r>_obs(μm) | par | num_child | children... | |
|---|---|---|---|---|---|---|---|---|
| 14.1 | 18.449 | 6.04445 | 0.985673 | 1.30905 | 8.1 | 2 | 21.1 | 22.1 |
| 21.1 | 8.04078 | 4.85352 | 0.726183 | 0.833144 | 14.1 | 2 | 31.1 | 32.1 |
| 31.1 | 13.6441 | 13.0423 | 0.57706 | 0.824238 | 21.1 | 1 | 40.1 | |
| 40.1 | 3.362 | 5.6214 | 0.436317 | 0.458393 | 31.1 | 2 | 51.1 | 52.1 |
| 51.1 | 11.2627 | 14.0554 | 0.505039 | 0.481828 | 40.1 | 0 | | |
| 52.1 | 13.7842 | 10.691 | 0.640628 | 0.771872 | 40.1 | 0 | | |
| 32.1 | 31.5187 | 16.8269 | 0.772159 | 0.9414 | 21.1 | 0 | | |
| 22.1 | 7.2283 | 3.27076 | 0.838724 | 0.89558 | 14.1 | 2 | 33.1 | 34.1 |
| 33.1 | 50.2759 | 16.5961 | 0.98198 | 1.46495 | 22.1 | 2 | 41.1 | 42.1 |
| 41.1 | 28.8572 | 11.5837 | 0.890488 | 1.40817 | 33.1 | 2 | 53.1 | 54.1 |
| 53.1 | 3.83828 | 2.29691 | 0.729326 | 0.678821 | 41.1 | 0 | | |
| 54.1 | 17.2302 | 7.56767 | 0.851314 | 1.25508 | 41.1 | 0 | | |
| 42.1 | 4.52469 | 2.43982 | 0.768317 | 1.08303 | 33.1 | 2 | 55.1 | 56.1 |
| 55.1 | 37.9486 | 14.011 | 0.928512 | 1.26387 | 42.1 | 2 | 68.1 | 69.1 |
| 68.1 | 10.5903 | 4.94352 | 0.825774 | 0.933902 | 55.1 | 2 | 81.1 | 82.1 |
| 81.1 | 3.40402 | 0.646607 | 1.2945 | 1.4338 | 68.1 | 2 | 98.1 | 99.1 |
| 98.1 | 19.0373 | 14.8899 | 0.637943 | 0.917413 | 81.1 | 0 | | |
| 99.1 | 10.128 | 4.33093 | 0.862774 | 1.0782 | 81.1 | 2 | 118.1 | 119.1 |
| 118.1 | 10.5903 | 2.9819 | 1.06324 | 1.21297 | 99.1 | 2 | 133.1 | 134.1 |
| 133.1 | 6.34577 | 3.57982 | 0.751168 | 0.766645 | 118.1 | 0 | | |
| 134.1 | 54.1702 | 24.9888 | 0.830678 | 1.01805 | 118.1 | 0 | | |
| 119.1 | 5.96755 | 2.91224 | 0.807624 | 0.74402 | 99.1 | 0 | | |
| 82.1 | 50.5561 | 16.5176 | 0.987047 | 1.44119 | 68.1 | 0 | | |
| 69.1 | 21.1806 | 8.28686 | 0.901985 | 1.07768 | 55.1 | 2 | 83.1 | 84.1 |
| 83.1 | 61.6086 | 28.2585 | 0.83305 | 1.03262 | 69.1 | 0 | | |
| 84.1 | 46.0174 | 13.3965 | 1.04566 | 1.30817 | 69.1 | 2 | 97.1 | 100.1 |
| 97.1 | 0.8405 | 0.22 | 1.10276 | 1.29321 | 84.1 | 2 | 96.1 | 80.1 |
| 96.1 | 1.1767 | 0.22 | 1.30481 | 0 | 97.1 | 2 | 116.1 | 117.1 |
| 116.1 | 36.0911 | 17.2869 | 0.815205 | 1.09065 | 96.1 | 0 | | |
| 117.1 | 42.9495 | 22.7402 | 0.775367 | 0.978323 | 96.1 | 0 | | |
| 80.1 | 20.13 | 6.77286 | 0.972659 | 1.29073 | 97.1 | 1 | 79.1 | |
| 79.1 | 60.9783 | 14.047 | 1.17549 | 1.93846 | 80.1 | 2 | 94.1 | 95.1 |
| 94.1 | 32.7235 | 11.0249 | 0.972002 | 1.13616 | 79.1 | 2 | 114.1 | 115.1 |
| 114.1 | 28.0027 | 15.337 | 0.76235 | 0.954066 | 94.1 | 2 | 129.1 | 130.1 |
| 129.1 | 4.79085 | 2.32224 | 0.810359 | 0.922553 | 114.1 | 0 | | |
| 130.1 | 31.0985 | 11.6497 | 0.9218 | 1.55165 | 114.1 | 2 | 143.1 | 144.1 |
| 143.1 | 4.49667 | 1.91224 | 0.865166 | 0.949428 | 130.1 | 2 | 147.1 | 148.1 |
| 147.1 | 7.01817 | 5.84546 | 0.618198 | 1.06608 | 143.1 | 0 | | |

FIG. 12B

| name | vol(cu.μm) | len(μm) | <r>_vl(μm) | <r>_obs(μm) | par | num_child | children... | |
|---|---|---|---|---|---|---|---|---|
| 148.1 | 4.2025 | 4.76352 | 0.529926 | 0.595879 | 143.1 | 0 | | |
| 144.1 | 2.3534 | 1.29321 | 0.761093 | 0.566254 | 130.1 | 0 | | |
| 115.1 | 16.3337 | 7.32091 | 0.842723 | 0.856079 | 94.1 | 2 | 131.1 | 132.1 |
| 131.1 | 5.79945 | 4.56754 | 0.635737 | 0.819815 | 115.1 | 0 | | |
| 132.1 | 22.2032 | 9.32088 | 0.870772 | 0.976263 | 115.1 | 0 | | |
| 95.1 | 60.0957 | 20.3957 | 0.968451 | 1.50144 | 79.1 | 0 | | |
| 100.1 | 39.3858 | 16.0176 | 0.884699 | 1.03018 | 84.1 | 0 | | |
| 56.1 | 37.9906 | 24.4501 | 0.703271 | 0.984415 | 42.1 | 2 | 70.1 | 71.1 |
| 70.1 | 5.043 | 6.17851 | 0.509716 | 0.607265 | 56.1 | 0 | | |
| 71.1 | 3.78225 | 2.41224 | 0.706463 | 0.597315 | 56.1 | 0 | | |
| 34.1 | 7.18627 | 1.64661 | 1.17864 | 1.0967 | 22.1 | 2 | 43.1 | 44.1 |
| 43.1 | 64.2982 | 19.9305 | 1.01336 | 1.53819 | 34.1 | 2 | 57.1 | 58.1 |
| 57.1 | 2.10125 | 1.82224 | 0.605844 | 0.480414 | 43.1 | 0 | | |
| 58.1 | 27.8205 | 13.9625 | 0.796391 | 1.01814 | 43.1 | 0 | | |
| 44.1 | 13.406 | 2.79321 | 1.23601 | 1.49752 | 34.1 | 0 | | |
| 0.1 | 24.6687 | 11.7897 | 0.816105 | 1.06847 | 2.1 | 0 | | |
| 10.1 | 21.3347 | 9.28528 | 0.855206 | 0.906462 | 9.1 | 2 | 17.1 | 18.1 |
| 17.1 | 8.61512 | 5.34335 | 0.71639 | 0.727214 | 10.1 | 0 | | |
| 18.1 | 10.9405 | 5.42024 | 0.801557 | 0.905437 | 10.1 | 2 | 27.1 | 28.1 |
| 27.1 | 81.4444 | 35.0368 | 0.860189 | 0.988184 | 18.1 | 2 | 37.1 | 38.1 |
| 37.1 | 6.8921 | 10.2244 | 0.463213 | 0.491534 | 27.1 | 0 | | |
| 38.1 | 34.6286 | 15.8899 | 0.832879 | 1.55884 | 27.1 | 0 | | |
| 28.1 | 10.8424 | 5.57189 | 0.787023 | 0.69461 | 18.1 | 0 | | |
| 15.1 | 29.5436 | 10.178 | 0.961225 | 1.05846 | 16.1 | 2 | 23.1 | 24.1 |
| 23.1 | 13.0277 | 6.99283 | 0.770076 | 1.02683 | 15.1 | 0 | | |
| 24.1 | 75.0146 | 46.154 | 0.719272 | 0.749246 | 15.1 | 0 | | |
| 36.1 | 27.0641 | 11.4696 | 0.866658 | 1.02453 | 35.1 | 2 | 47.1 | 48.1 |
| 47.1 | 16.894 | 4.86881 | 1.05095 | 1.44155 | 36.1 | 2 | 61.1 | 62.1 |
| 61.1 | 6.63995 | 3.51093 | 0.775883 | 0.784361 | 47.1 | 2 | 72.1 | 73.1 |
| 72.1 | 43.9161 | 27.8582 | 0.708371 | 0.998845 | 61.1 | 2 | 85.1 | 86.1 |
| 85.1 | 3.362 | 2.58643 | 0.643241 | 0.57958 | 72.1 | 2 | 101.1 | 88.1 |
| 101.1 | 3.8663 | 2.67788 | 0.677918 | 0.556836 | 85.1 | 0 | | |
| 88.1 | 42.9495 | 17.9992 | 0.87152 | 1.07896 | 85.1 | 1 | 87.1 | |
| 87.1 | 37.7104 | 24.4806 | 0.700237 | 0.826981 | 88.1 | 2 | 104.1 | 105.1 |
| 104.1 | 5.86949 | 4.87964 | 0.618773 | 0.531031 | 87.1 | 2 | 120.1 | 121.1 |
| 120.1 | 2.98377 | 2.1111 | 0.670739 | 0.690016 | 104.1 | 2 | 135.1 | 136.1 |
| 135.1 | 1.42885 | 1.79321 | 0.503619 | 0.42506 | 120.1 | 0 | | |
| 136.1 | 4.3706 | 5.82076 | 0.488884 | 0.529283 | 120.1 | 0 | | |

FIG. 12C

| name | vol(cu.µm) | len(µm) | <r>_vl(µm) | <r>_obs(µm) | par | num_child | children... | | |
|---|---|---|---|---|---|---|---|---|---|
| 121.1 | 35.8053 | 21.4566 | 0.728816 | 1.12336 | 104.1 | 0 | | | |
| 105.1 | 9.32955 | 11.1518 | 0.516038 | 0.502153 | 87.1 | 0 | | | |
| 86.1 | 18.0287 | 8.09075 | 0.842196 | 0.997894 | 72.1 | 2 | 102.1 | 103.1 | |
| 102.1 | 13.9523 | 10.3332 | 0.655588 | 0.899972 | 86.1 | 0 | | | |
| 103.1 | 4.2025 | 1.91224 | 0.836387 | 0.763541 | 86.1 | 0 | | | |
| 73.1 | 88.6727 | 29.5164 | 0.977886 | 1.26234 | 61.1 | 0 | | | |
| 62.1 | 3.44605 | 0.646607 | 1.30246 | 1.32901 | 47.1 | 0 | | | |
| 48.1 | 61.1464 | 14.3291 | 1.16547 | 1.44256 | 36.1 | 2 | 63.1 | 64.1 | |
| 63.1 | 25.7193 | 7.46667 | 1.04711 | 1.42839 | 48.1 | 1 | 74.1 | | |
| 74.1 | 33.8301 | 12.5473 | 0.926408 | 1.08237 | 63.1 | 0 | | | |
| 64.1 | 62.8274 | 24.1398 | 0.910191 | 1.15792 | 48.1 | 2 | 75.1 | 76.1 | |
| 75.1 | 15.9695 | 7.83766 | 0.805337 | 0.877394 | 64.1 | 3 | 89.1 | 90.1 | 91.1 |
| 89.1 | 14.4566 | 7.42753 | 0.787111 | 1.12877 | 75.1 | 2 | 106.1 | 107.1 | |
| 106.1 | 29.3755 | 13.2941 | 0.838664 | 1.00666 | 89.1 | 2 | 122.1 | 123.1 | |
| 122.1 | 2.3534 | 2.41224 | 0.557266 | 0.430537 | 106.1 | 2 | 137.1 | 138.1 | |
| 137.1 | 1.98918 | 0.82 | 0.87873 | 0.675803 | 122.1 | 2 | 145.1 | 146.1 | |
| 145.1 | 5.28114 | 2.79321 | 0.775777 | 0.772528 | 137.1 | 0 | | | |
| 146.1 | 11.809 | 5.68868 | 0.81288 | 1.00106 | 137.1 | 2 | 149.1 | 150.1 | |
| 149.1 | 9.66575 | 5.93982 | 0.719708 | 0.613271 | 146.1 | 0 | | | |
| 150.1 | 65.601 | 19.7717 | 1.02768 | 1.91782 | 146.1 | 2 | 151.1 | 152.1 | |
| 151.1 | 31.2666 | 14.4647 | 0.829489 | 0.914468 | 150.1 | 0 | | | |
| 152.1 | 12.3553 | 6.61546 | 0.771032 | 0.769852 | 150.1 | 0 | | | |
| 138.1 | 22.5254 | 9.0488 | 0.890155 | 1.04116 | 122.1 | 0 | | | |
| 123.1 | 71.0222 | 34.7972 | 0.806028 | 0.966755 | 106.1 | 0 | | | |
| 107.1 | 4.62275 | 1.98983 | 0.859939 | 1.12756 | 89.1 | 0 | | | |
| 90.1 | 76.8637 | 36.1112 | 0.823123 | 1.05673 | 75.1 | 2 | 108.1 | 109.1 | |
| 108.1 | 17.1042 | 7.10462 | 0.875398 | 0.999907 | 90.1 | 0 | | | |
| 109.1 | 108.06 | 49.7516 | 0.831485 | 1.03766 | 90.1 | 2 | 124.1 | 110.1 | |
| 124.1 | 64.9566 | 40.1805 | 0.717347 | 0.818557 | 109.1 | 0 | | | |
| 110.1 | 7.48045 | 1.64661 | 1.20252 | 1.58609 | 109.1 | 1 | 111.1 | | |
| 111.1 | 24.9208 | 7.78462 | 1.00946 | 1.14717 | 110.1 | 2 | 125.1 | 126.1 | |
| 125.1 | 18.9953 | 10.1467 | 0.771943 | 0.820216 | 111.1 | 2 | 139.1 | 140.1 | |
| 139.1 | 3.23592 | 2.46885 | 0.645917 | 0.608425 | 125.1 | 0 | | | |
| 140.1 | 3.95035 | 4.02546 | 0.558902 | 0.523011 | 125.1 | 0 | | | |
| 126.1 | 88.5887 | 30.8675 | 0.955792 | 1.52486 | 111.1 | 0 | | | |
| 91.1 | 21.811 | 8.44995 | 0.906433 | 1.00243 | 75.1 | 0 | | | |
| 76.1 | 10.3802 | 7.52123 | 0.662801 | 0.971936 | 64.1 | 0 | | | |

FIG. 12D

| name | vol(cu.μm) | len(μm) | <r>_vl(μm) | <r>_obs(μm) | par | num_child | children... | |
|---|---|---|---|---|---|---|---|---|
| 46.1 | 1.93315 | 2.41224 | 0.505065 | 0.436808 | 45.1 | 0 | | |
| 65.1 | 6.80805 | 4.17788 | 0.720209 | 0.701237 | 49.1 | 0 | | |
| 39.1 | 1.8491 | 0.646607 | 0.954081 | 1.23561 | 50.1 | 0 | | |
| 67.1 | 44.8547 | 12.8907 | 1.05243 | 1.62166 | 66.1 | 0 | | |
| 2.2 | 21.895 | 8.58507 | 0.901002 | 1.08297 | N/A | 2 | 0.2 | 1.2 |
| 0.2 | 17.6505 | 10.0799 | 0.746577 | 0.920248 | 2.2 | 0 | | |
| 1.2 | 10.4642 | 9.13206 | 0.60394 | 0.572917 | 2.2 | 0 | | |
| 1.3 | 19.3315 | 13.4596 | 0.676148 | 0.662541 | N/A | 2 | 0.3 | 2.3 |
| 0.3 | 3.90832 | 3.98982 | 0.558398 | 0.552259 | 1.3 | 0 | | |
| 2.3 | 3.57212 | 3.08643 | 0.606961 | 0.597937 | 1.3 | 0 | | |
| 0.4 | 74.7204 | 9.72877 | 1.56356 | 3.65118 | N/A | 0 | | |
| 0.5 | 23.618 | 14.0802 | 0.730706 | 1.31671 | N/A | 0 | | |
| 0.6 | 33.62 | 12.8557 | 0.91238 | 1.51907 | N/A | 0 | | |
| 0.7 | 29.5015 | 2.33529 | 2.00529 | 2.99756 | N/A | 0 | | |
| 0.8 | 23.0297 | 2.64224 | 1.66565 | 2.80977 | N/A | 0 | | |
| 0.9 | 32.3592 | 1.99564 | 2.27187 | 2.76245 | N/A | 0 | | |

FIG. 12E

Sample Output Angicart++ Data Files (3)

| name | vol(cu.μm) | len(μm) | <r>_vl(μm) | <r>_obs(μm) | par | num_child | children... | |
|---|---|---|---|---|---|---|---|---|
| 83.1 | 95.6909 | 20.7849 | 1.21056 | 2.51133 | N/A | 2 | 74.1 | 84.1 |
| 74.1 | 37.5956 | 6.84559 | 1.32217 | 2.25858 | 83.1 | 2 | 73.1 | 65.1 |
| 73.1 | 2.81567 | 1.87661 | 0.691082 | 0.647601 | 74.1 | 2 | 81.1 | 82.1 |
| 81.1 | 27.0221 | 9.32088 | 0.96063 | 1.56016 | 73.1 | 2 | 91.1 | 92.1 |
| 91.1 | 7.08822 | 3.04868 | 0.860276 | 1.4804 | 81.1 | 2 | 99.1 | 96.1 |
| 99.1 | 11.9491 | 10.5931 | 0.599212 | 0.707918 | 91.1 | 0 | | |
| 96.1 | 18.1968 | 11.5307 | 0.708753 | 1.66883 | 91.1 | 2 | 95.1 | 87.1 |
| 95.1 | 10.9685 | 13.0409 | 0.517423 | 0.754406 | 96.1 | 0 | | |
| 87.1 | 7.5645 | 2.35127 | 1.01196 | 1.05861 | 96.1 | 2 | 77.1 | 88.1 |
| 77.1 | 2.6896 | 1.53127 | 0.747726 | 0.738138 | 87.1 | 2 | 71.1 | 78.1 |
| 71.1 | 62.0289 | 23.0851 | 0.924817 | 1.68729 | 77.1 | 2 | 64.1 | 72.1 |
| 64.1 | 39.9938 | 25.1521 | 0.711434 | 1.30611 | 71.1 | 2 | 63.1 | 56.1 |
| 63.1 | 0.966575 | 0.22 | 1.18258 | 1.28218 | 64.1 | 2 | 69.1 | 70.1 |
| 69.1 | 7.08822 | 7.41382 | 0.551661 | 0.738083 | 63.1 | 0 | | |
| 70.1 | 13.2099 | 4.99352 | 0.917637 | 1.85168 | 63.1 | 2 | 75.1 | 76.1 |
| 75.1 | 3.61415 | 6.83317 | 0.410315 | 0.520069 | 70.1 | 0 | | |
| 76.1 | 12.9437 | 4.75335 | 0.931011 | 1.76662 | 70.1 | 2 | 85.1 | 86.1 |
| 85.1 | 2.3534 | 2.46885 | 0.55084 | 1.23408 | 76.1 | 0 | | |
| 86.1 | 5.12705 | 4.56255 | 0.598074 | 0.646067 | 76.1 | 0 | | |
| 56.1 | 19.3735 | 9.87897 | 0.790084 | 1.1617 | 64.1 | 2 | 55.1 | 47.1 |
| 55.1 | 5.2111 | 2.40207 | 0.830992 | 1.25362 | 56.1 | 2 | 61.1 | 62.1 |
| 61.1 | 1.26075 | 1.79321 | 0.473068 | 0.408006 | 55.1 | 0 | | |
| 62.1 | 3.95035 | 3.62851 | 0.58868 | 0.811445 | 55.1 | 2 | 67.1 | 68.1 |
| 67.1 | 19.1634 | 15.342 | 0.630552 | 1.00363 | 62.1 | 0 | | |
| 68.1 | 4.45465 | 1.79321 | 0.889234 | 0.992338 | 62.1 | 0 | | |
| 47.1 | 11.809 | 3.15529 | 1.09147 | 1.45909 | 56.1 | 2 | 42.1 | 48.1 |
| 42.1 | 4.32857 | 4.39771 | 0.559737 | 0.693161 | 47.1 | 2 | 37.1 | 43.1 |
| 37.1 | 57.0111 | 12.4189 | 1.20882 | 2.2699 | 42.1 | 2 | 28.1 | 36.1 |
| 28.1 | 8.16686 | 2.23224 | 1.07915 | 1.47863 | 37.1 | 2 | 24.1 | 29.1 |
| 24.1 | 64.7885 | 9.10961 | 1.50461 | 2.34212 | 28.1 | 2 | 22.1 | 25.1 |
| 22.1 | 5.34838 | 1.34546 | 1.12486 | 1.58227 | 24.1 | 2 | 21.1 | 23.1 |
| 21.1 | 27.6665 | 6.75994 | 1.14138 | 1.44417 | 22.1 | 2 | 19.1 | 20.1 |
| 19.1 | 25.9238 | 5.84609 | 1.18807 | 1.44748 | 21.1 | 2 | 15.1 | 18.1 |
| 15.1 | 50.4076 | 9.54656 | 1.29643 | 1.79027 | 19.1 | 2 | 14.1 | 10.1 |
| 14.1 | 14.521 | 8.9377 | 0.719136 | 0.991444 | 15.1 | 0 | | |
| 10.1 | 1.73703 | 0.22 | 1.58532 | 2.31931 | 15.1 | 2 | 11.1 | 8.1 |

FIG. 13A

| name | vol(cu.μm) | len(μm) | <r>_vl(μm) | <r>_obs(μm) | par | num_child | children... | | |
|---|---|---|---|---|---|---|---|---|---|
| 11.1 | 12.4506 | 3.96885 | 0.999282 | 1.07507 | 10.1 | 0 | | | |
| 8.1 | 86.9077 | 10.8515 | 1.59665 | 1.99897 | 10.1 | 2 | 6.1 | 9.1 | |
| 6.1 | 463.931 | 20.5531 | 2.68049 | 3.52746 | 8.1 | 2 | 5.1 | 7.1 | |
| 5.1 | 11.0946 | 8.09299 | 0.660581 | 0.70713 | 6.1 | 2 | 4.1 | 3.1 | |
| 4.1 | 4.5387 | 4.1177 | 0.59233 | 0.524985 | 5.1 | 0 | | | |
| 3.1 | 7.10222 | 0.5 | 2.12636 | 3.00647 | 5.1 | 2 | 1.1 | 0.1 | |
| 1.1 | 1.72302 | 2.40207 | 0.477835 | 0.650847 | 3.1 | 1 | 2.1 | | |
| 2.1 | 10.5903 | 5.83528 | 0.760061 | 1.78964 | 1.1 | 0 | | | |
| 0.1 | 6.30375 | 4.81431 | 0.645591 | 1.35701 | 3.1 | 0 | | | |
| 7.1 | 9.87587 | 5.54075 | 0.753232 | 1.21734 | 6.1 | 0 | | | |
| 9.1 | 120.996 | 27.3872 | 1.18587 | 1.70621 | 8.1 | 2 | 12.1 | 13.1 | |
| 12.1 | 3.94475 | 1.34546 | 0.966048 | 1.14238 | 9.1 | 2 | 16.1 | 17.1 | |
| 16.1 | 1.87712 | 2.20321 | 0.520766 | 0.532427 | 12.1 | 0 | | | |
| 17.1 | 0.58835 | 1.41224 | 0.364157 | 0.305205 | 12.1 | 0 | | | |
| 13.1 | 8.405 | 5.67352 | 0.686701 | 0.853177 | 9.1 | 0 | | | |
| 18.1 | 11.6549 | 6.61123 | 0.749099 | 1.18515 | 19.1 | 0 | | | |
| 20.1 | 4.365 | 4.5277 | 0.55396 | 0.724346 | 21.1 | 0 | | | |
| 23.1 | 546.678 | 21.7562 | 2.82813 | 3.68204 | 22.1 | 2 | 26.1 | 27.1 | |
| 26.1 | 88.1965 | 2.81207 | 3.15964 | 4.95286 | 23.1 | 2 | 32.1 | 33.1 | |
| 32.1 | 523.631 | 38.4385 | 2.08235 | 3.69923 | 26.1 | 2 | 38.1 | 30.1 | |
| 38.1 | 11.0105 | 9.57268 | 0.60508 | 1.46055 | 32.1 | 2 | 31.1 | 39.1 | |
| 31.1 | 0.42025 | 0.22 | 0.779772 | 0.41 | 38.1 | 0 | | | |
| 39.1 | 6.13565 | 9.76282 | 0.447268 | 0.59617 | 38.1 | 0 | | | |
| 30.1 | 19.4015 | 9.80202 | 0.793753 | 1.3603 | 32.1 | 0 | | | |
| 33.1 | 1262.1 | 38.5948 | 3.22632 | 4.29741 | 26.1 | 2 | 40.1 | 41.1 | |
| 40.1 | 4.2025 | 2.70691 | 0.702978 | 0.601097 | 33.1 | 3 | 44.1 | 45.1 | 46.1 |
| 44.1 | 6.20569 | 2.28304 | 0.930172 | 1.39114 | 40.1 | 2 | 50.1 | 51.1 | |
| 50.1 | 119.652 | 20.411 | 1.36601 | 2.81366 | 44.1 | 2 | 57.1 | 58.1 | |
| 57.1 | 32.9056 | 4.79109 | 1.47857 | 2.79343 | 50.1 | 1 | 66.1 | | |
| 66.1 | 39.0832 | 28.4284 | 0.661522 | 0.93995 | 57.1 | 0 | | | |
| 58.1 | 1.1767 | 1.26564 | 0.544006 | 0.536313 | 50.1 | 0 | | | |
| 51.1 | 7.5645 | 2.33529 | 1.01542 | 1.9903 | 44.1 | 2 | 59.1 | 60.1 | |
| 59.1 | 2.64757 | 1.72643 | 0.698673 | 0.63054 | 51.1 | 0 | | | |
| 60.1 | 18.7852 | 8.37462 | 0.844987 | 1.76303 | 51.1 | 0 | | | |
| 45.1 | 33.2978 | 10.7346 | 0.993664 | 2.2285 | 40.1 | 3 | 52.1 | 53.1 | 54.1 |
| 52.1 | 12.1312 | 6.34982 | 0.779824 | 1.01283 | 45.1 | 0 | | | |
| 53.1 | 75.3508 | 15.5713 | 1.2411 | 2.08495 | 45.1 | 0 | | | |
| 54.1 | 0.58835 | 0.646607 | 0.538174 | 0.43023 | 45.1 | 0 | | | |

FIG. 13B

| name | vol(cu.μm) | len(μm) | <r>_vl(μm) | <r>_obs(μm) | par | num_child | children... | |
|---|---|---|---|---|---|---|---|---|
| 46.1 | 2.87171 | 0.765637 | 1.09266 | 1.06894 | 40.1 | 0 | | |
| 41.1 | 1.87011 | 2.42529 | 0.495424 | 0.533462 | 33.1 | 0 | | |
| 27.1 | 497.702 | 20.728 | 2.76459 | 3.64576 | 23.1 | 2 | 34.1 | 35.1 |
| 34.1 | 72.255 | 21.4567 | 1.03533 | 2.18792 | 27.1 | 0 | | |
| 35.1 | 8.76922 | 5.01528 | 0.746032 | 0.989339 | 27.1 | 0 | | |
| 25.1 | 12.9157 | 3.81207 | 1.03849 | 1.50943 | 24.1 | 0 | | |
| 29.1 | 35.7773 | 9.31298 | 1.10582 | 1.78104 | 28.1 | 0 | | |
| 36.1 | 82.6352 | 8.49731 | 1.75941 | 2.2378 | 37.1 | 0 | | |
| 43.1 | 6.07962 | 1.79321 | 1.03884 | 1.52933 | 42.1 | 1 | 49.1 | |
| 49.1 | 12.3694 | 4.85352 | 0.90068 | 1.97633 | 43.1 | 0 | | |
| 48.1 | 17.5244 | 9.59088 | 0.762637 | 1.39963 | 47.1 | 0 | | |
| 72.1 | 22.7075 | 9.00025 | 0.896154 | 1.84294 | 71.1 | 2 | 79.1 | 80.1 |
| 79.1 | 12.1032 | 9.00299 | 0.654157 | 0.875629 | 72.1 | 2 | 89.1 | 90.1 |
| 89.1 | 4.74882 | 3.93546 | 0.619756 | 0.924762 | 79.1 | 0 | | |
| 90.1 | 8.02677 | 2.17788 | 1.08313 | 1.92225 | 79.1 | 2 | 97.1 | 98.1 |
| 97.1 | 11.0105 | 11.3899 | 0.554715 | 0.709303 | 90.1 | 0 | | |
| 98.1 | 2.0172 | 0.646607 | 0.996505 | 0.793066 | 90.1 | 0 | | |
| 80.1 | 18.575 | 15.9757 | 0.60836 | 0.709792 | 72.1 | 0 | | |
| 78.1 | 0.5043 | 0.41 | 0.625717 | 0.343855 | 77.1 | 0 | | |
| 88.1 | 5.12705 | 3.79321 | 0.655927 | 0.560008 | 87.1 | 0 | | |
| 92.1 | 23.3239 | 13.8028 | 0.733402 | 1.16438 | 81.1 | 0 | | |
| 82.1 | 1.76505 | 1.56966 | 0.598276 | 0.578081 | 73.1 | 2 | 93.1 | 94.1 |
| 93.1 | 3.6982 | 2.90207 | 0.636893 | 0.678972 | 82.1 | 0 | | |
| 94.1 | 4.83287 | 2.20321 | 0.835602 | 0.954895 | 82.1 | 0 | | |
| 65.1 | 28.535 | 3.3411 | 1.6488 | 2.39996 | 74.1 | 0 | | |
| 84.1 | 0.378225 | 0.41 | 0.541886 | 0.257778 | 83.1 | 0 | | |
| 0.2 | 2.60555 | 2.93321 | 0.531744 | 0.579104 | N/A | 0 | | |
| 0.3 | 16.9781 | 5.79109 | 0.966027 | 1.43368 | N/A | 0 | | |

FIG. 13C

Sample Vasculature Images After Pre-processing

Sample Vasculature Images After Pre-Processing (2)

Sample Vasculature Images After Pre-Processing (3)

METHOD FOR DIAGNOSING, PREDICTING, DETERMINING PROGNOSIS, MONITORING, OR STAGING DISEASE BASED ON VASCULARIZATION PATTERNS

CROSS-REFERENCE TO RELATED APPLICATIONS

Pursuant to 35 U.S.C. § 119(a), this application claims the benefit of earlier filing date and right of priority to Provisional Application No. 62/693,852, filed on Jul. 3, 2018, entitled "A METHOD FOR DIAGNOSING DISEASE BASED UPON ANALYSIS OF VASCULARIZATION PATTERNS," the contents of which are hereby incorporated by reference herein in their entirety.

BACKGROUND

1. Field

This specification relates to a method of disease detection and prediction. More specifically, this specification relates to methods that apply artificial intelligence algorithms to analyze vascular structure and detect whether or not a subject has a disease, predict whether a subject is likely to get a disease, determine a subject's prognosis, monitor a disease, or stage a disease.

2. Description of the Related Art

Cancer and stroke are the second and fifth leading causes of death in the United States, respectively. Approximately 38.5% of the population will be diagnosed with cancer in their lifetime and approximately 16.7% will experience a stroke in their lifetime. Cancer contributes an economic burden of $147 billion in the United States alone and strokes contribute an economic burden of $75 billion in the United States alone. The global impact is likely many times greater given that the United States represents less than 5% of the world population.

It is well known that early detection of cancer is one of the most important factors to a patient's long-term prognosis. Indeed, early detection of cancer can increase survival rates by threefold. Unfortunately, there are several cancers that are difficult to detect until later stages when symptoms arise which directly impacts survival rates. However, even with cancers that are easier to detect there are issues with current cancer screening tests. Current cancer screening tests are invasive, time-consuming, and are sometimes inaccurate.

Similarly, fast and accurate diagnosis of strokes is paramount in maximizing the effectiveness of treatment and minimizing brain damage. Identifying patients that are at risk for a stroke is vital in order to treat them preventatively and to significantly reduce the risk of strokes. Current screening tests for strokes also suffer the same drawbacks as the cancer screening tests discussed above.

Vasculature permeates the tissues of all organisms, supplying nutrients to an organism's cells. In diseased tissue, the vascular structure differs considerably from the vascular structure in healthy tissue. For example, the vascular structure of tissue with a presence of cancer will differ considerably from the vascular structure of tissue without cancer. In another example, the vascular structure of tissue in the brain of a subject at risk for a stroke will differ considerably from the vascular structure of tissue in the brain of a healthy subject.

Certain methods have been developed that use machine learning algorithms to detect cancer from images of tumor tissue. However, these methods may not be sensitive enough to detect the early stages of cancer. Certain methods have also been developed that analyze various vessel attributes for the purpose of disease diagnosis. These vessel attributes do not include metabolic scaling exponents which may quantify the organism's metabolism. Some of these methods do not apply machine learning but rather compare vessel attributes to an existing atlas of vessel attributes from healthy subjects. The remaining methods that have been developed do not apply machine learning algorithms to train a model to detect the presence of disease. Therefore, there exists a need to develop a faster, more sensitive, more accurate, and less invasive method to detect whether or not a subject has a disease, predict whether a subject is likely to get a disease, determine a subject's prognosis, monitor a disease, and stage a disease.

SUMMARY

In general, one aspect of the subject matter described in this specification is embodied in a method for detecting disease in vasculature. The method includes obtaining images of the vasculature. The method includes extracting vessel measurements from the obtained images. The method includes determining features of the vasculature in the obtained images based on the extracted vessel measurements. The method includes applying artificial intelligence algorithms to the determined features to determine if the disease is present in the vasculature.

These and other embodiments may include one or more of the following features. The vessel measurements may be automatically extracted. The disease may include cancer, cerebrovascular diseases (e.g., stroke, transient ischemic attack), cardiovascular disease, other vascular diseases, ocular diseases, or dermal diseases. The disease may be at least one of tumors, stroke, transient ischemic attack, diabetes, atherosclerosis, hypertension (e.g. cardiac, renal, or portal), peripheral venous disease, aneurysms, pulmonary embolisms, carotid artery disease, chronic venous insufficiency, congenital vascular malformation, deep vein thrombosis, fibromuscular dysplasia, renal artery stenosis, lymphedema, mesenteric artery disease, post-thrombotic syndrome, thrombophilia, vasculitis, vascular dementia, rheumatoid arthritis, systemic lupus erythematosus, emphysema, inflammatory bowel disease, uterine polyp, preeclampsia, or neurofibramatosis. The vessel measurements may be from a plurality of vessels. The extracted vessel measurements may include at least one of vessel name, vessel radius, vessel length, three-dimensional coordinates of a vessel, a number of vessel children, or a number of downstream vessel tips.

The features may be any value that quantifies the physiology of the vasculature for subsequent application to the detection, diagnosis, monitoring, or prediction of disease. Computing these features may involve the use of allometric scaling laws to quantify the relationship between physiology and function of vasculature and/or fractal analysis. The features may be determined from at least one of scaling exponents, asymmetric scaling exponents, tortuosity, curvature, or microvascular density, vessel diameter, vessel length, vessel volume, vessel surface area, branching angle, branching frequency, number of branch points, number of vessel tips, number of vessel loop, hierarchical fractal dimension, Hausdorff dimension, lacunarity dimension, and generalized fractal dimension. The machine learning algorithms may be applied to train a model based on vascular structure features.

The method may include applying feature selection to select the vascular structure features that correlate most strongly to diagnosis of the disease. The method may include applying feature extraction to select the vascular structure features that correlate most strongly to diagnosis of the disease.

One aspect of the subject matter described in this specification is embodied in a computer program for detecting disease in vasculature. The program may include a module for determining features of the vasculature. The determined features may include at least one of a vascular network scaling exponents, vascular asymmetric scaling exponents, vascular tortuosity, vascular curvature, or vascular microvascular density. The program may include a module for applying artificial intelligence algorithms to the determine features to determine if disease is present in the vasculature.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIGS. 3A-3L show sample graphs of machine-learning results according to an aspect of the invention.

FIG. 5I shows a regression-based calculation of the radial exponent (a) from ischemic stroke according to an aspect of the invention.

FIG. 7 shows a table of accuracies of a logistic regression program and a Naïve Bayes classifier in detecting ischemic stroke from analysis of vasculature according to an aspect of the invention.

FIGS. 11A-11E show sample output Angicart++ data files according to an aspect of the invention.

FIGS. 12A-12E show sample output Angicart++ data files according to an aspect of the invention.

FIGS. 13A-13C show sample output Angicart++ data files according to an aspect of the invention.

DETAILED DESCRIPTION

Figure 1:
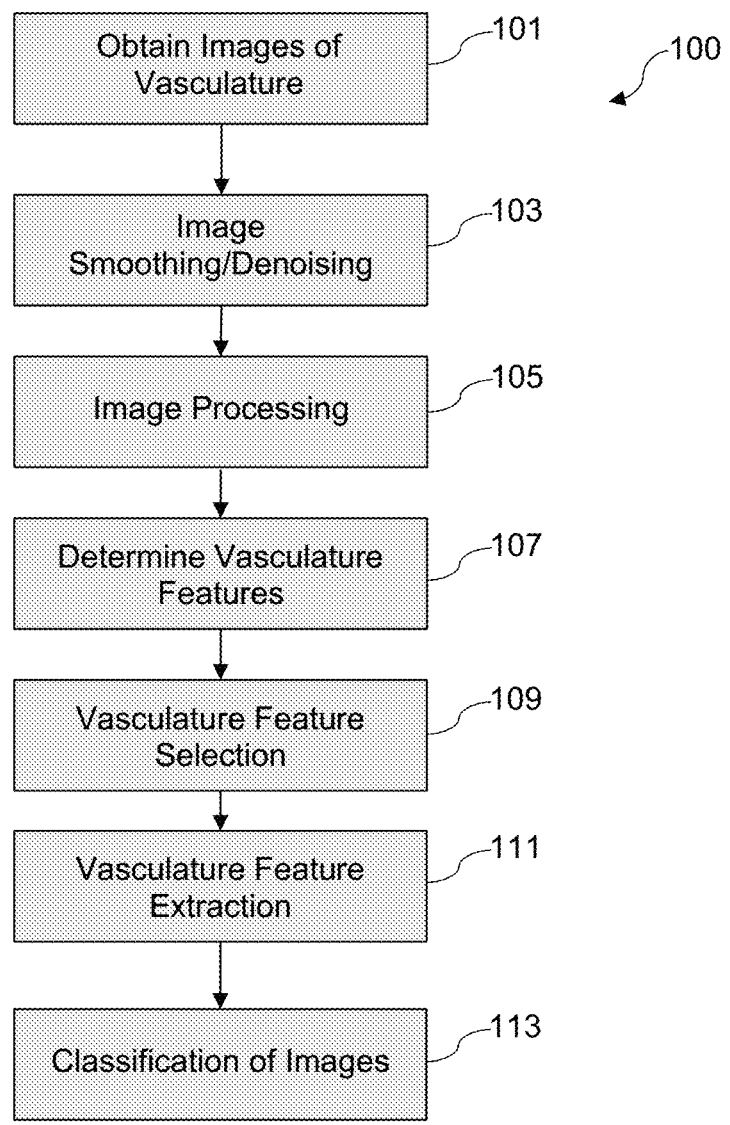
FIG. 1 is a flow diagram of a process for disease detection according to an aspect of the invention.

Disclosed herein are methods, computer programs, and systems for detecting disease in vasculature using artificial intelligence algorithms. More specifically, the present disclosure relates to automated disease detection and disease prediction based on math modelling and machine learning of vasculature. The present disclosure provides for non-invasive early disease detection that uses mathematical modelling based on biological principles to quantify the structure of the vasculature and may implement machine learning to determine whether tissue is diseased. The accuracy of such disease detection as well as the progression of the disease may be confidently predicted.

One of the leading causes of death both in the United States and worldwide is cancer. It is vital to detect cancer early before it has had a chance to spread and when the likelihood for successful treatment are at its highest. Unfortunately, some cancers are inherently difficult to detect until later stages. These cancers include the most lethal of cancer such as liver cancer, brain cancer, ovarian cancer, and lung cancer. The conventional process for verifying the presence of cancer is through biopsies, which are inherently invasive and unduly damage the surrounding tissue. Mathematical models of tumor vasculature in conjunction with non-invasive medical imaging techniques may allow for more effective and less invasive cancer detection. The mathematical models may be or include any of the following: machine learning algorithms, machine learning methods, models, equations, or algorithms.

As a cancerous tumor grows, the vasculature surrounding the tumor must also grow to supply the tumor with an ever-increasing amount of oxygen and associated nutrients. Very early stages of cancer are characterized by angiogenesis, which is the formation of new blood vessels. Tumor cells send chemical signals that trigger the rapid and highly irregular growth of blood vessel surrounding the tumor. As a consequence, the structure of tumor vasculature is vastly different from the structure of healthy vasculature.

Healthy vasculature exhibits self-similarity, which is a property whereby a smaller piece of an object is structurally similar to the whole object at any given magnification. As a result, the ratio between the radius or length of a parent vessel to a child vessel is similar throughout the vascular network (i.e., the vasculature).

In contrast, because tumor cells send chemical signals that trigger the rapid and highly irregular growth of blood vessels surrounding the tumor, tumor vasculature exhibits little to no self-similarity. The ratios between the radii and lengths of blood vessels are highly irregular and each parent branch splits off into many child vessels. This fundamental difference between healthy vasculature and diseased vasculature may allow for early detection of disease without the above-mentioned drawbacks associated with conventional processes.

Similarly, angiogenesis occurs to deliver oxygen and nutrients to brain tissue in recovery from ischemic strokes, hemorrhagic strokes, minor strokes, and transient ischemic attack (TIA). As result of the aforementioned conditions, vascular endothelial growth factor (VEGF) levels increase. This in turn triggers the rapid and highly irregular growth of blood vessels surrounding the infarct region of the brain. This fundamental difference between healthy vasculature and diseased vasculature may allow for early detection or prediction of such diseases as well. Arteriosclerosis is a significant precursor for the onset of the aforementioned neurological diseases as well as other vascular diseases such as heart attacks and peripheral vascular disease. In patients with atherosclerotic plaque build-up in blood vessels experience, angiogenesis occurs to compensate for reduced blood flow. Therefore, vessel measurements may be used to determine if disease is present in the vasculature. Additionally, vessel measurements may be used for predicting the onset of disease in the vasculature.

Mathematical models such as the West, Brown, and Enquist (WBE) model quantify and predict the structure of vascular networks using fundamental biological principles. Various mathematical models of vasculature prioritize different biological principles: vasculature is space-filling such that the vascular network extends over the organism's body so that oxygen can diffuse to all cells, and that vasculature is designed to minimize energy loss caused by impedance, such as wave reflections at branching junctions. These models assume that all vessels within the same hierarchical level are equivalent. Vessel hierarchy is determined as follows: a vessel that is not connected to any vessels with larger radii (i.e. not connected to any parent vessels) has a hierarchical level of 0 in a network. Vessels with smaller radii to which this vessel is connected have a hierarchical level of 1. Subsequent vessels are assigned vessel hierarchical levels in this manner, with consecutively larger numbers.

The radius and lengths of blood vessels follow a power law. Therefore, ratios between radii and length at different levels of the vascular network can be calculated. The present disclosure may utilize at least one of five methods of calculating scaling exponents, specifically three derived from whole network characteristics, such as distribution, regression, and hierarchical averaging based, and two derived from local branching junction characteristics, such as conservation and ratio based.

Medical images of vasculature of a subject are processed. The medical images may be of any organ or portion of vasculature. The subject may be a human or an animal. Quantitative and/or qualitative vessel data of the vasculature are extracted. Using this data, certain quantifiable vasculature properties are computed. Artificial intelligence algorithms are then applied to detect, predict, diagnose, determine prognosis, monitor, or stage disease. The artificial intelligence algorithms may include but are not limited to machine learning algorithms. The disease may be cancer, stroke, transient ischemic attack, diabetes, atherosclerosis, hypertensive heart disease, aneurysms, peripheral artery disease, pulmonary embolisms, or vascular dementia.

Referring now to FIG. 1, it is a flow diagram of a process 100 for detecting, predicting, diagnosing, determining prognosis, monitoring, and staging disease in vasculature. In some embodiments, the process 100 may be performed and/or implemented by the system 200 discussed in relation to FIG. 2. In other embodiments, the process 100 may be performed and/or implemented by one or more modules of a computer program.

The vasculature may include a plurality of vessels. Images may first be obtained of the vasculature (101). The images may be obtained using any non-invasive imaging technique, such as Magnetic Resonance Imaging (MRI), Magnetic Resonance Angiography (MRA), Computed Tomography (CT), CT Angiography (CTA), micro-CT, X-ray, X-ray angiography, functional MRI, or PET. A contrast agent, which may include Iodine-based and Gadolinium-based contrast agents, may be administered to the animal or human prior to the imaging process so that vasculature can be clearly seen in the resulting scans. Contrast agents may be taken orally, administered by enema, or injected into a blood vessel. However, other non-invasive imaging techniques may be used interchangeably according to various embodiments.

If these images are three-dimensional in nature, the scan will consist of a stack of two-dimensional images. For example, each of these two-dimensional images may then be converted to .png images. However, other image formats may be used interchangeably according to various embodiments. The stacks of images may then be converted to grayscale format.

The stacks of images may undergo image smoothing and/or denoising to convert the stacks of images to pre-processed images (103). FIGS. 14A-14F, 15A-15F, and 16A-16C show sample vasculature images after pre-processing obtained via experiment. Denoising is performed in order to remove noise from the stacks of images. The image smoothing and denoising may be performed using a local means (LM) technique. In other embodiments, the image smoothing and denoising may be performed using a non-local means (NLM) technique. However, other techniques of image smoothing and/or denoising may be performed interchangeably according to various embodiments. For example, the image smoothing and/or denoising may be performed using one or more software programs.

During the process of image smoothing and/or denoising, the intensity value of each pixel within the stacks of images may be replaced with an average intensity value of its neighboring pixels. A folder containing the stack of pre-processed images of the three-dimensional images may be saved in preparation for image processing. For example, a folder containing a stack of pre-processed .png images may be saved in preparation for later image processing.

Figure 9A:
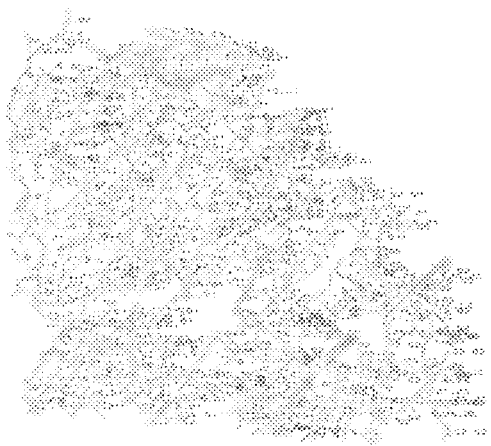
FIG. 9A shows a finished Angicart++ processing image of non-stroke vasculature according to an aspect of the invention.
Figure 9B:
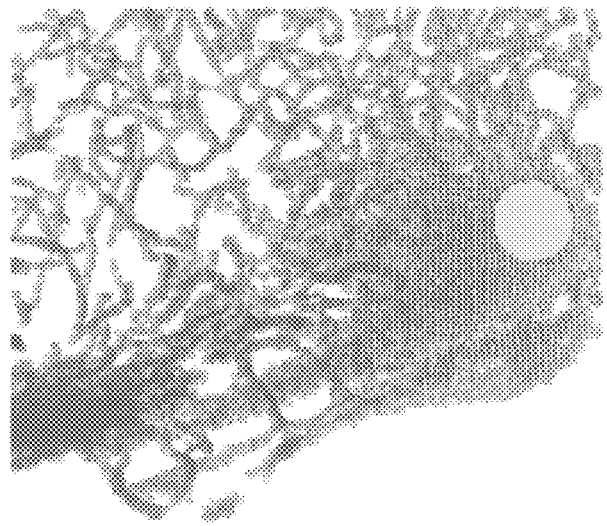
FIG. 9B shows an image of Angicart++ processing a three-dimensional micro-CT scan of brain vasculature from the peri-infarct stroke region according to an aspect of the invention.
Figure 9C:
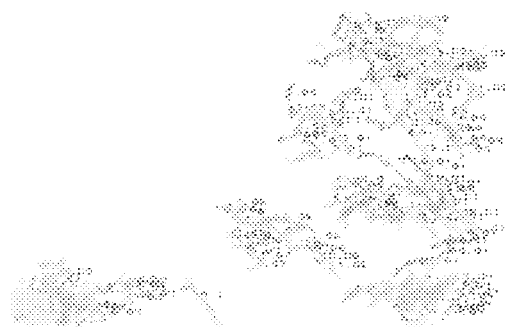
FIG. 9C shows a finished Angicart++ processing image of ischemic stroke vasculature according to an aspect of the invention.

The stack of pre-processed images may then undergo image processing (105). The image processing and segmentation may be performed by one or more software programs to extract vessel measurements from the stack of pre-processed images. For example, the image processing may be performed by Angicart++, which is an open-source software program. However, other software programs capable of processing the stack of pre-processed images may be used interchangeably according to various embodiments. FIG. 9A shows a finished Angicart++ processing image of non-stroke brain vasculature obtained via experiment. FIG. 9B shows a finished Angicart++ processing image of stroke vasculature in the peri-infarct region obtained via experiment. FIG. 9C shows a finished Angicart++ processing image of stroke vasculature in the ischemic hemisphere obtained via experiment.

The extracted vessel measurements may contain measurements of each vessel within the vasculature. In the preceding example, the directory may be changed in the Angicart++ source code to point to the correct folder of .png images. Angicart++ may then output Tab Separated Value (TSV) files containing the vessel measurements.

For each vessel within the vasculature, various vessel measurements may be taken to form vessel data. The various vessel measurements may include at least one of the following data criteria: vessel name, vessel radius, vessel length, vessel volume, the name of the vessel (e.g. parent vessel) with larger radius to which the vessel is connected, the number of vessels, the number of vessels (e.g. children vessel) with smaller radii to which the vessel is connected, the names of the children vessels, the three-dimensional coordinates of the starting point of the vessel, or the three-dimensional coordinates of the end point of the vessel. FIGS. 11A-11E, 12A-12E, and 13A-13C show sample output Angicart++ data files obtained via experiment.

In some embodiments, the vessel data may then be converted to and saved as plain text files. The plain text files may then be imported to one or more software programs for computation of vessel features from vessel data. For example, the plain text files may be imported into MATLAB and saved as a variable. The one or more software programs may read the plain text files and create variables for each column of the file. For example, MATLAB may read the plain text files and create the variables for each column of the file. The one or more software programs may read the plain text files using tdfread. An empty matrix having a plurality of rows and a plurality of columns may be created and filled with the vessel measurements. The number of rows may equal the number of vessels and the number of columns may equal the number of different vessel measurements. In other embodiments, the number of rows may equal the number of different vessel measurements and the number of columns may equal the number of vessels.

The features of the vasculature may be determined based on the extracted vessel measurements (107). The features of the vasculature may include the mean, median, and standard deviation computed from every vessel within the vasculature.

For each branching junction in the vasculature, symmetric scale factors may be computed using the following equations:

$$\beta = \frac{r_{k+1}}{r_k} \qquad \text{Equation 1}$$

$$\gamma = \frac{l_{k+1}}{l_k} \qquad \text{Equation 2}$$

In the above recited equations, the radical scale factor is represented by $\beta$ and the length scale factor is represented by $\gamma$. In the above recited equations, the subscript indicates the branching level of the vessel. For example, $r_{k+1}$ indicates the radius of the parent vessel of the vessel with radius $r_{k+1}$.

For each branching junction in the vasculature, asymmetric scale factors may be computed using the following equations:

$$\gamma_{j,u} = \gamma_j + \Delta\gamma_j \qquad \text{Equation 3}$$

$$\gamma_{j,v} = \gamma_j - \Delta\gamma_j \qquad \text{Equation 4}$$

$$\beta_{j,u} = \beta_j + \Delta\beta_j \qquad \text{Equation 5}$$

$$\beta_{j,v} = \beta_j - \Delta\beta_j \qquad \text{Equation 6}$$

Two different metabolic scaling exponents may be computed. The first exponent may use vessel radius measurements and the second exponent may use vessel length measurements.

For computation of conservation-based scaling exponents and ratio-based scaling exponents, the following three steps may be performed. First, for each vessel in the vasculature, the vessel's length and radius may be saved as variables. Second, the one or more software programs may locate the parent vessel's measurement in the data file. Third, the parent vessel's length, radius, and number of vessel children may be saved as variables.

For each branching junction in the vasculature, the conservation-based scaling exponents may be computed. The following equations may be solved for the radial exponent (a) and the length scaling exponent (b), using Newton's method:

$$r_p^a = \Sigma_i r_{c,i}^a \qquad \text{Equation 7}$$

$$l_p^b = \Sigma_i l_{c,i}^b \qquad \text{Equation 8}$$

Figure 5A:
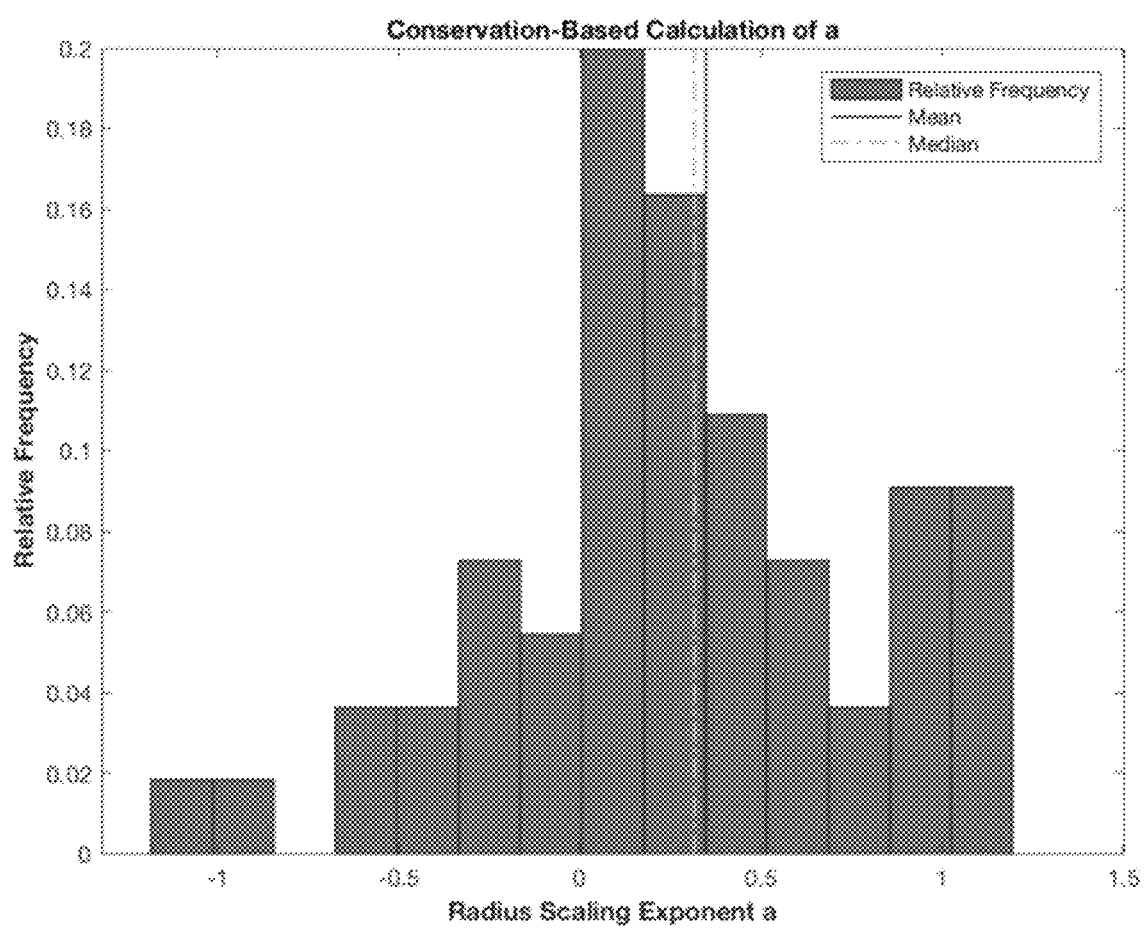
FIG. 5A shows a sample graph of the distribution of conservation-based calculations of the radial exponent (a) from brain vasculature after the onset of ischemic stroke according to an aspect of the invention.
Figure 5B:
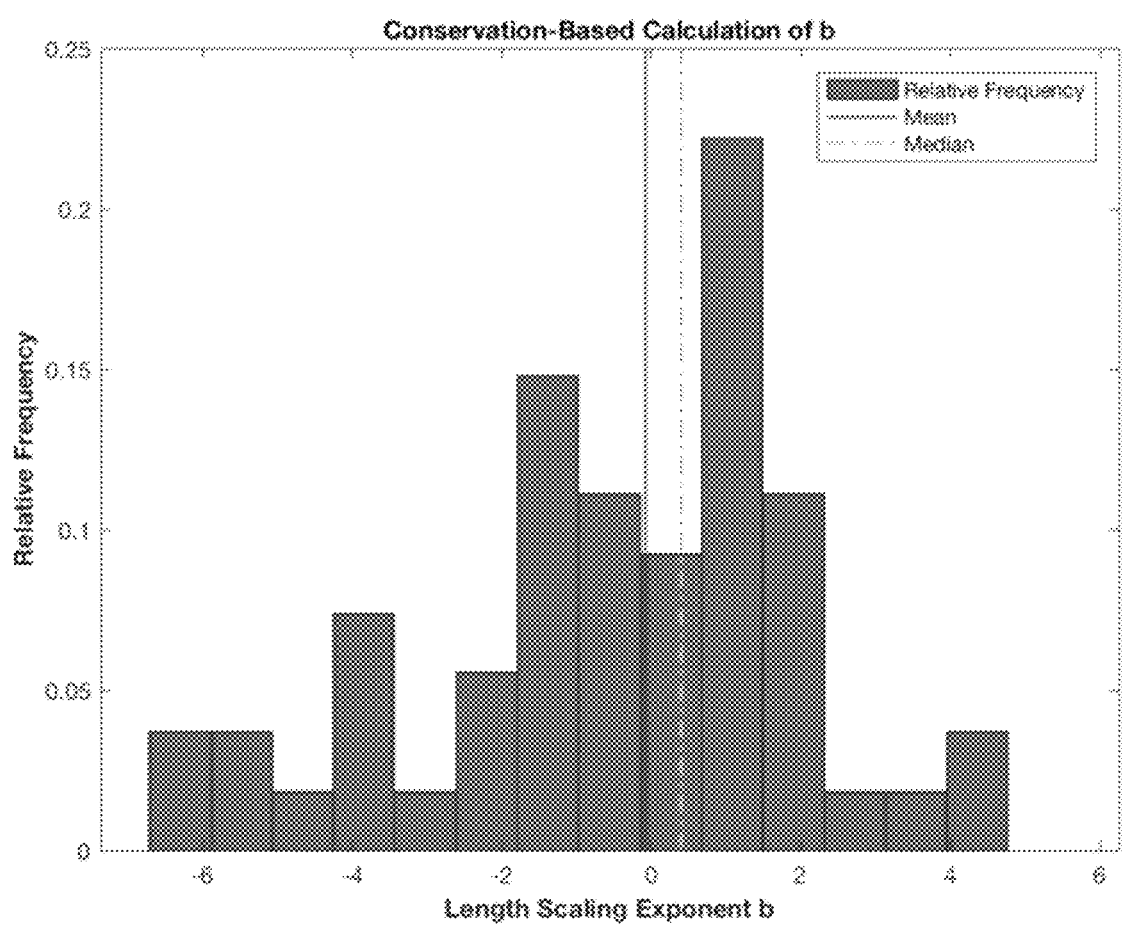
FIG. 5B shows a sample graph of the distribution of conservation-based calculation of the length scaling exponent (b) from brain vasculature after the onset of ischemic stroke according to an aspect of the invention.
Figure 6A:
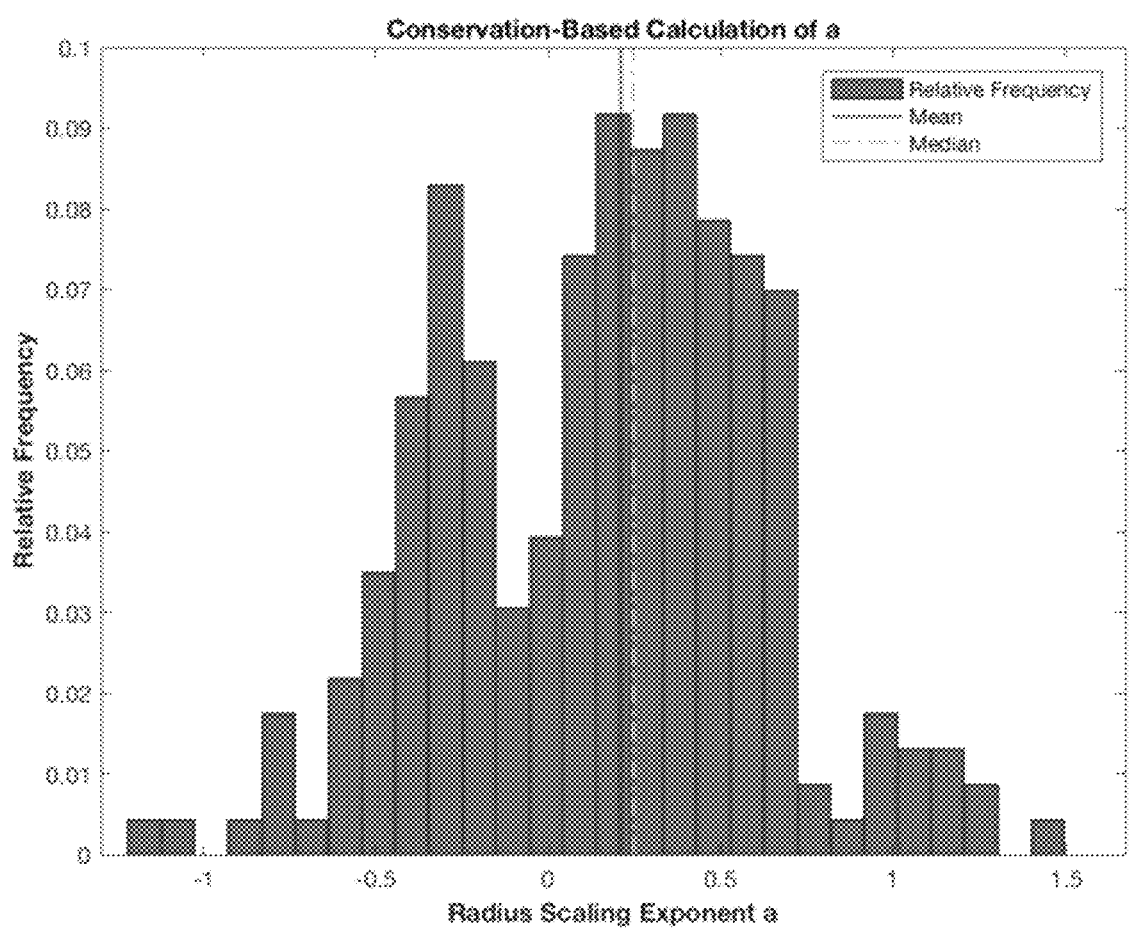
FIG. 6A shows a sample graph of the results of conservation-based calculation of the radial exponent (a) from non-stroke brain vasculature (non-ischemic hemisphere) according to an aspect of the invention.
Figure 6B:
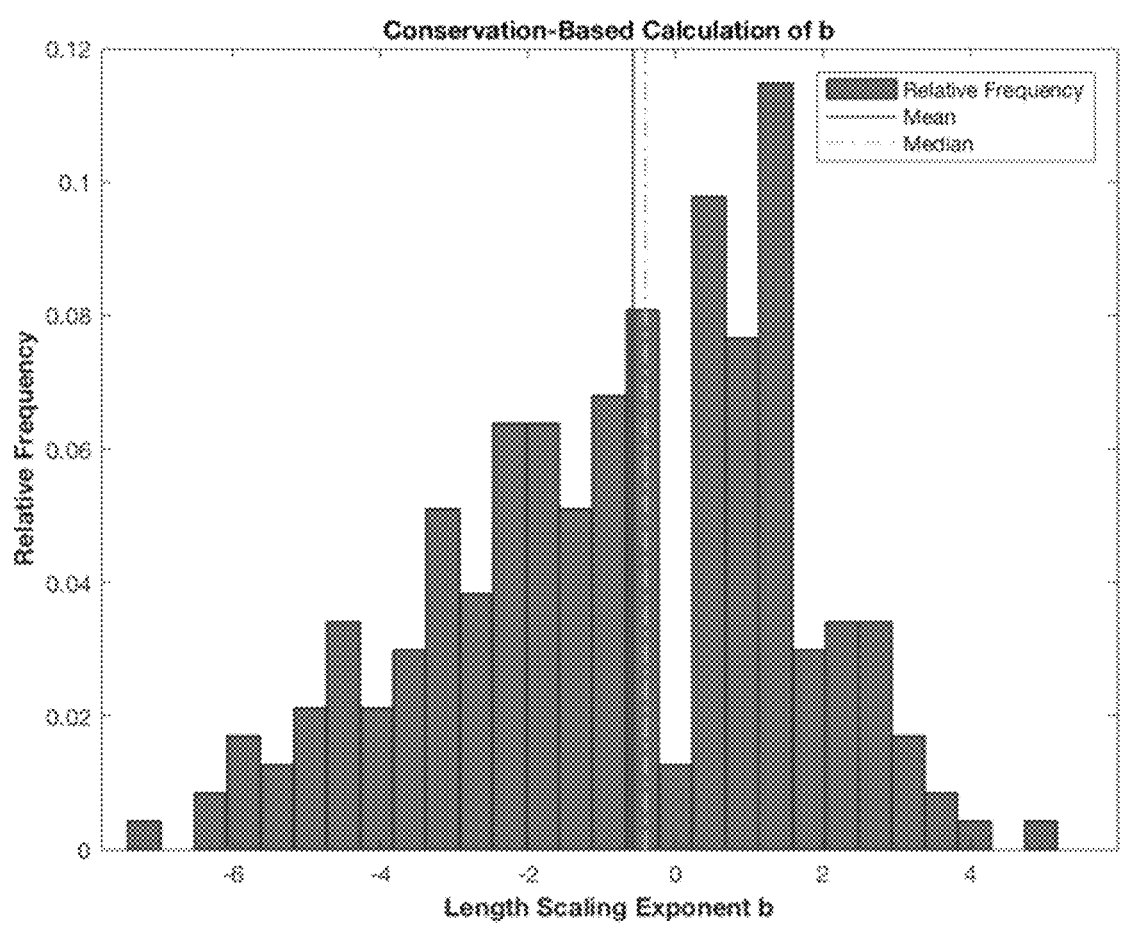
FIG. 6B shows a sample graph of the results of conservation-based calculation of the length scaling exponent (b) from non-stroke brain vasculature (non-ischemic hemisphere) according to an aspect of the invention.
Figure 10A:
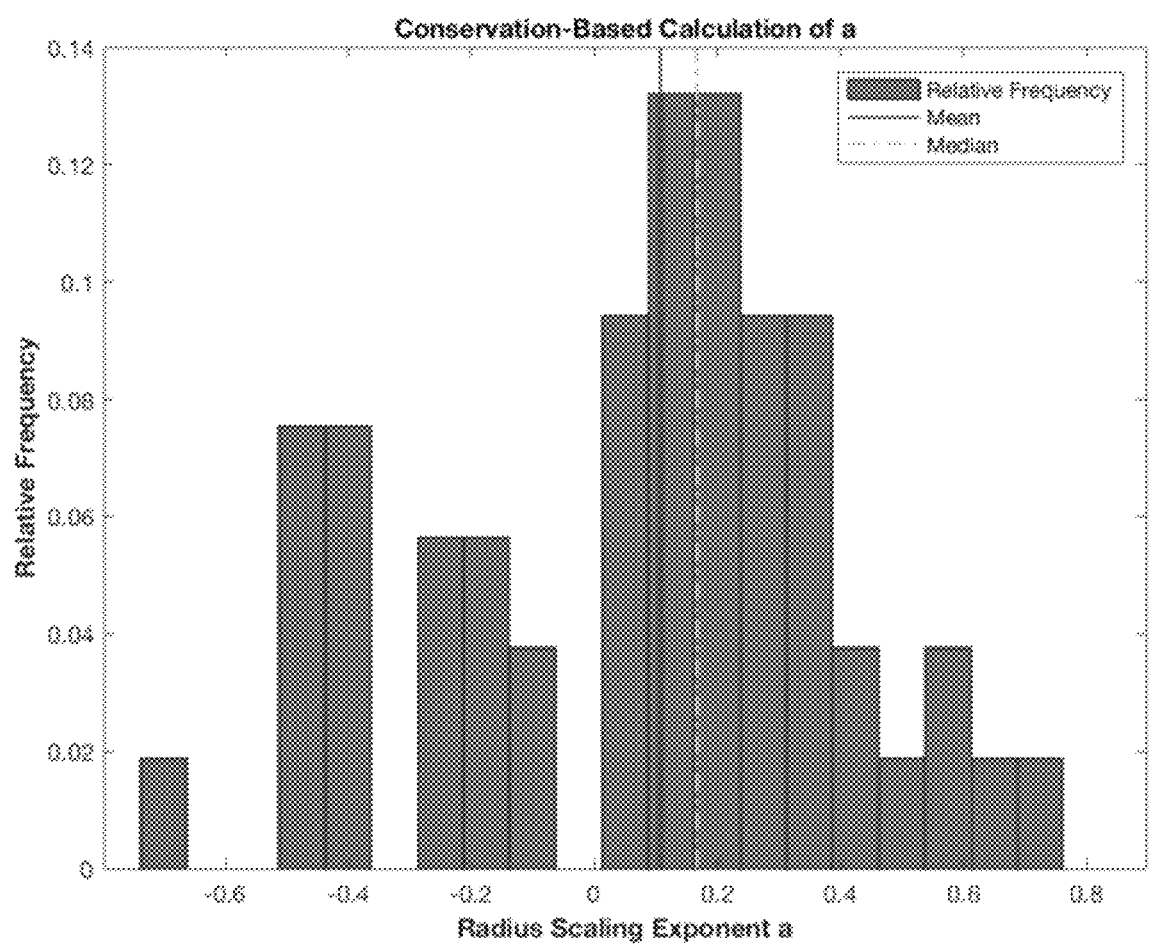
FIG. 10A shows a sample graph of the distribution of conservation-based calculations of the radial exponent (a) from post-stroke vasculature in the peri-infarct region according to an aspect of the invention.
Figure 10B:
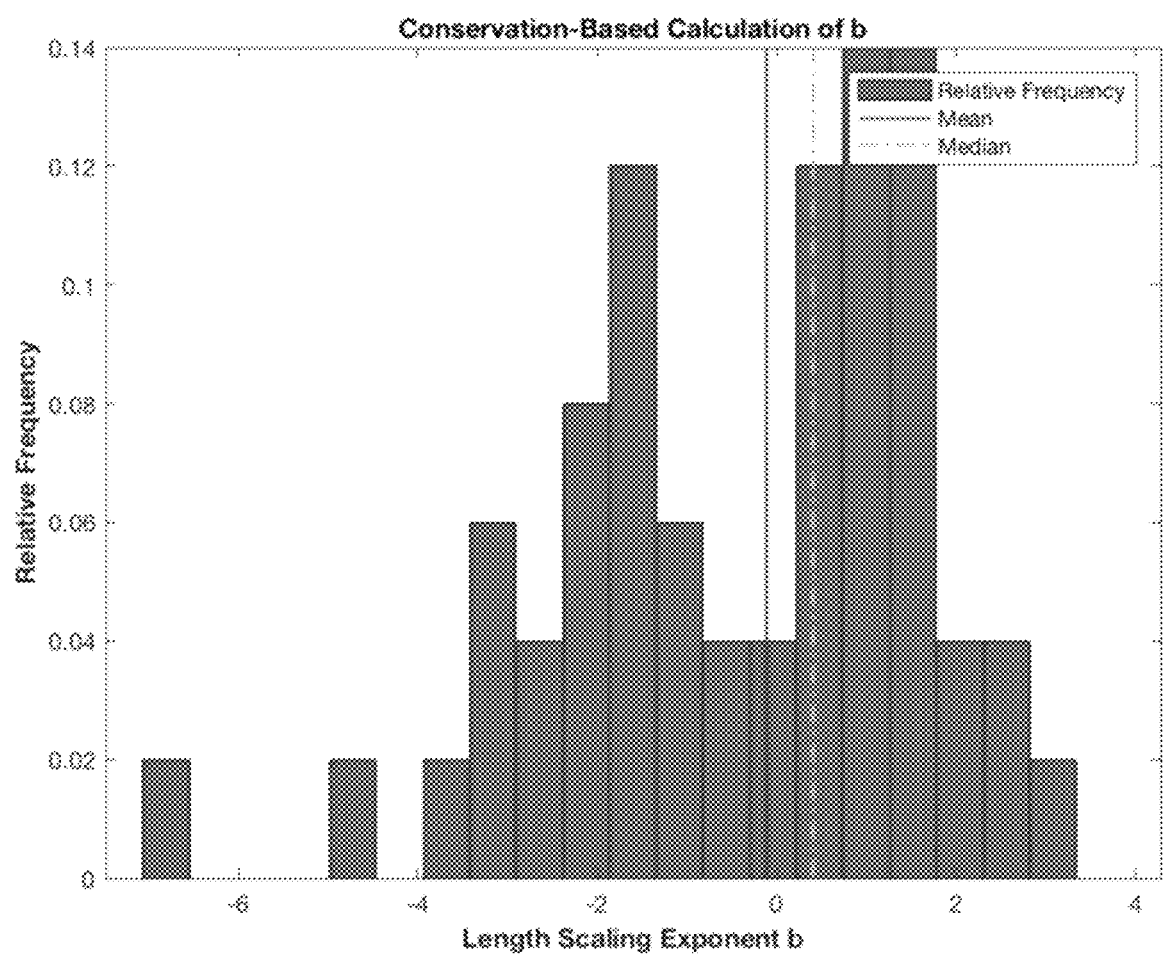
FIG. 10B shows a sample graph of the distribution of conservation-based calculations of the length scaling exponent (b) from post-stroke vasculature in the peri-infarct region according to an aspect of the invention.

In the above recited equations, $r_p$ is the radius of the parent vessel, $r_{c,i}$ is the radius of the ith child vessel, $l_p$ is the length of the parent vessel, and $l_{c,i}$ is the length of ith child vessel. The mean, median, and standard deviation of the conservation-based scaling exponents for each vessel in the vasculature may then be computed. FIG. 5A shows a sample graph of the distribution of conservation-based calculations of the radial exponent (a) from brain vasculature after the onset of ischemic stroke obtained via experiment. FIG. 6A shows a sample graph of the results of conservation-based calculation of the radial exponent (a) from non-stroke brain vasculature (non-ischemic hemisphere) obtained via experiment. FIG. 10A shows a sample graph of the distribution of conservation-based calculation of the radial exponent (a) from post-stroke vasculature in the peri-infract region obtained via experiment. FIG. 5B shows a sample graph of the distribution of conservation-based calculation of the length scaling exponent (b) from brain vasculature after the onset of ischemic stroke obtained via experiment. FIG. 6B shows a sample graph of the results of conservation-based calculation of the length scaling exponent (b) from non-stroke brain vasculature (non-ischemic hemisphere) obtained via experiment. FIG. 10B shows a sample graph of the distribution of conservation-based calculation of the length scaling exponent (b) from post-stroke vasculature in the peri-infarct obtained via experiment.

For each branching junction in the vasculature, the ratio-based scaling exponents may be computed using the following equations:

$$a = -\log_2 \beta \qquad \text{Equation 9}$$

$$b = -\log_2 \gamma \qquad \text{Equation 10}$$

Figure 5C:
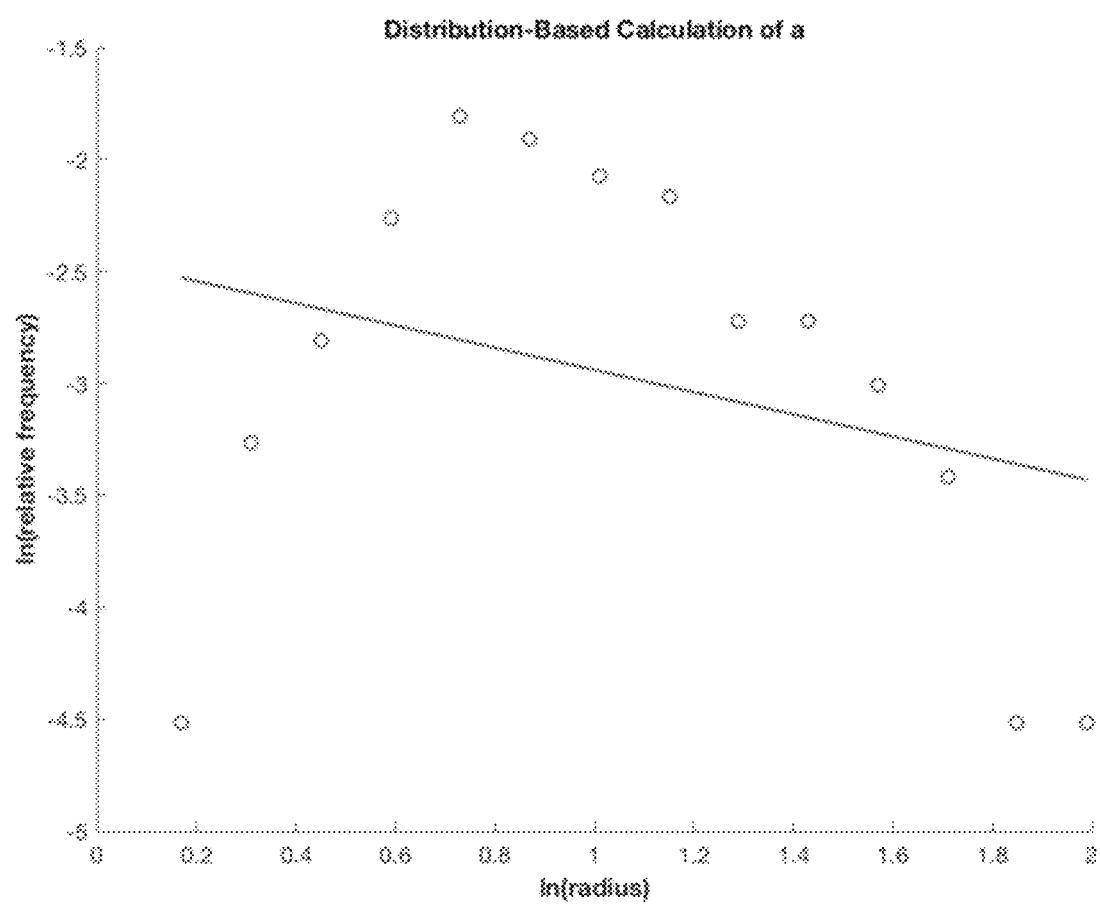
FIG. 5C shows a distribution-based calculation of the radial exponent (a) from brain vasculature after the onset of ischemic stroke according to an aspect of the invention.
Figure 5G:
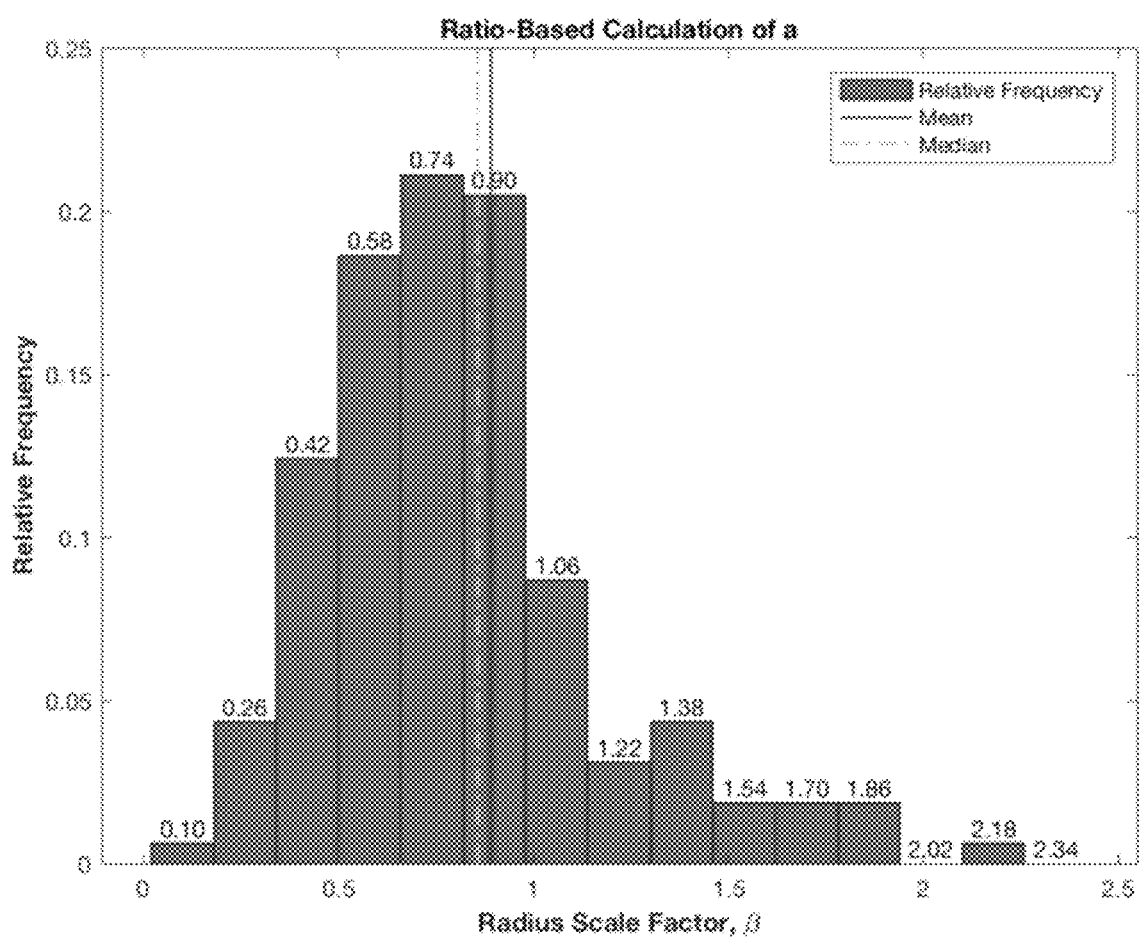
FIG. 5G shows a sample graph of the results of ratio-based calculation of the radial exponent (a) from ischemic stroke according to an aspect of the invention.
Figure 5H:
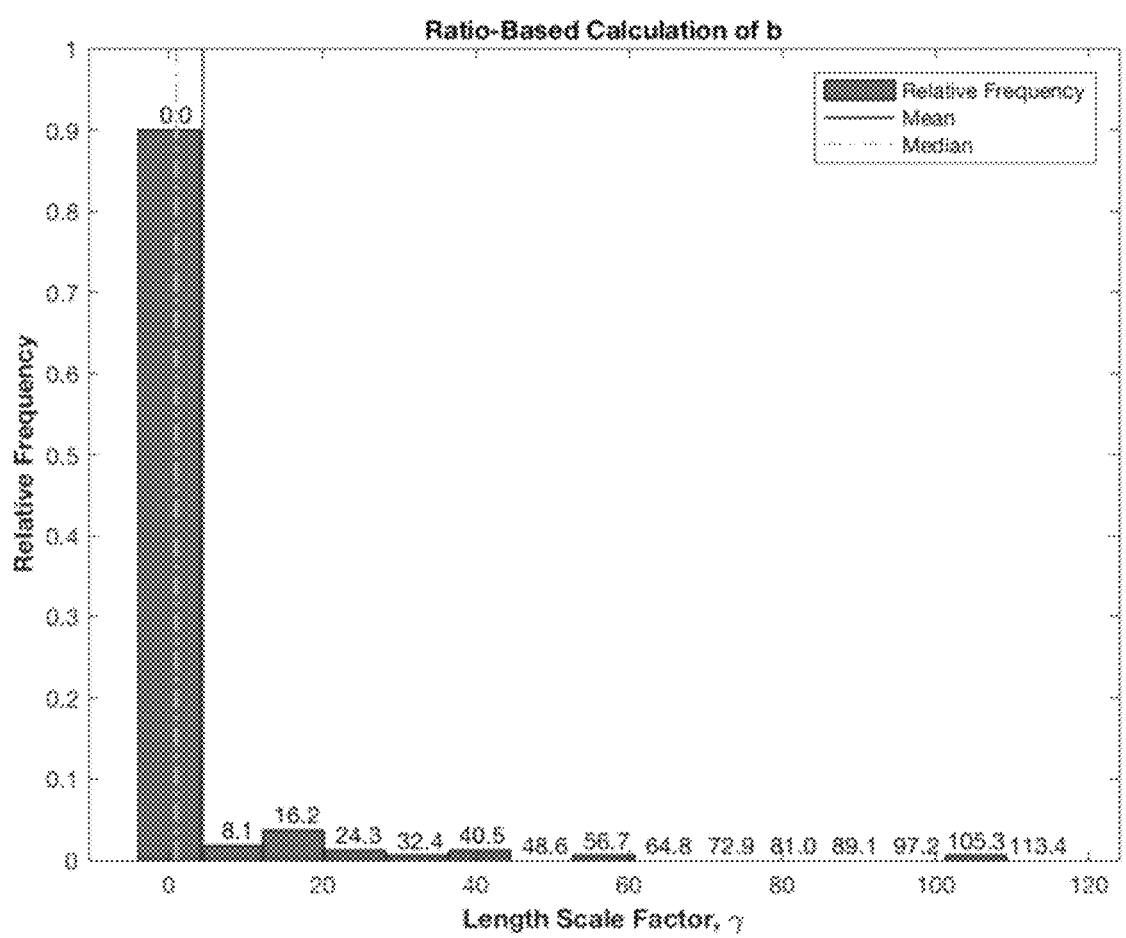
FIG. 5H shows a sample graph of the results of ratio-based calculation of the length scaling exponent (b) from ischemic stroke according to an aspect of the invention.
Figure 51:
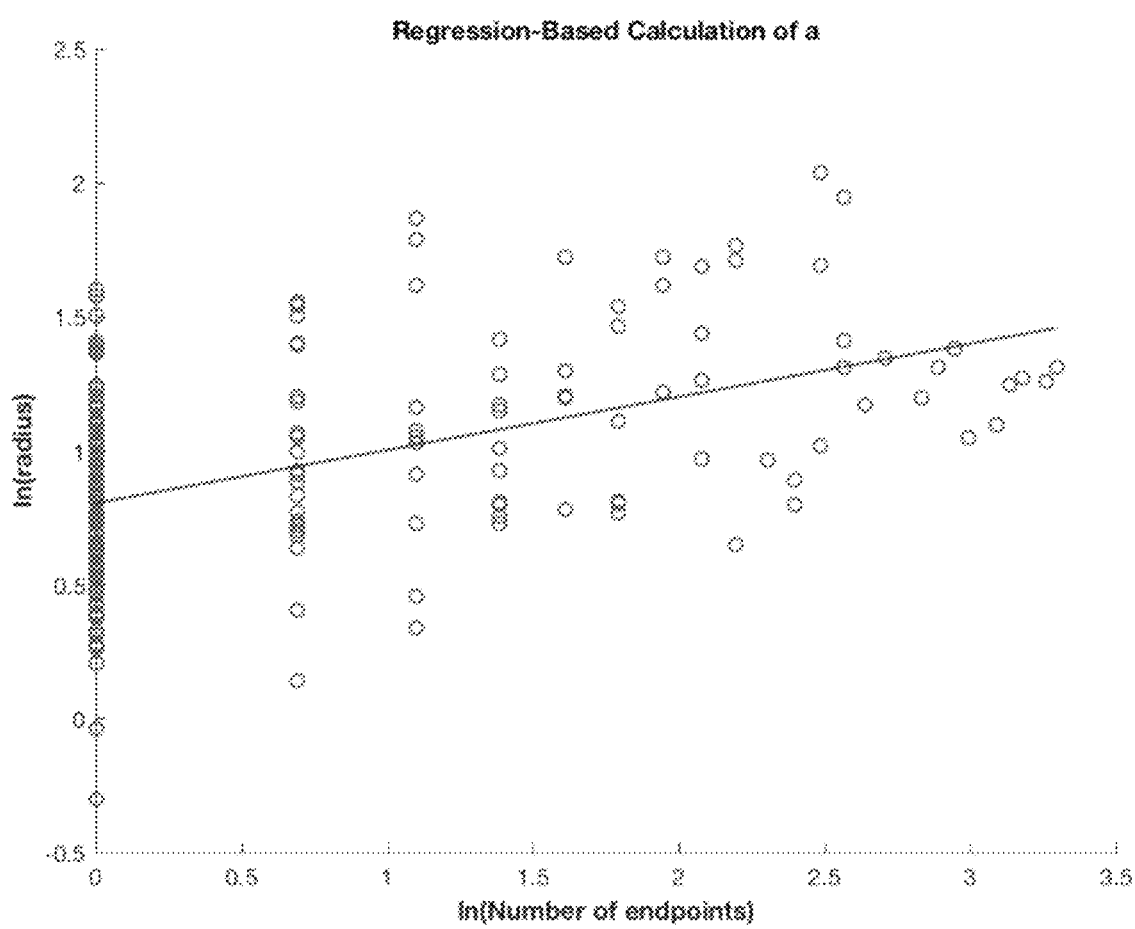
Figure 6C:
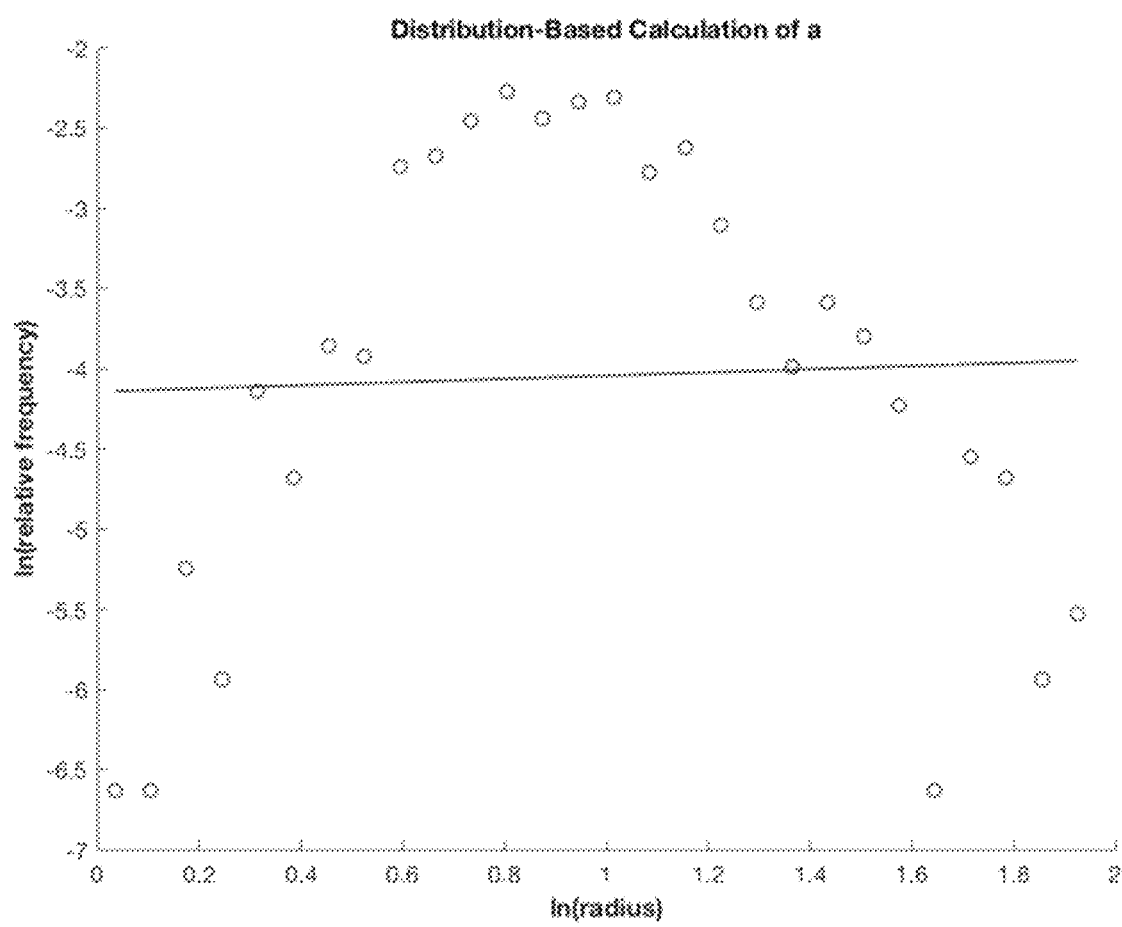
FIG. 6C shows a distribution-based calculation of the radial exponent (a) from non-stroke brain vasculature (non-ischemic hemisphere) according to an aspect of the invention.
Figure 6D:
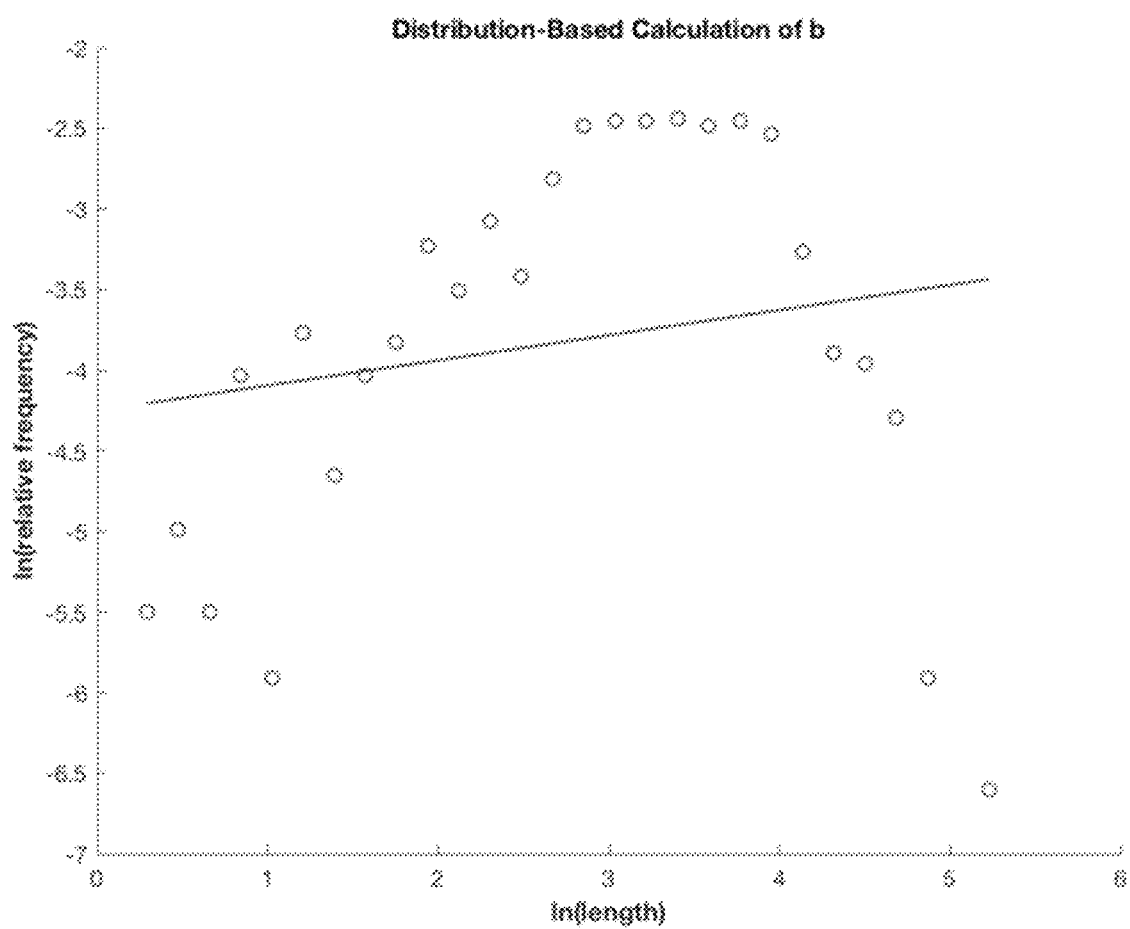
FIG. 6D shows a distribution-based calculation of the length scaling exponent (b) from non-stroke brain vasculature (non-ischemic hemisphere) according to an aspect of the invention.
Figure 6E:
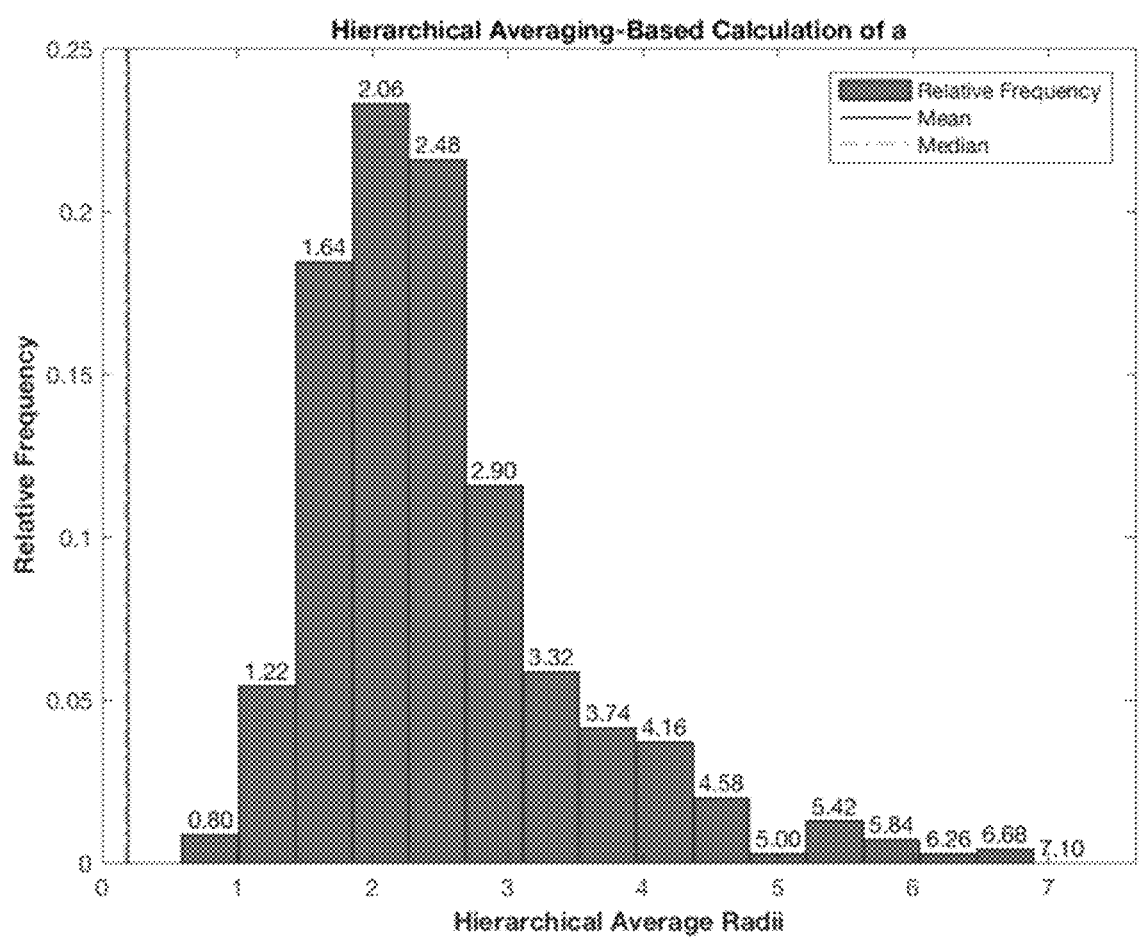
FIG. 6E shows a hierarchical averaging-based calculation of the radial exponent (a) from non-stroke brain vasculature (non-ischemic hemisphere) according to an aspect of the invention.
Figure 6F:
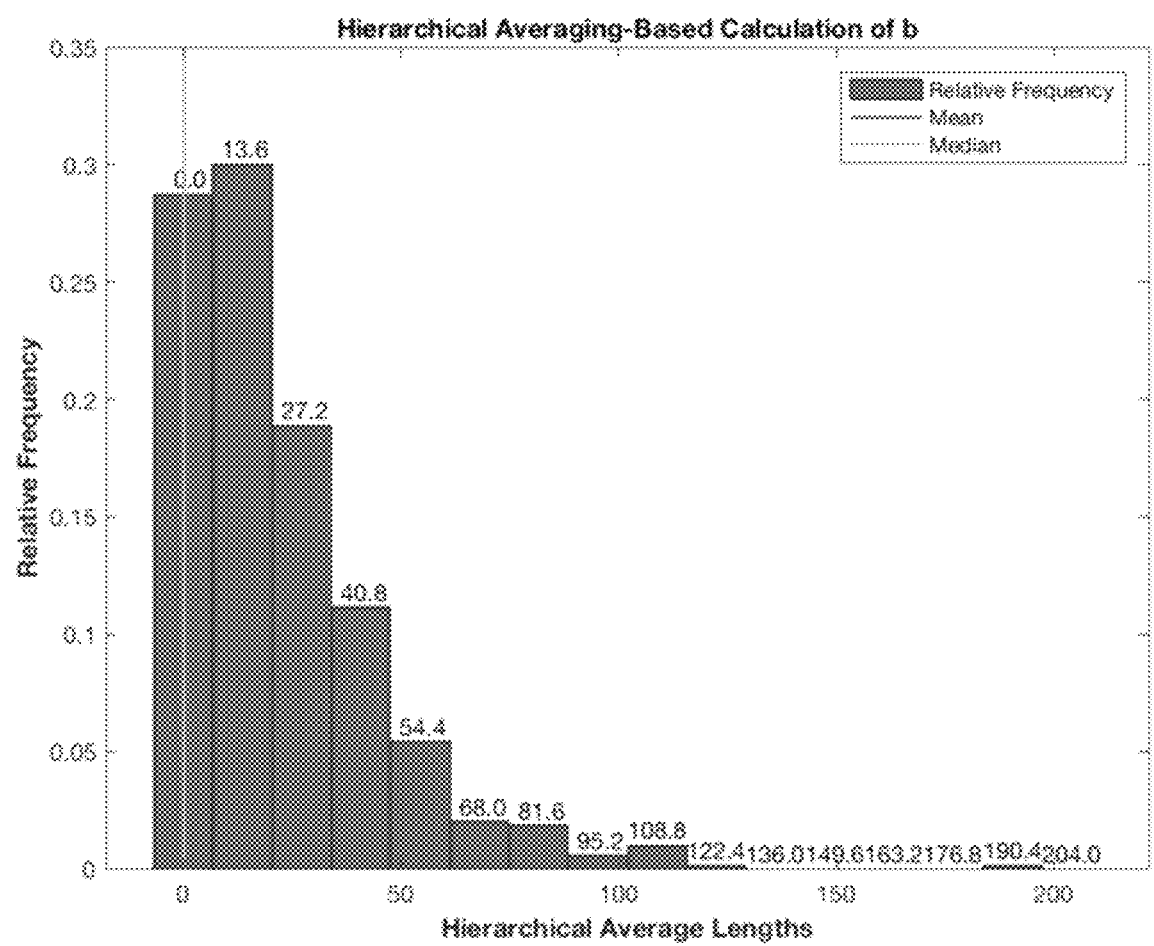
FIG. 6F shows a hierarchical averaging-based calculation of the length scaling exponent (b) from non-stroke brain vasculature (non-ischemic hemisphere) according to an aspect of the invention.
Figure 6G:
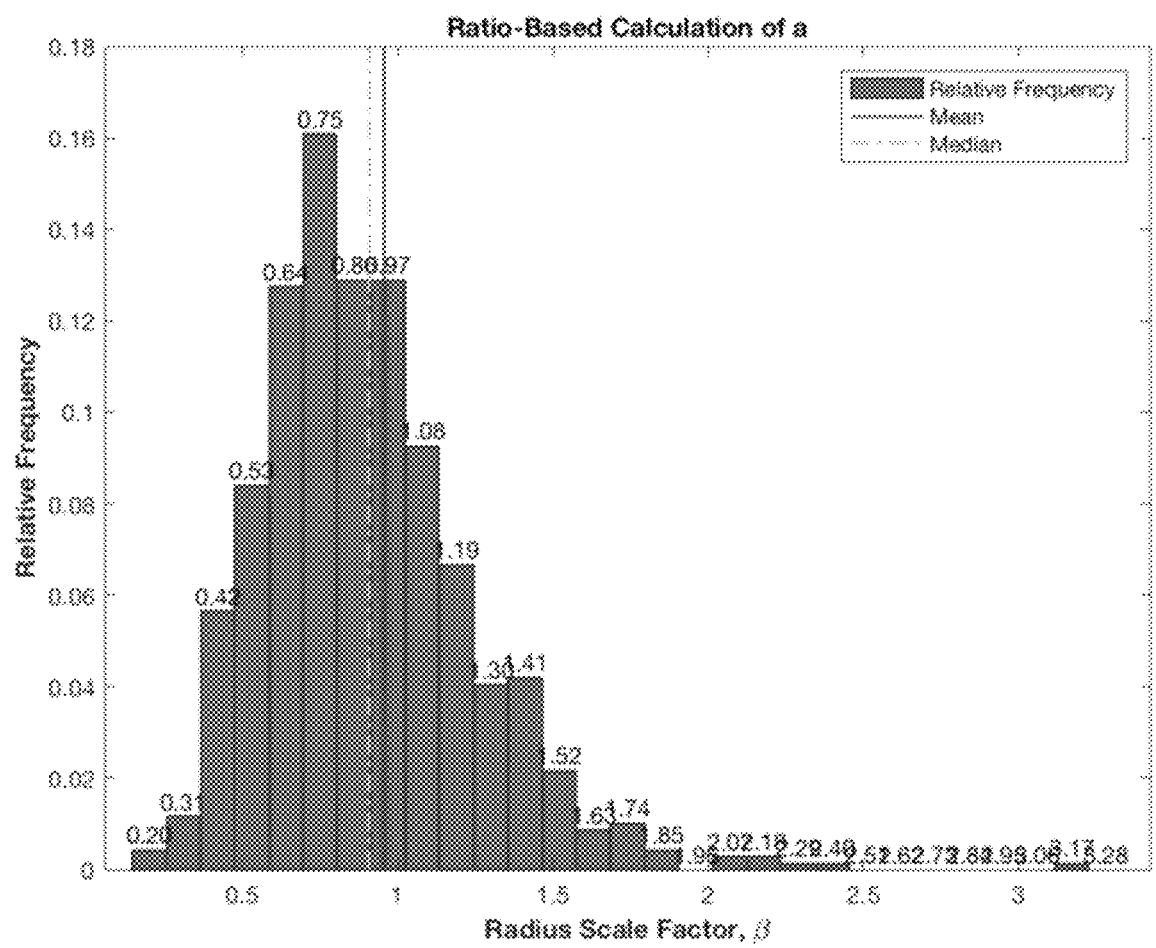
FIG. 6G shows a sample graph of the results of ratio-based calculation of the radial exponent (a) from non-stroke brain vasculature (non-ischemic hemisphere) according to an aspect of the invention.
Figure 6H:
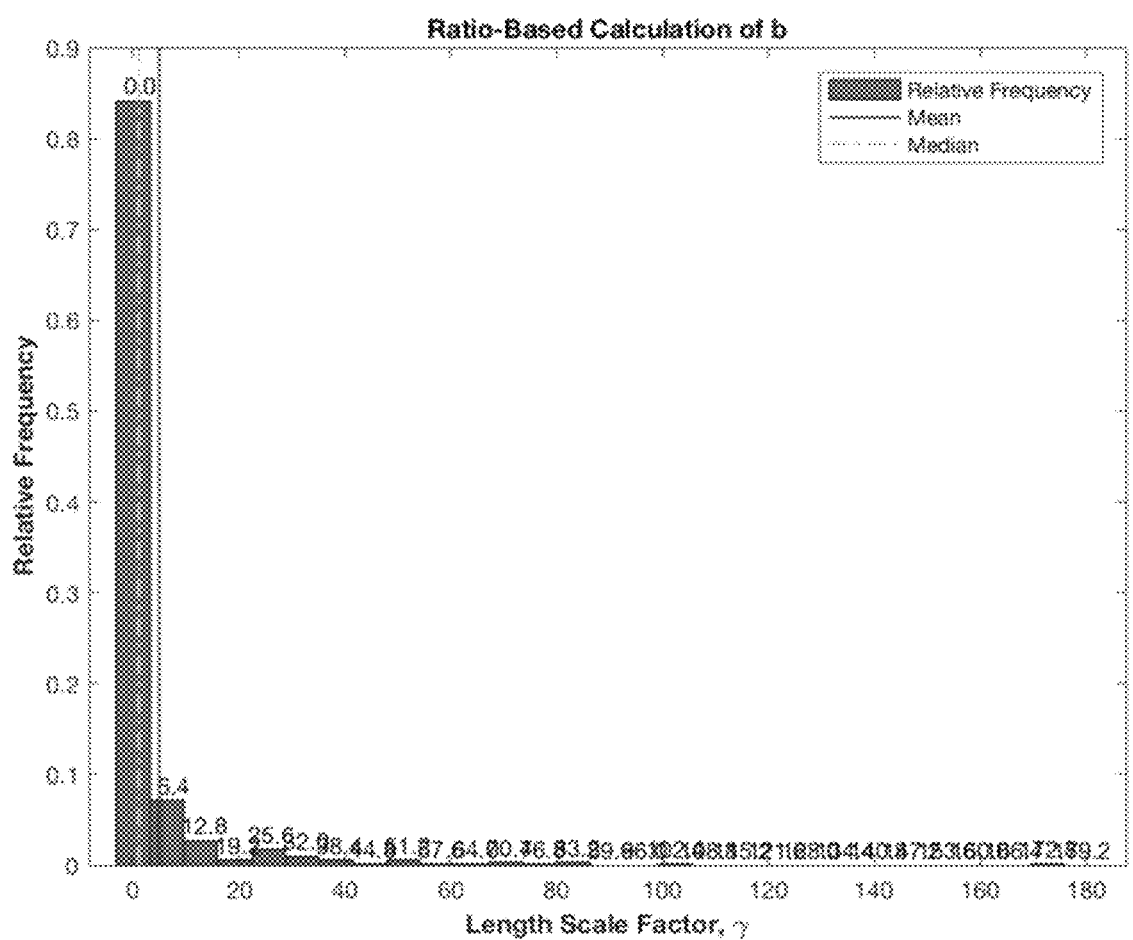
FIG. 6H shows a sample graph of the results of ratio-based calculation of the length scaling exponent (b) from non-stroke brain vasculature (non-ischemic hemisphere) according to an aspect of the invention.
Figure 10C:
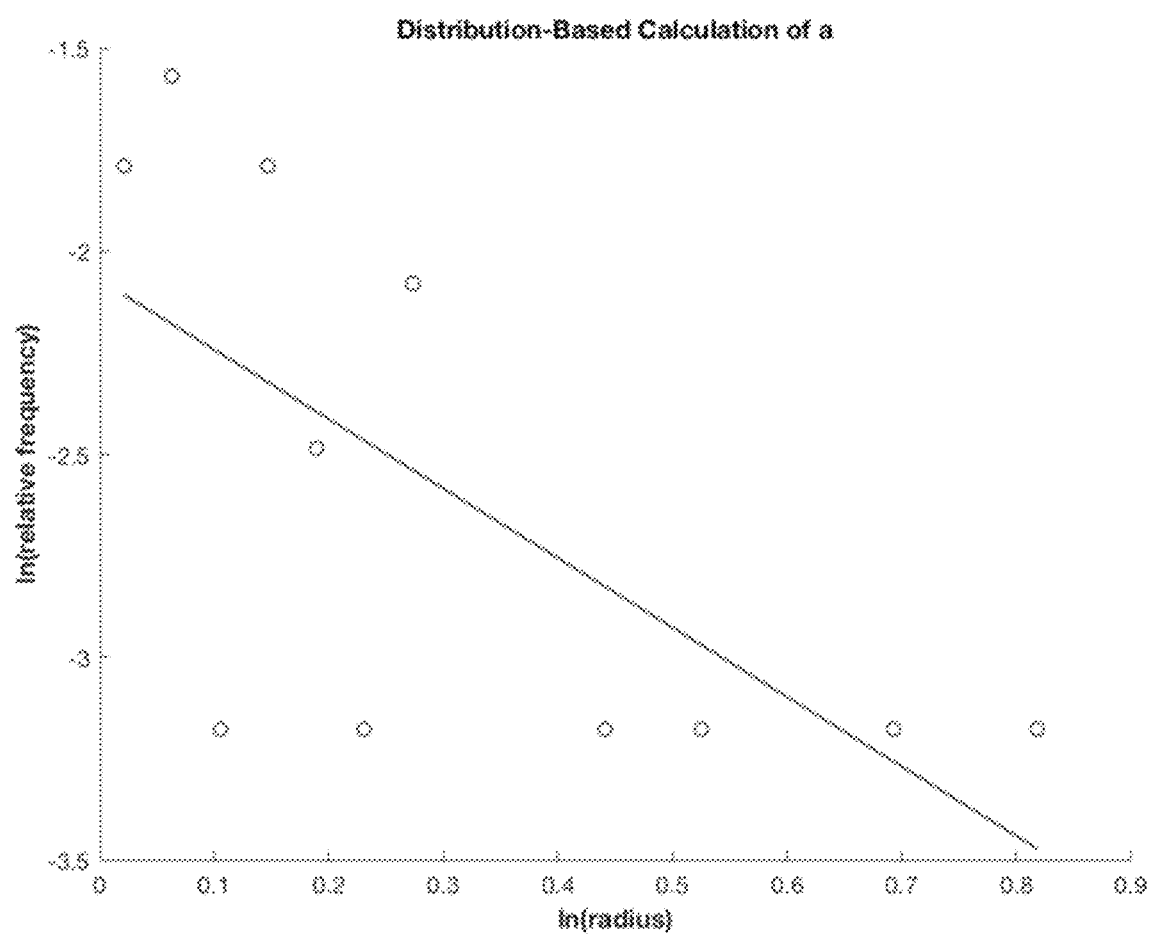
FIG. 10C shows a sample graph of the results of distribution-based calculation of the radial exponent (a) from post-stroke vasculature in the peri-infarct region according to an aspect of the invention.
Figure 10D:
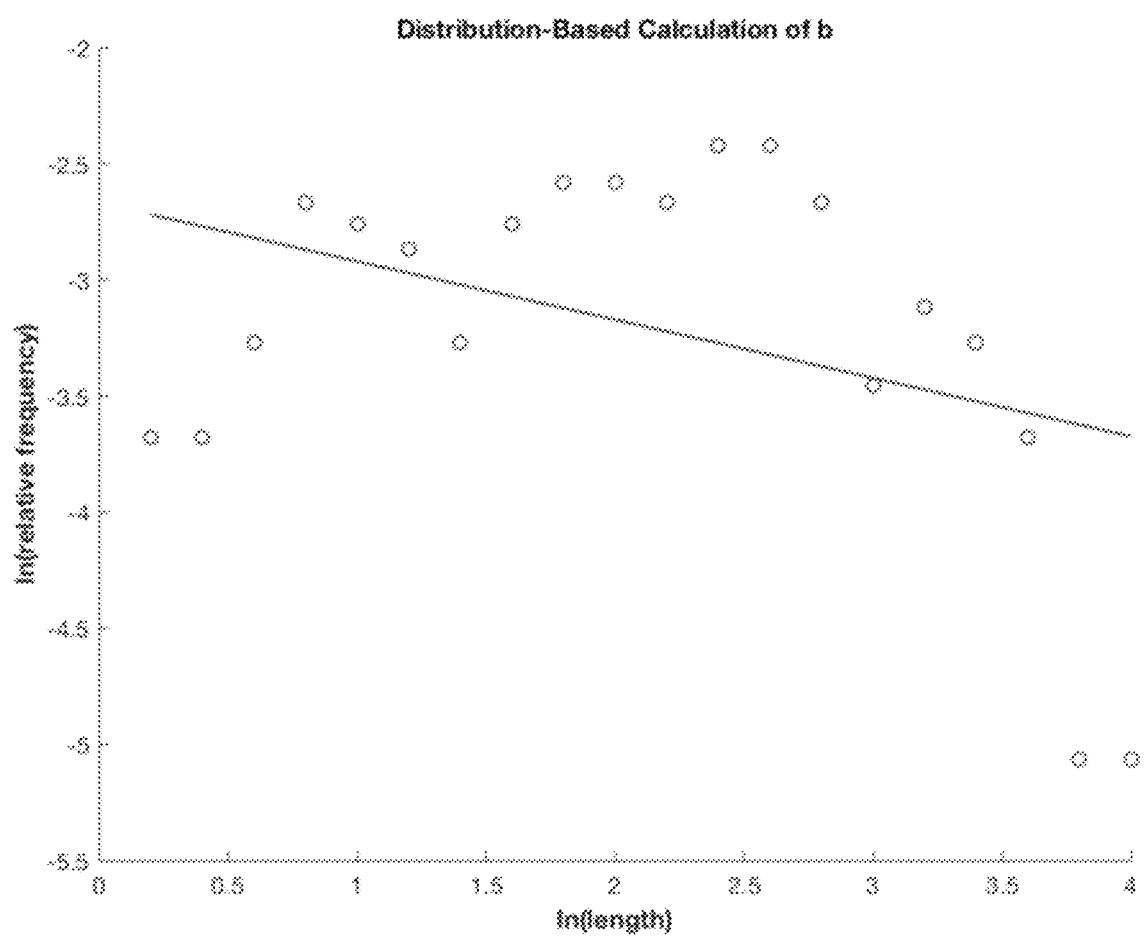
FIG. 10D shows a sample graph of the results of distribution-based calculation of the length scaling exponent (b) from vasculature in the peri-infarct region of the brain according to an aspect of the invention.
Figure 10E:
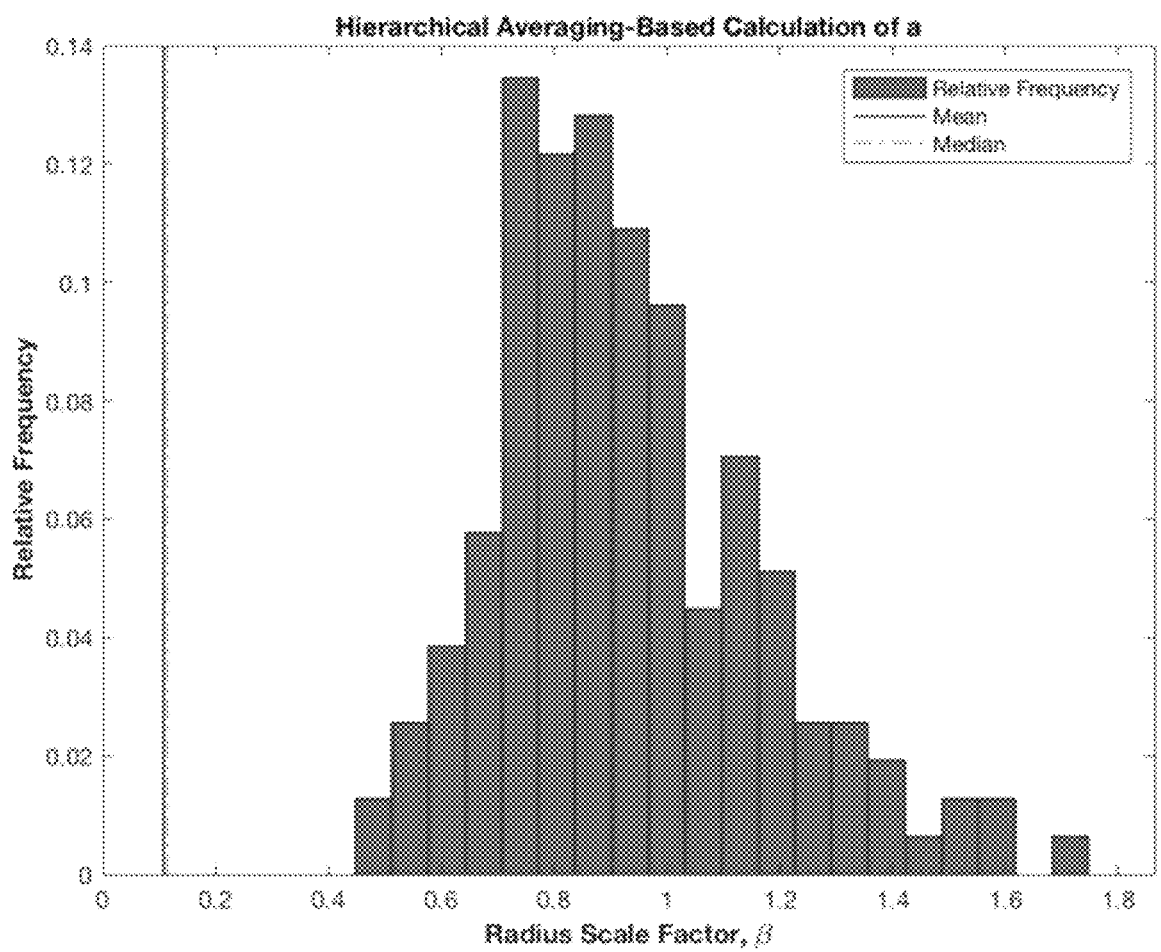
FIG. 10E shows a hierarchical averaging-based calculation of the radial exponent (a) from post-stroke vasculature in the peri-infarct region according to an aspect of the invention.
Figure 10F:
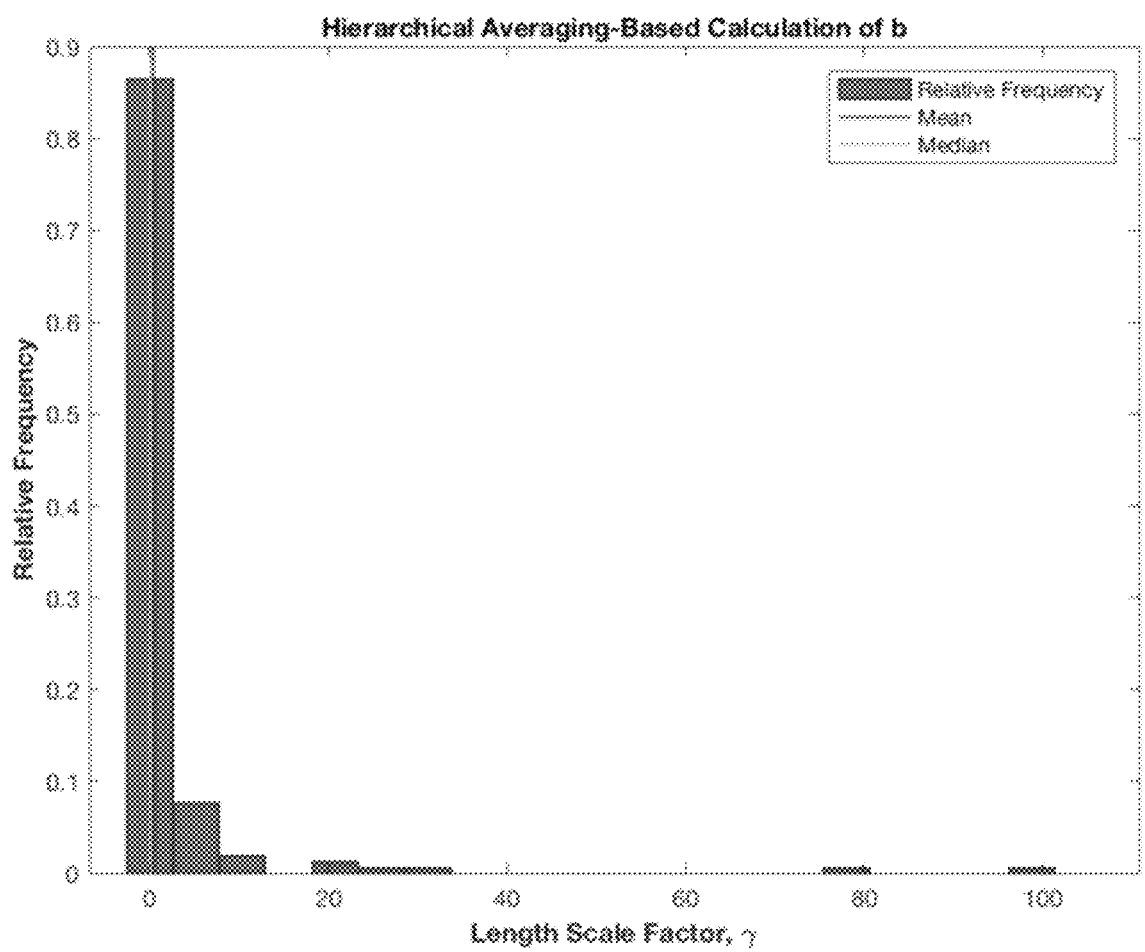
FIG. 10F shows a hierarchical averaging-based calculation of the length scaling exponent (b) from post-stroke vasculature in the peri-infarct region according to an aspect of the invention.
Figure 10G:
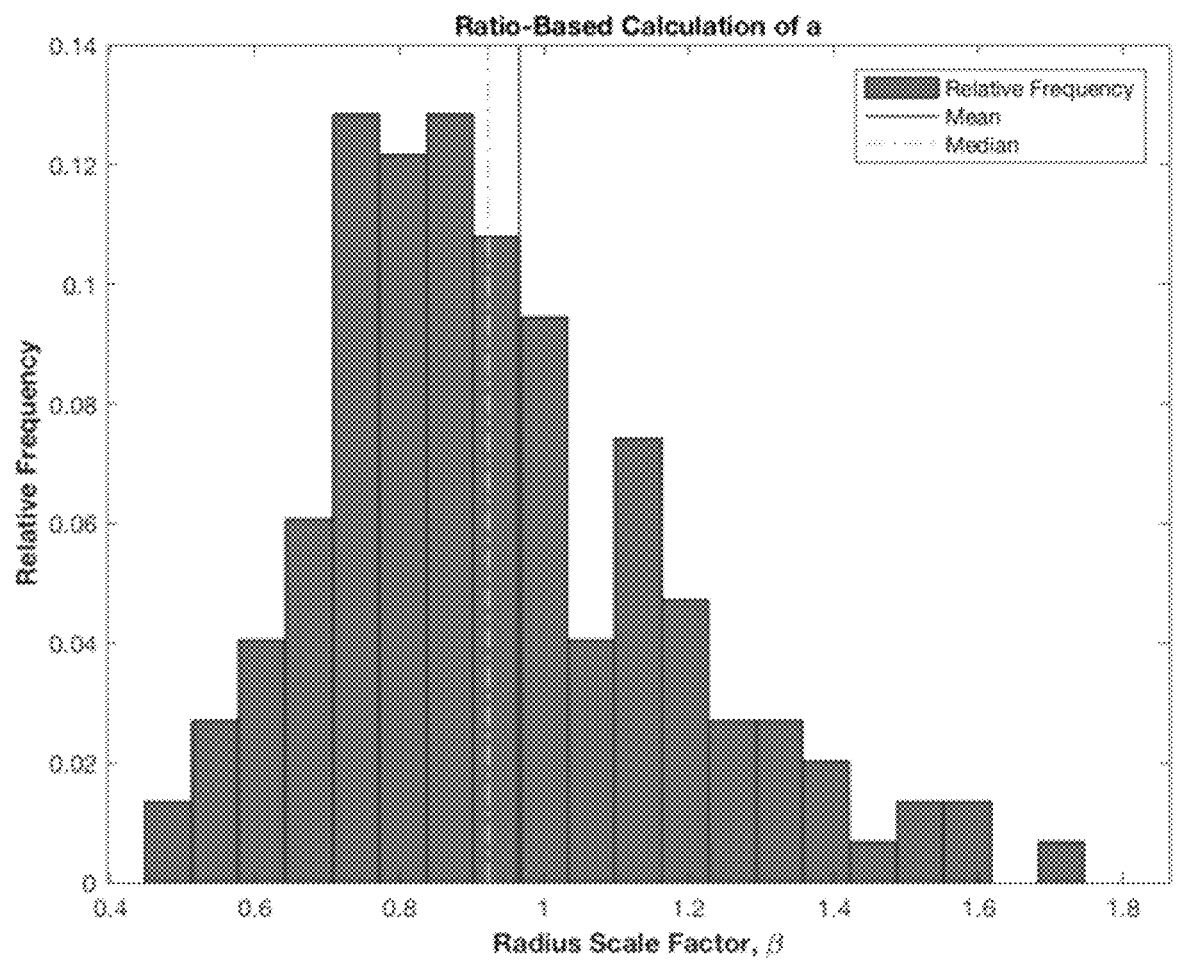
FIG. 10G shows a distribution of ratio-based calculations of the radial exponent (a) from post-stroke vasculature in the peri-infarct region according to an aspect of the invention.
Figure 10H:
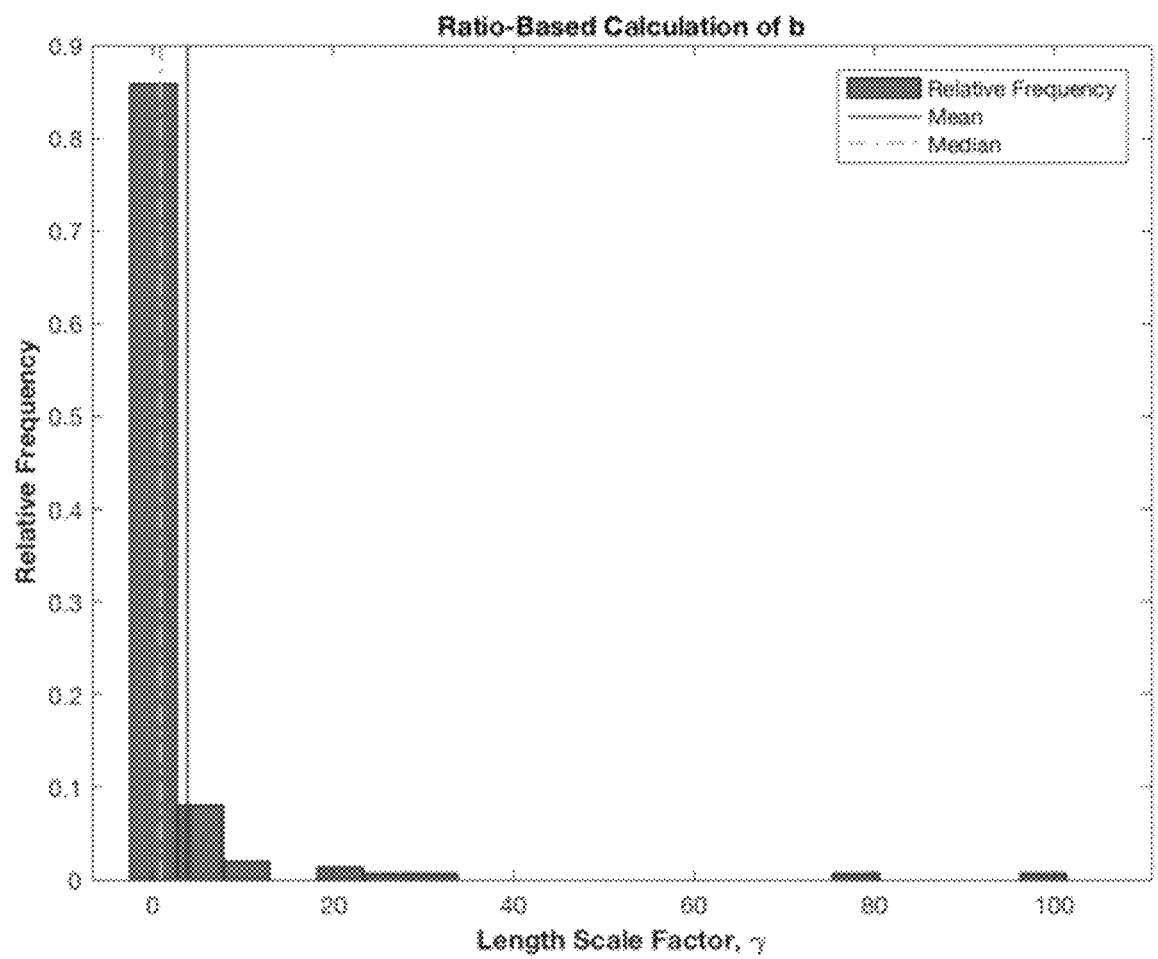
FIG. 10H shows a distribution of ratio-based calculations of the length scaling exponent (b) from post-stroke vasculature in the peri-infarct region according to an aspect of the invention.

The mean, median, and standard deviation of the ratio-based scaling exponents of each vessel in the vasculature may then be computed. FIG. 5G shows a sample graph of the results of ratio-based calculation of the radial exponent (a) from post-stroke vasculature (ischemic hemisphere) obtained via experiment. FIG. 6G shows a sample graph of the results of the ratio-based calculation of the radial exponent (a) from non-stroke brain vasculature (non-ischemic hemisphere) obtained via experiment. FIG. 10G shows a distribution of ratio-based calculations of the radial exponent (a) from post-stroke vasculature (peri-infarct) obtained via experiment. FIG. 5H shows a sample graph of the results of ratio-based calculation of the length scaling exponent (b) from post-stroke vasculature (ischemic hemisphere) obtained via experiment. FIG. 6H shows a sample graph of the results of ratio-based calculation of the length scaling exponent (b) from non-stroke brain vasculature (non-ischemic hemisphere) obtained via experiment. FIG. 10H shows a distribution of ratio-based calculation of the length scaling exponent (b) from post-stroke vasculature in the peri-infarct region obtained via experiment.

For each vessel in the vasculature, the vessel radius and length may be recorded. The radii and lengths may be binned into branching hierarchies of the vasculature. The ratio-based scaling exponent may then be calculated for each bin. The mean, median, and standard deviation of the hierarchical averaging scaling exponents for each vessel in the vasculature may then be computed. FIG. 5E shows a hierarchical averaging-based calculation of the radial exponent (a) from ischemic stroke obtained via experiment. FIG. 6E shows a hierarchical averaging-based calculation of the radial exponent (a) from non-stroke brain vasculature (non-ischemic hemisphere) obtained via experiment. FIG. 10E shows a hierarchical averaging-based calculation of the radial exponent (a) from post-stroke vasculature in the peri-infarct obtained via experiment. FIG. 5F shows a hierarchical averaging-based calculation of the length scaling exponent (b) from ischemic stroke obtained via experiment. FIG. 6F shows a hierarchical averaging-based calculation of the length scaling exponent (b) from non-stroke brain vasculature (non-ischemic hemisphere) obtained via experiment. FIG. 10F shows a hierarchical averaging-based calculation of the length scaling exponent (b) from post-stroke vasculature in the peri-infarct region obtained via experiment.

For the distribution-based scaling exponents and regression-based scaling exponents, the bins may be equally-spaced intervals ranging from the smallest data to the largest data in the set. The number of bins may be approximately equal to the square root of the number of vessels in the vasculature.

The distribution-based scaling exponents a and b may be computed using the following equations:

$$N = \left(\frac{r}{r_0}\right)^{-\frac{1}{a}} \quad \text{Equation 11}$$

$$N = \left(\frac{l}{l_0}\right)^{-\frac{1}{b}} \quad \text{Equation 12}$$

Figure 4A:
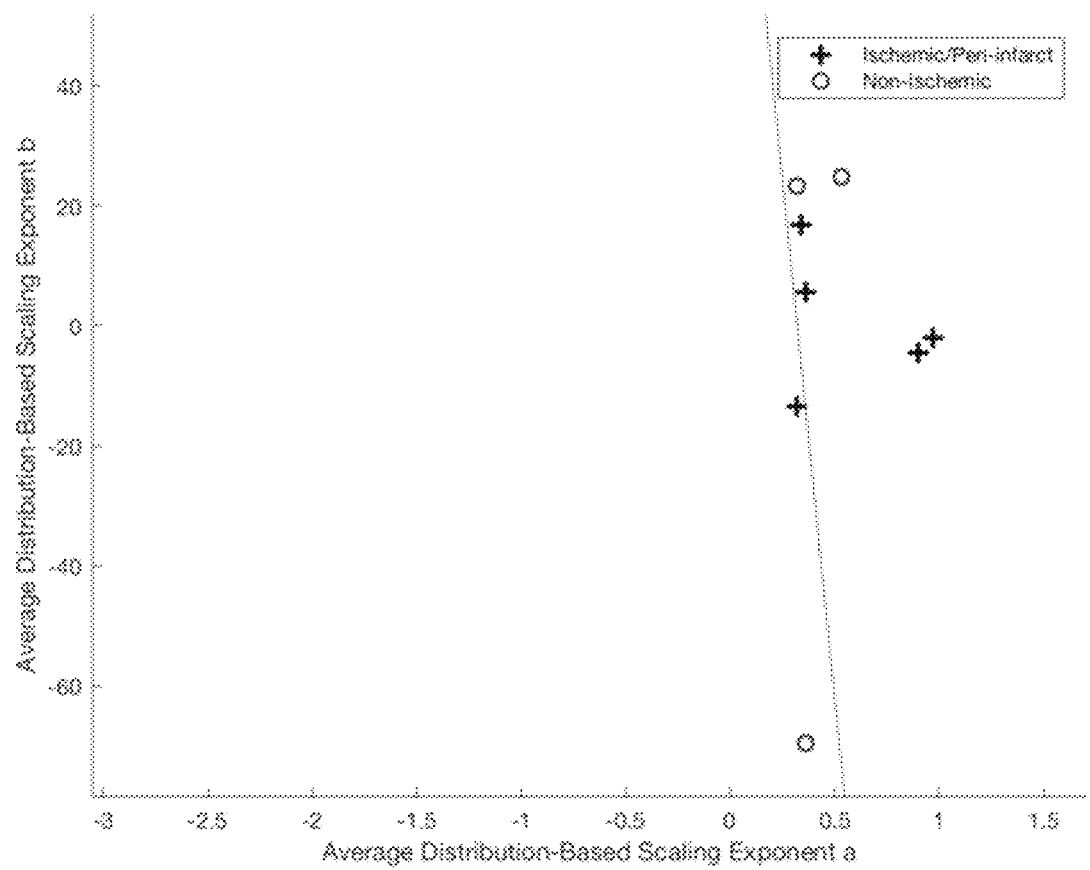
FIG. 4A shows a sample graph of machine learning results of distribution-based scaling exponents logistic regression according to an aspect of the invention.

In the above recited equations, N represents the number of vessels in the vasculature, $r_0$ is the radius of the initial vessel in the vasculature, and $l_0$ is the length of the initial vessel in the vasculature. Each vessel's radius and length for the vascular network may be binned. The radial distribution-based scaling exponents may be the slope of the line of best-fit in a log-log plot of vessel radius vs. relative frequency. The length distribution-based scaling exponent may be the slope of the line of best-fit in a log-log plot of vessel length vs. the relative frequency. FIG. 4A shows a sample graph of machine learning results of distribution-based scaling exponents logistic regression. FIG. 5C shows a distribution-based calculation of the radial exponent (a) from brain vasculature after the onset of ischemic stroke obtained via experiment. FIG. 6C shows a sample graph of the results of distribution-based calculation of the radial exponent (a) from non-stroke brain vasculature (non-ischemic hemisphere) obtained via experiment. FIG. 10C shows a sample graph of the results of distribution-based calculation of the radial exponent (a) from post-stroke vasculature in the peri-infarct obtained via experiment.

Figure 5D:
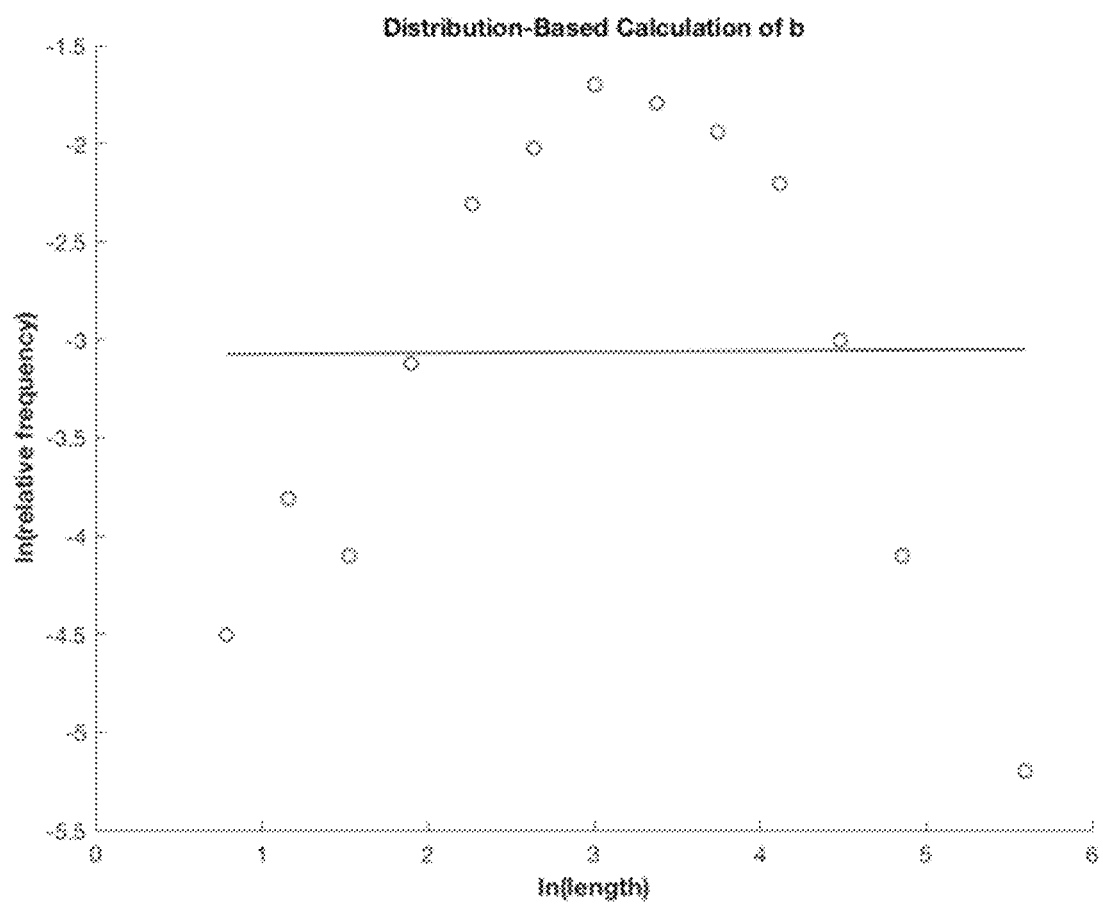
FIG. 5D shows a distribution-based calculation of the length scaling exponent (b) from brain vasculature after the onset of ischemic stroke according to an aspect of the invention.
Figure 5E:
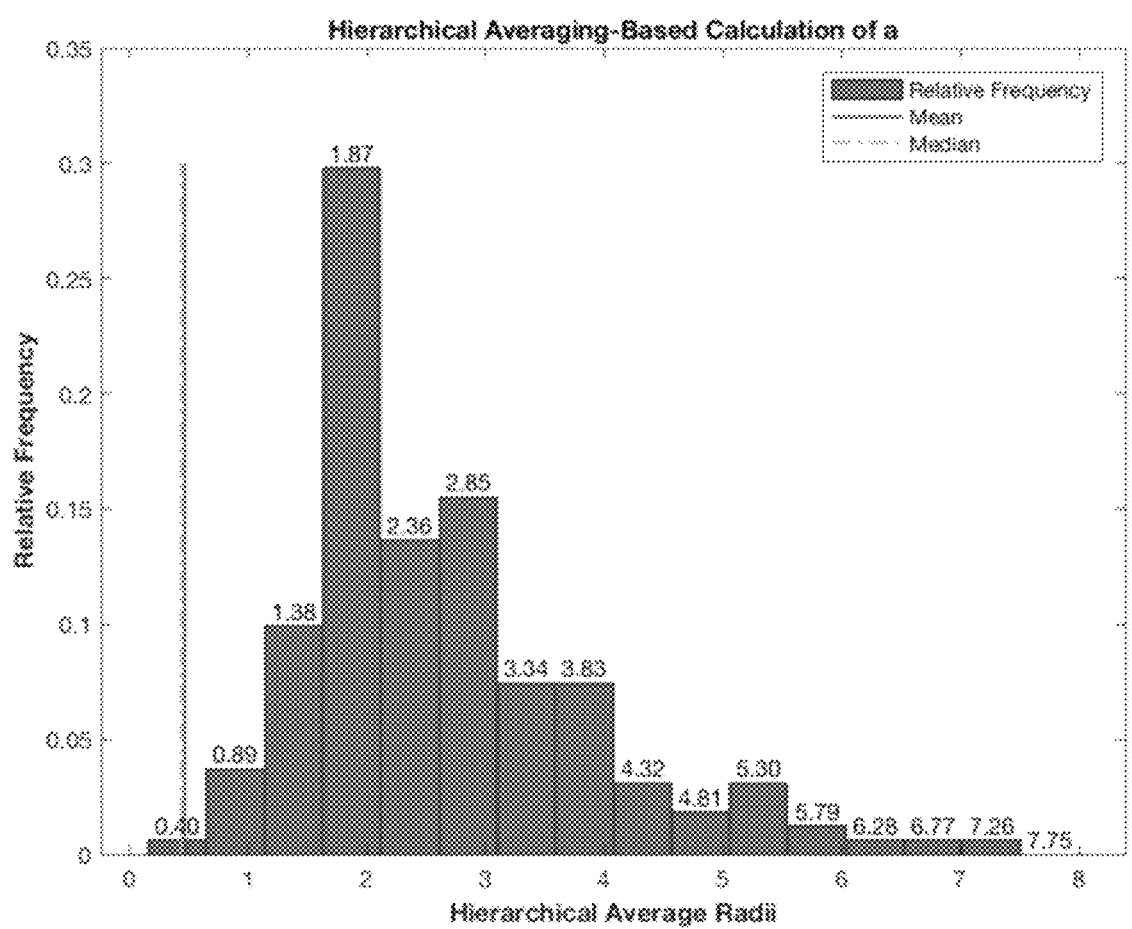
FIG. 5E shows a hierarchical averaging-based calculation of the radial exponent (a) from ischemic stroke according to an aspect of the invention.
Figure 5F:
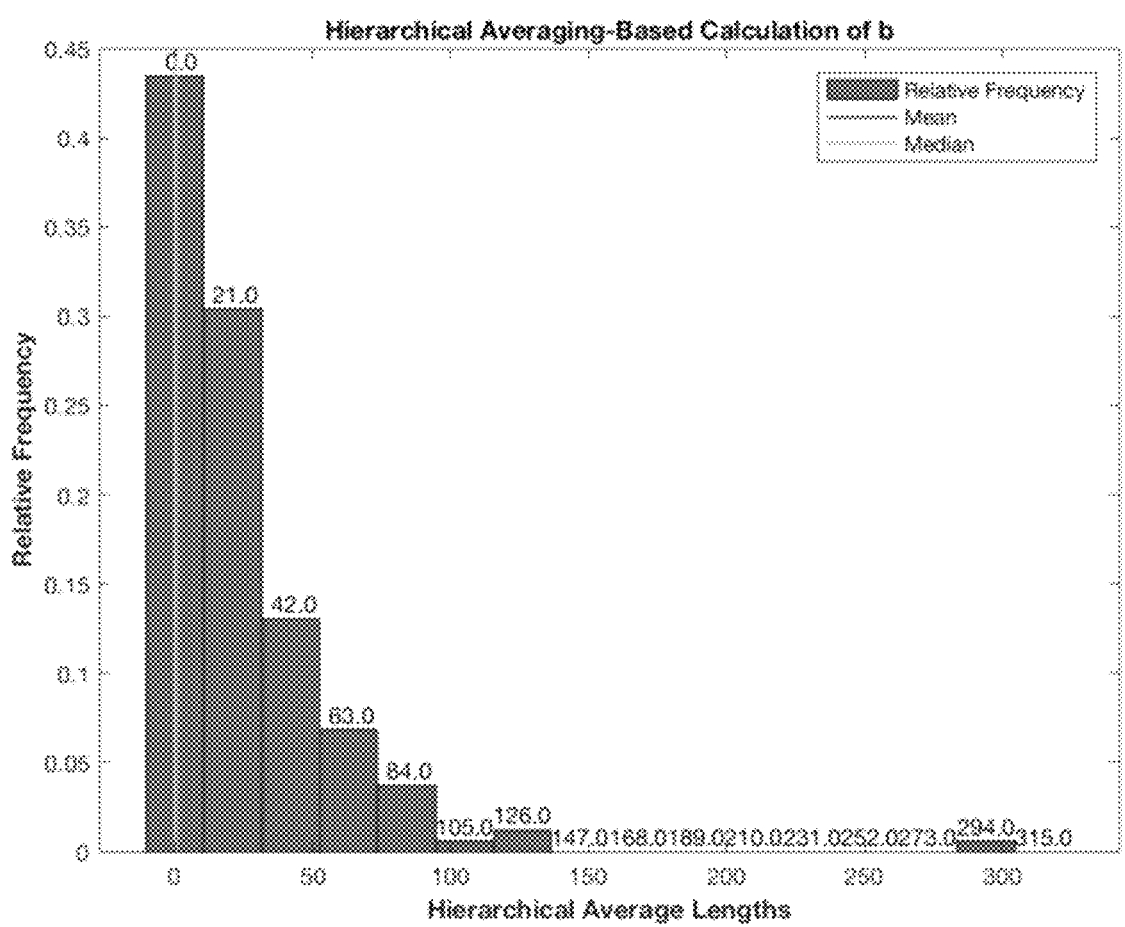
FIG. 5F shows a hierarchical averaging-based calculation of the length scaling exponent (b) from ischemic stroke according to an aspect of the invention.

FIG. 5D shows a distribution-based calculation of the length scaling exponent (b) from brain vasculature after the onset of ischemic stroke obtained via experiment. FIG. 6D shows a sample graph of the results of distribution-based calculation of the length scaling exponent (b) from non-stroke brain vasculature (non-ischemic hemisphere) obtained via experiment. FIG. 10D shows a sample graph of the results of distribution-based calculation of the length scaling exponent (b) from vasculature in the peri-infarct region of the brain obtained via experiment.

Figure 4B:
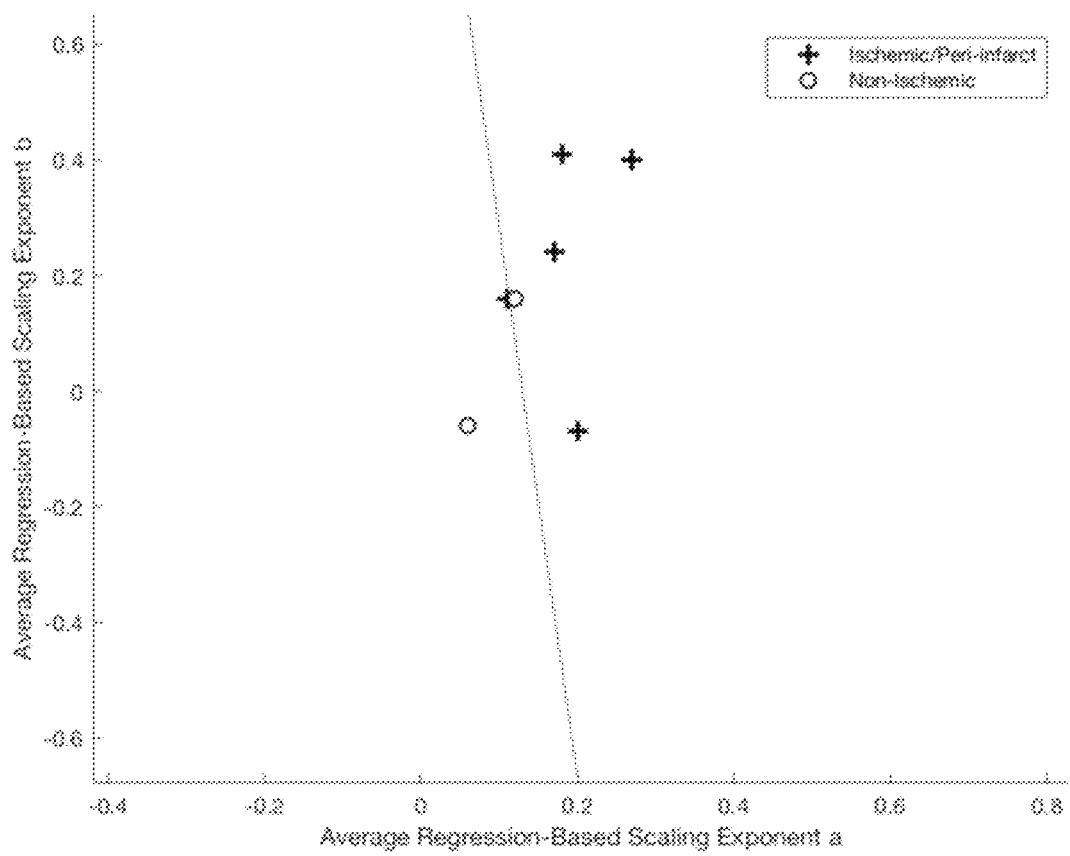
FIG. 4B shows a sample graph of machine learning results of regression-based scaling exponents logistic regression according to an aspect of the invention.
Figure 5J:
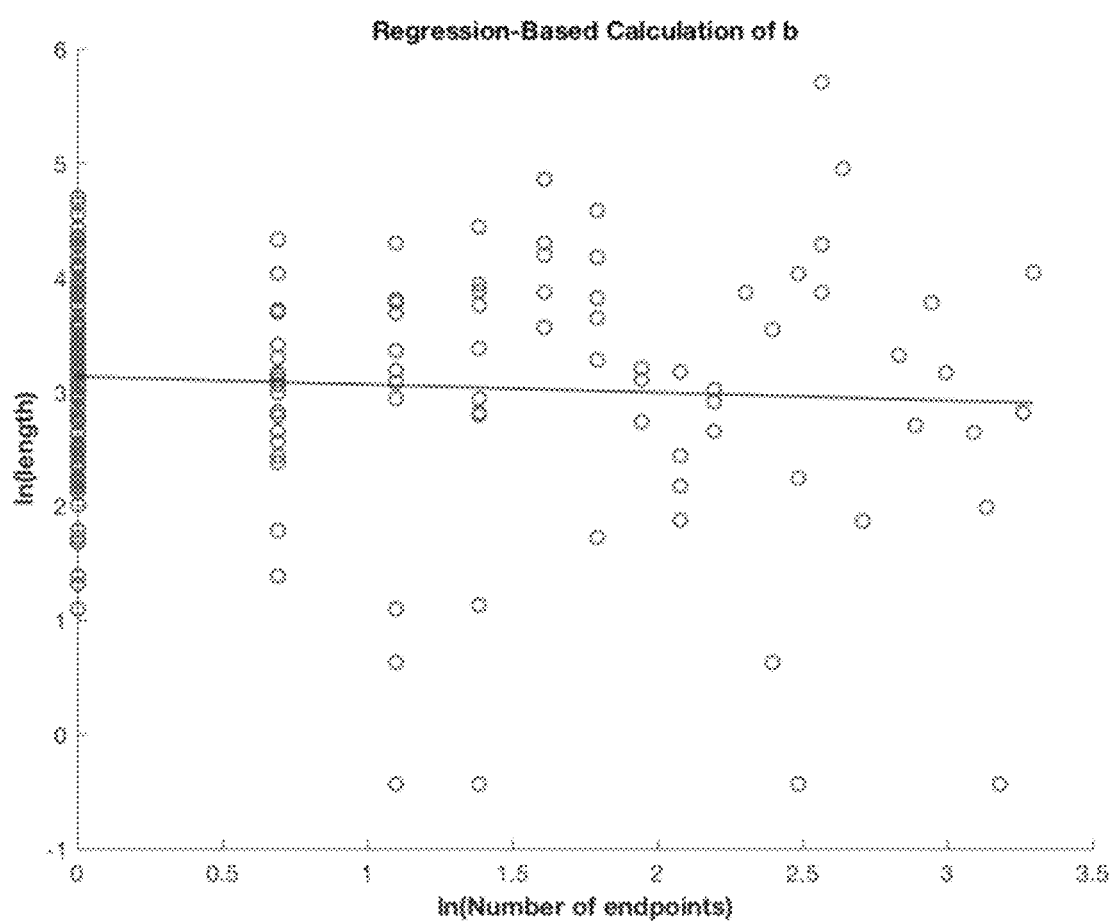
FIG. 5J shows a regression-based calculation of the length scaling exponent (b) from ischemic stroke according to an aspect of the invention.
Figure 6I:
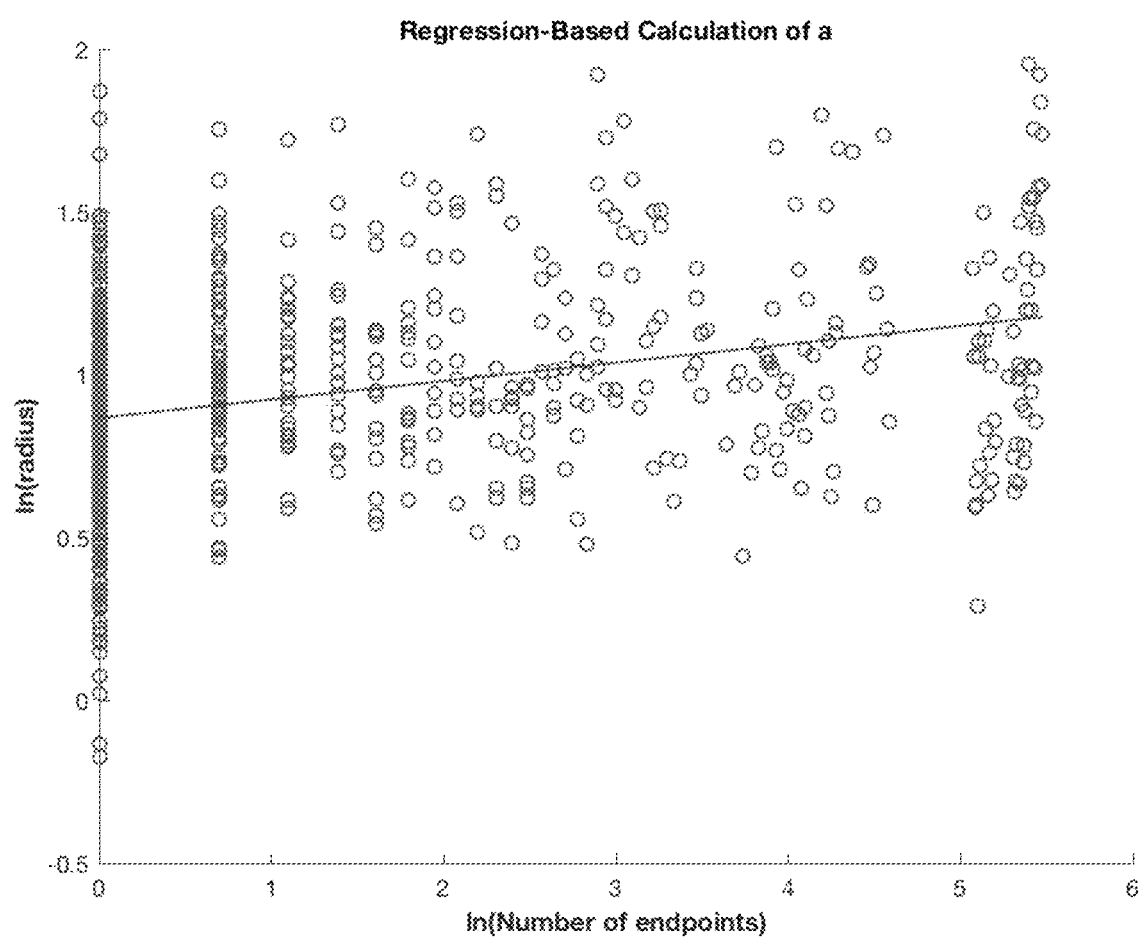
FIG. 6I shows a regression-based calculation of the radial exponent (a) from non-stroke brain vasculature (non-ischemic hemisphere) according to an aspect of the invention.
Figure 6J:
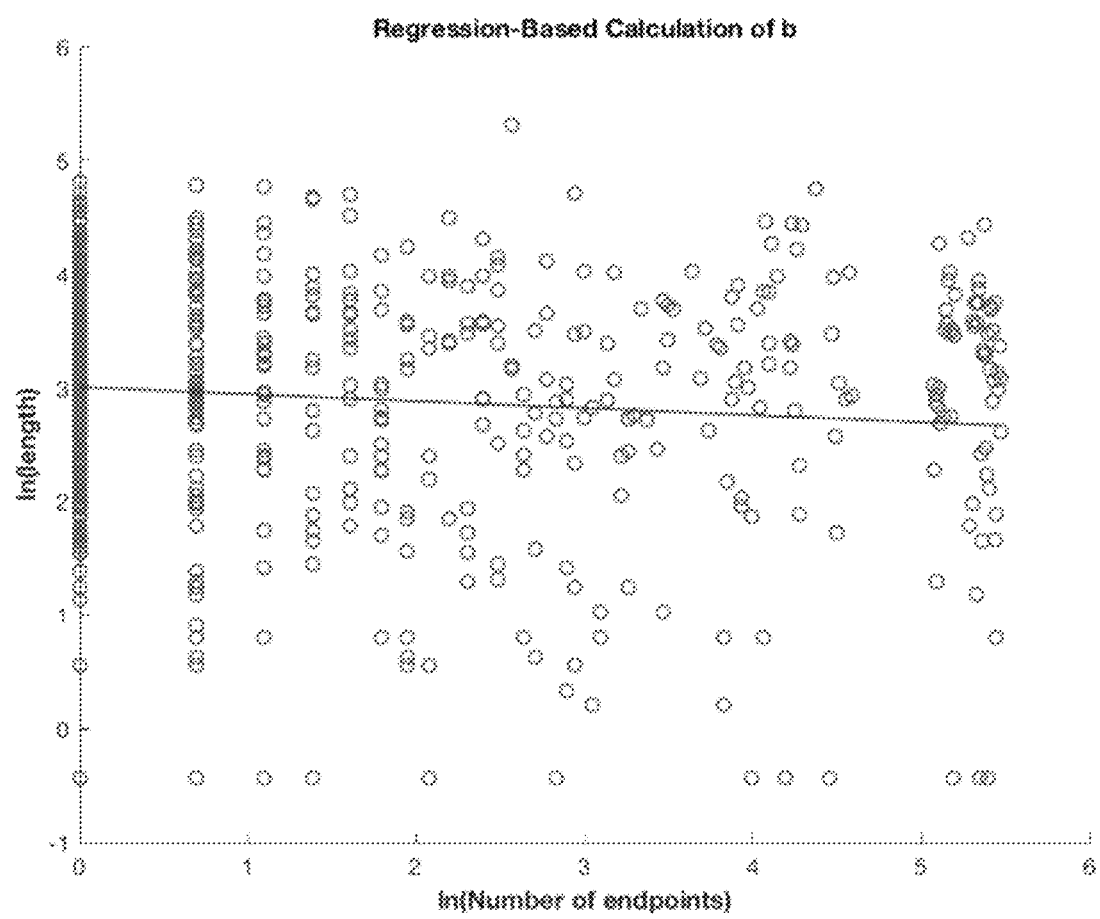
FIG. 6J shows a regression-based calculation of the length scaling exponent (b) from non-stroke brain vasculature (non-ischemic hemisphere) according to an aspect of the invention.
Figure 10I:
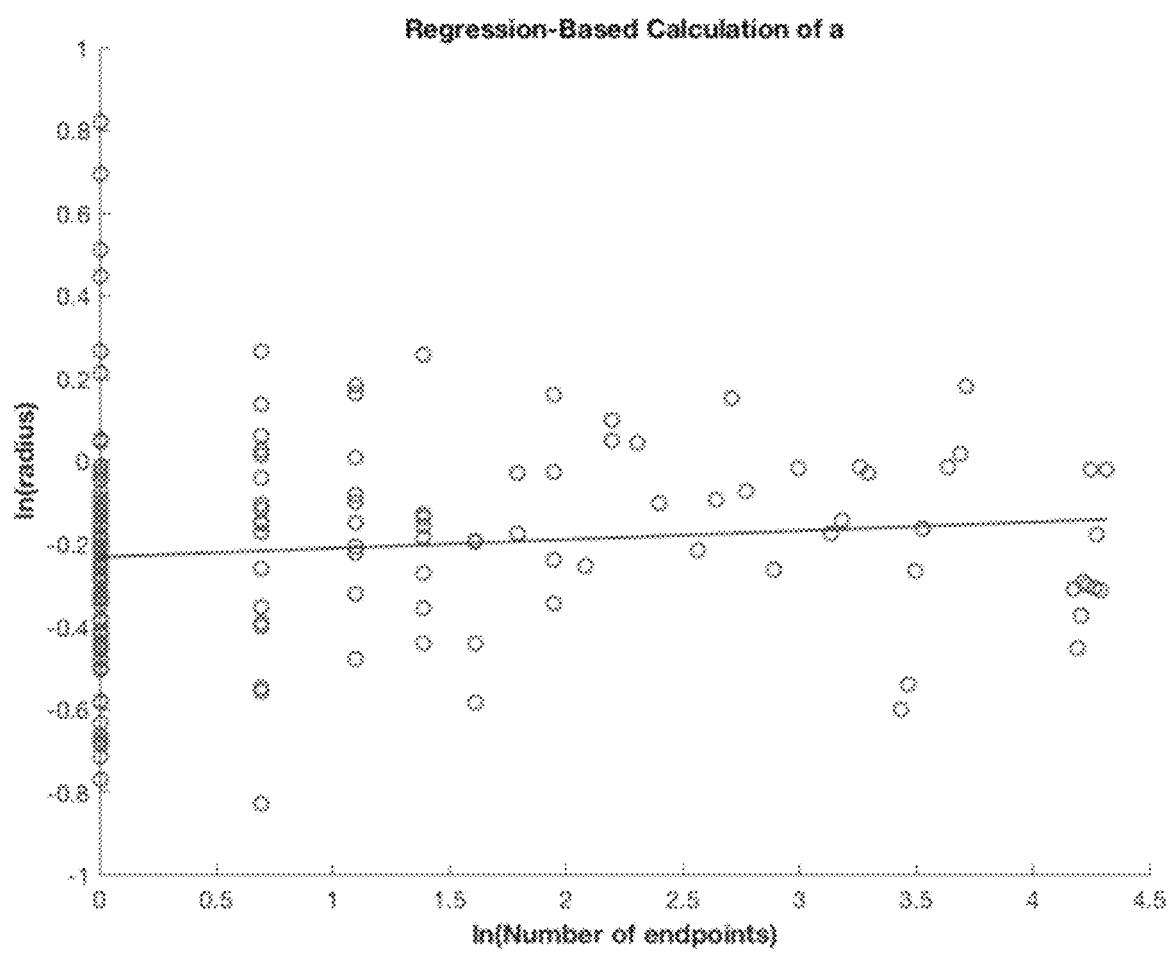
FIG. 10I shows a regression-based calculation of the radial exponent (a) from post-stroke vasculature in the peri-infarct region according to an aspect of the invention.
Figure 10J:
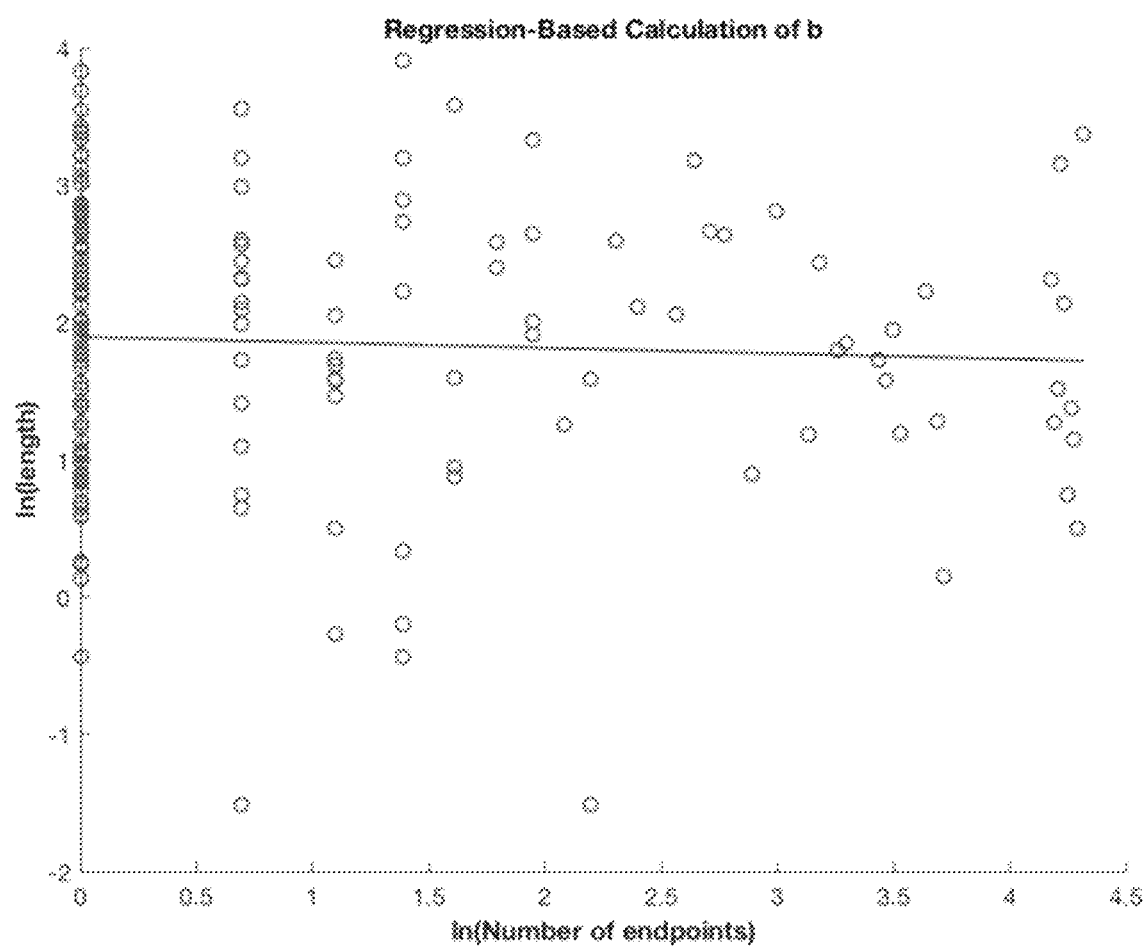
FIG. 10J shows a regression-based calculation of the length scaling exponent (b) from post-stroke vasculature in the peri-infarct region according to an aspect of the invention.
Figure 14A:
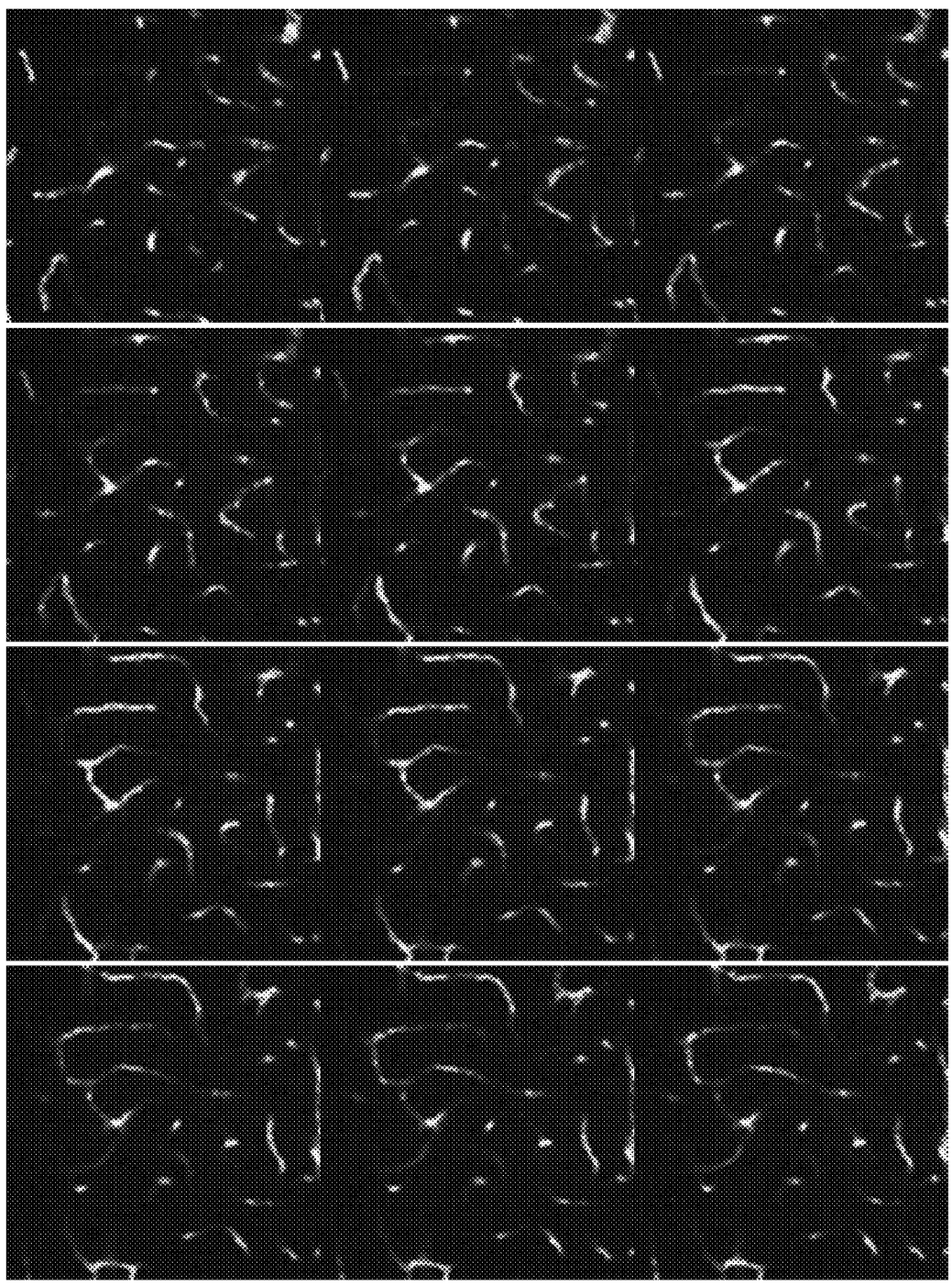
FIGS. 14A-14F show sample vasculature images after pre-processing according to an aspect of the invention.
Figure 14B:
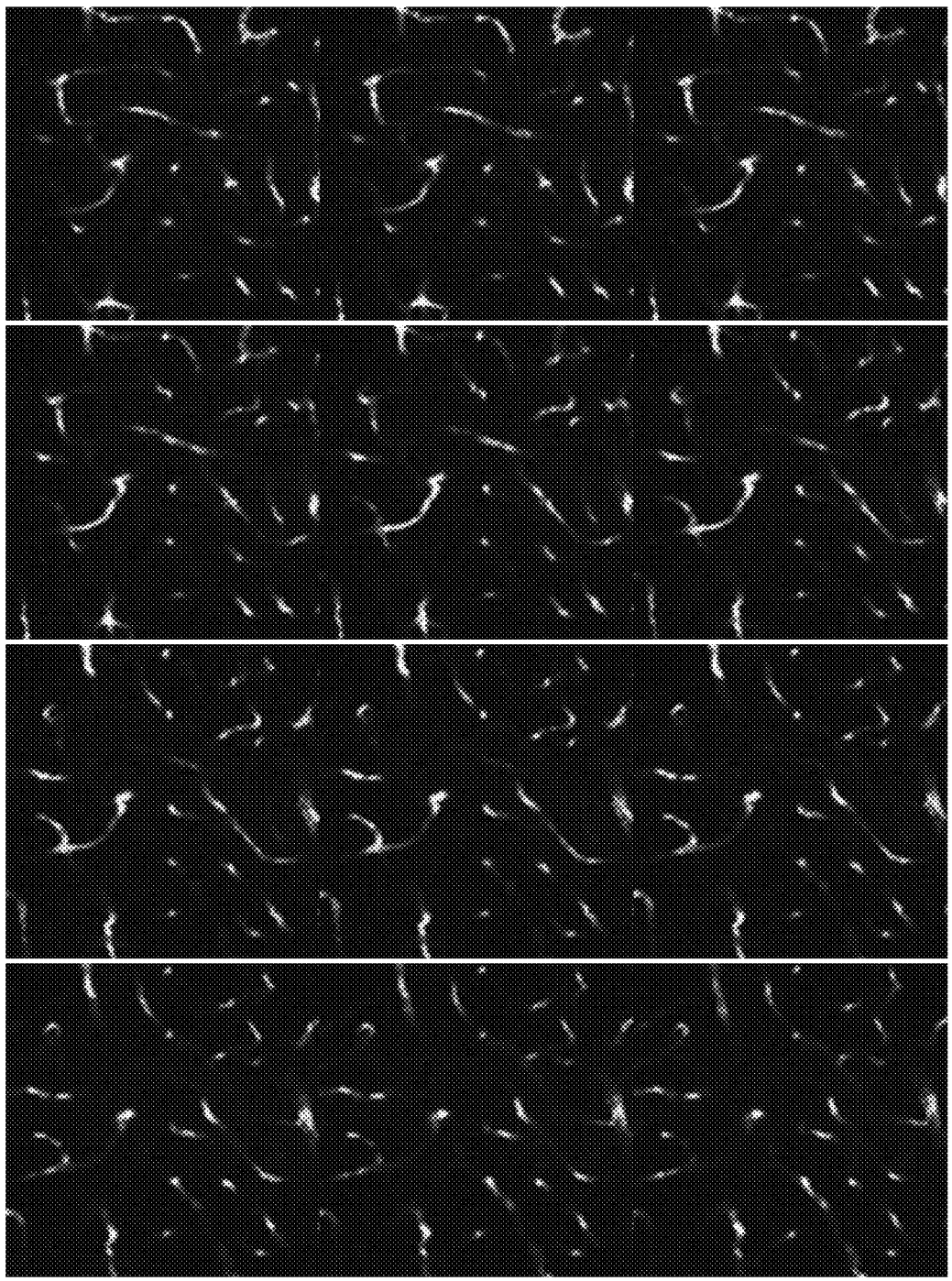
Figure 14C:
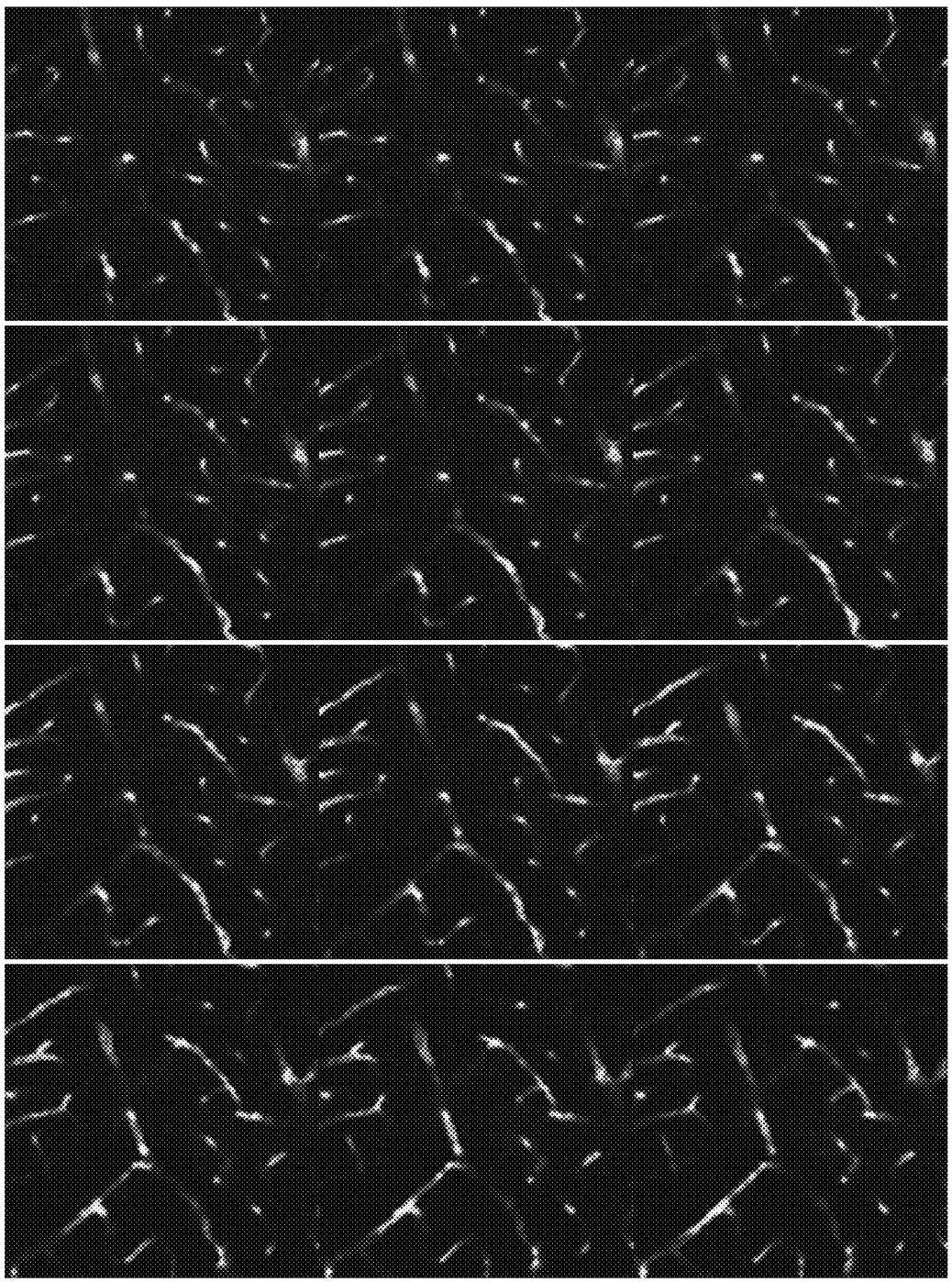
Figure 14D:
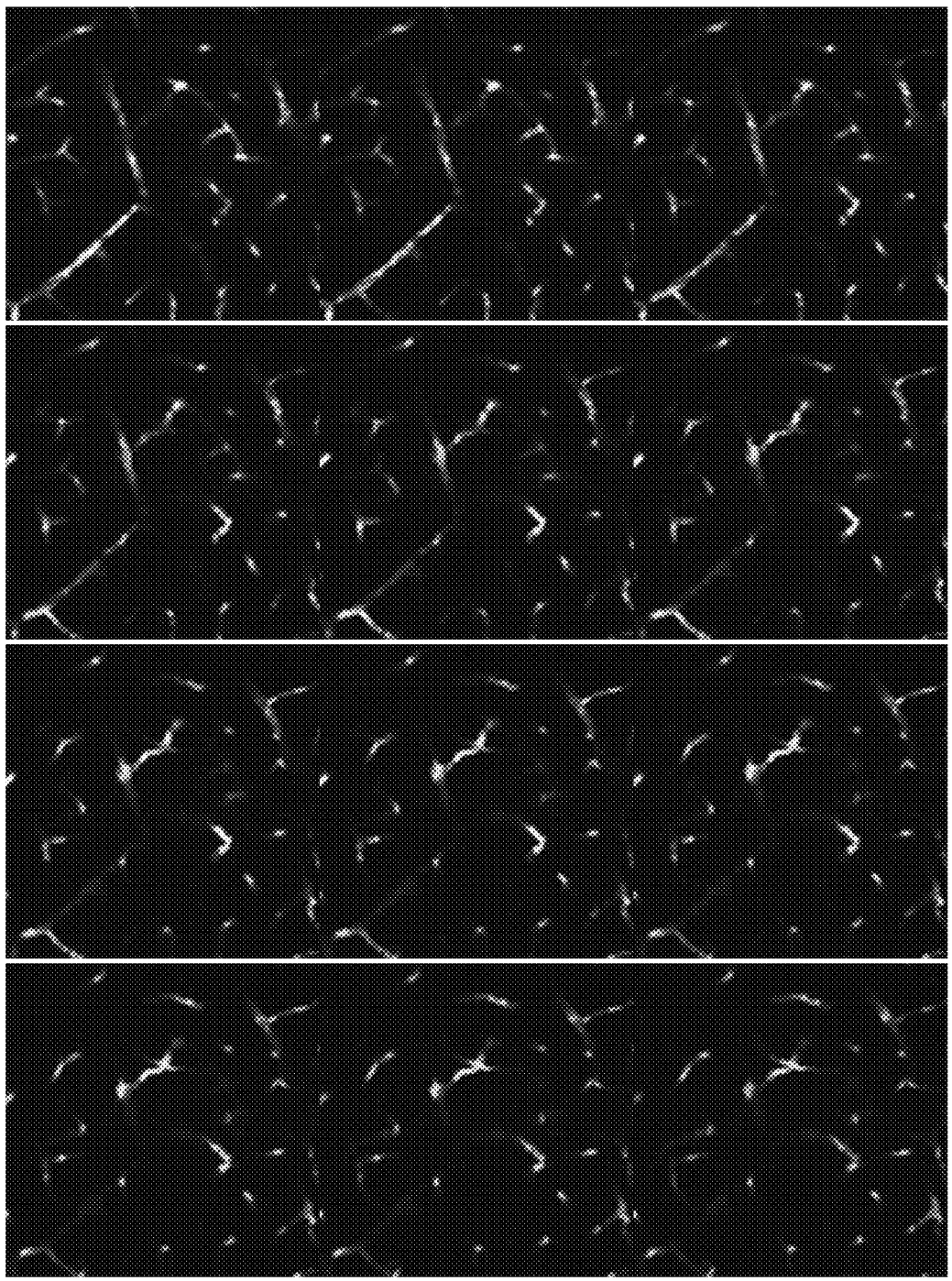
Figure 14E:
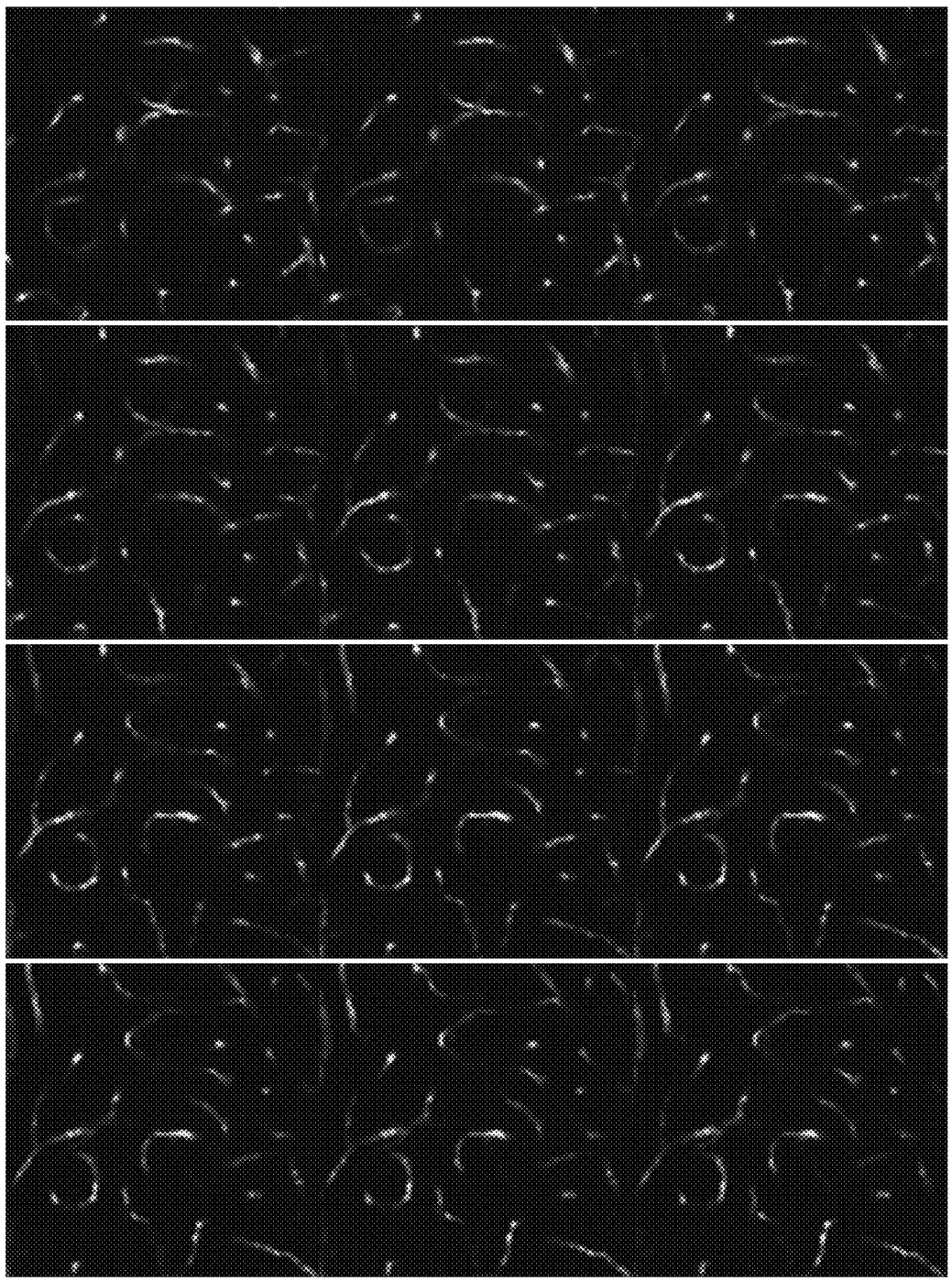
Figure 14F:
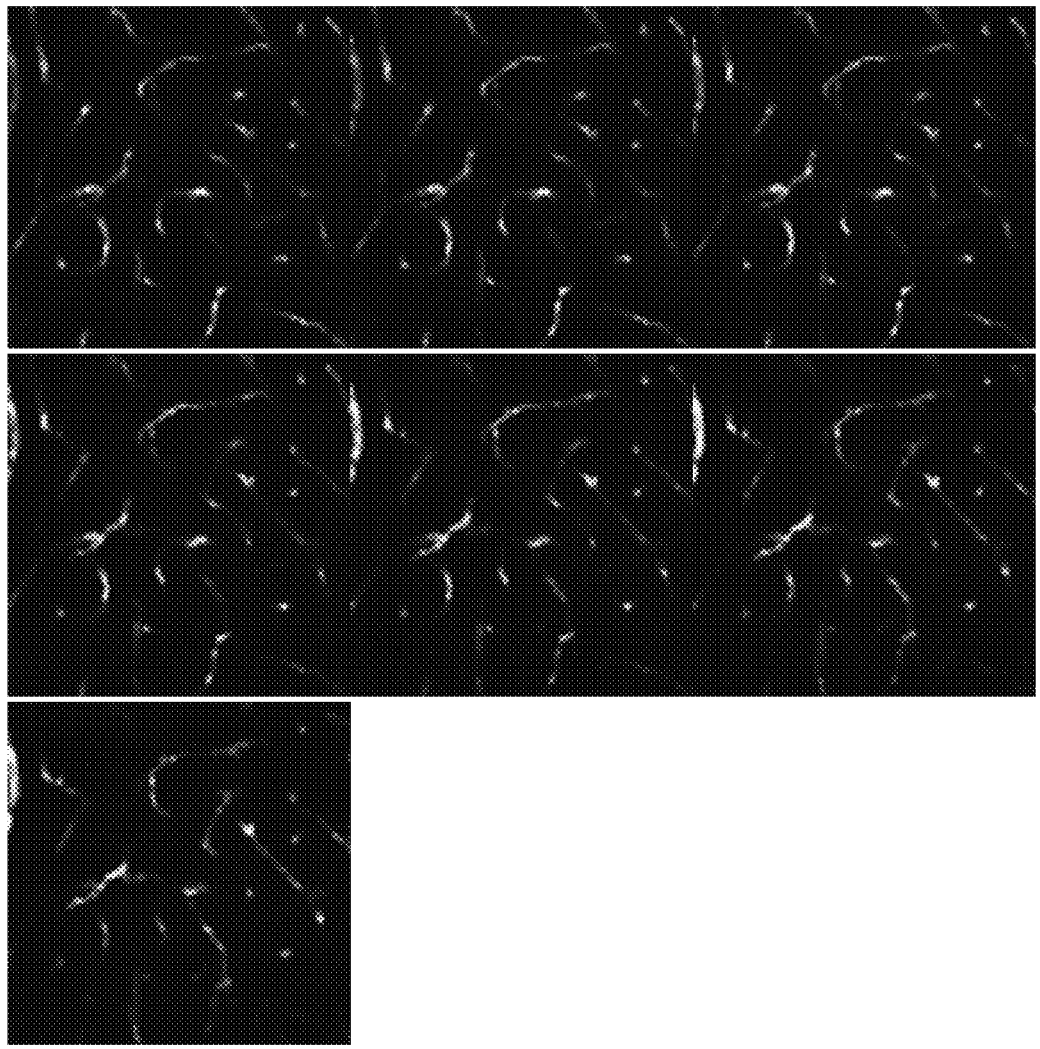
Figure 15A:
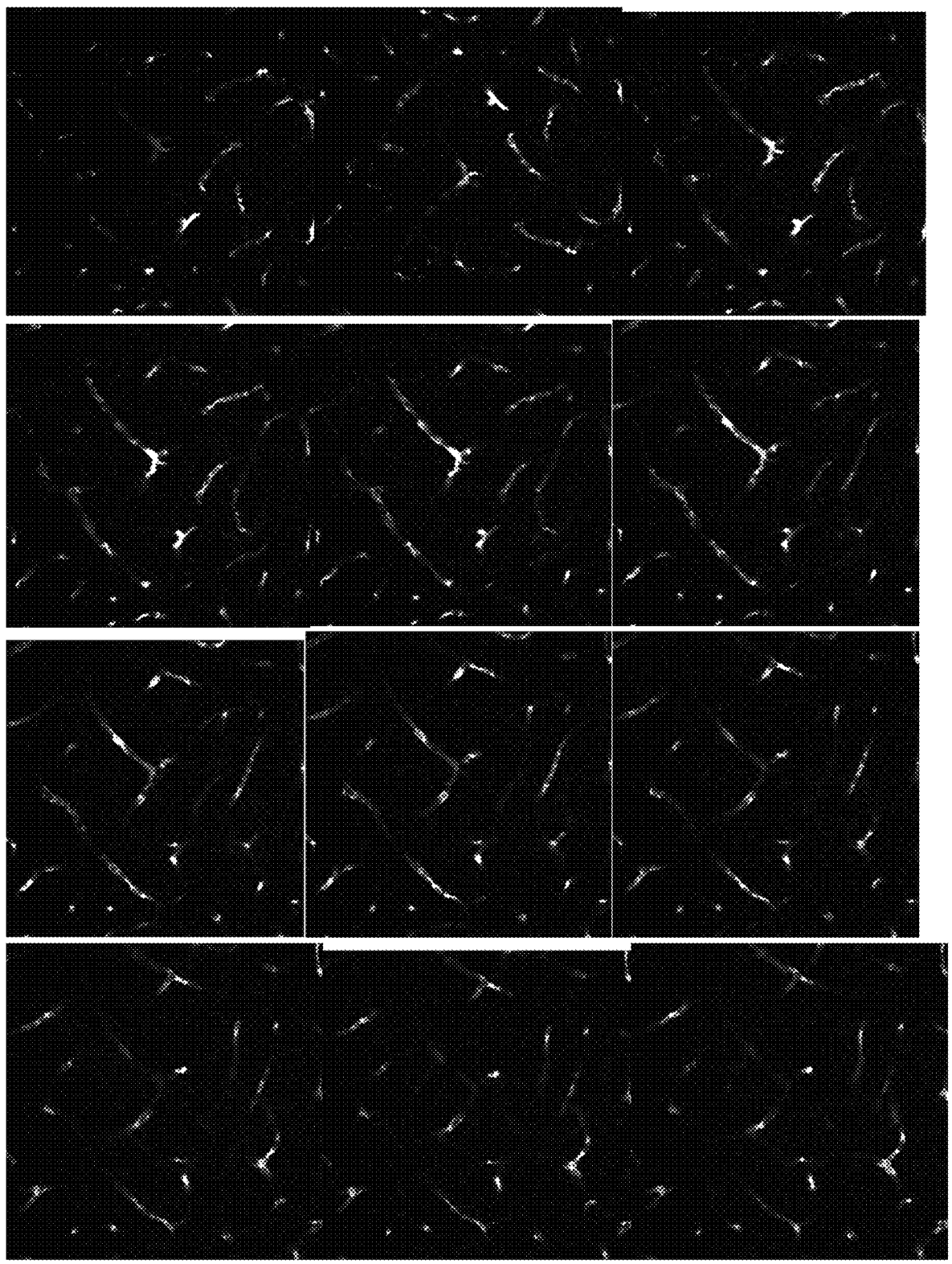
FIGS. 15A-15F show sample vasculature images after pre-processing according to an aspect of the invention.
Figure 15B:
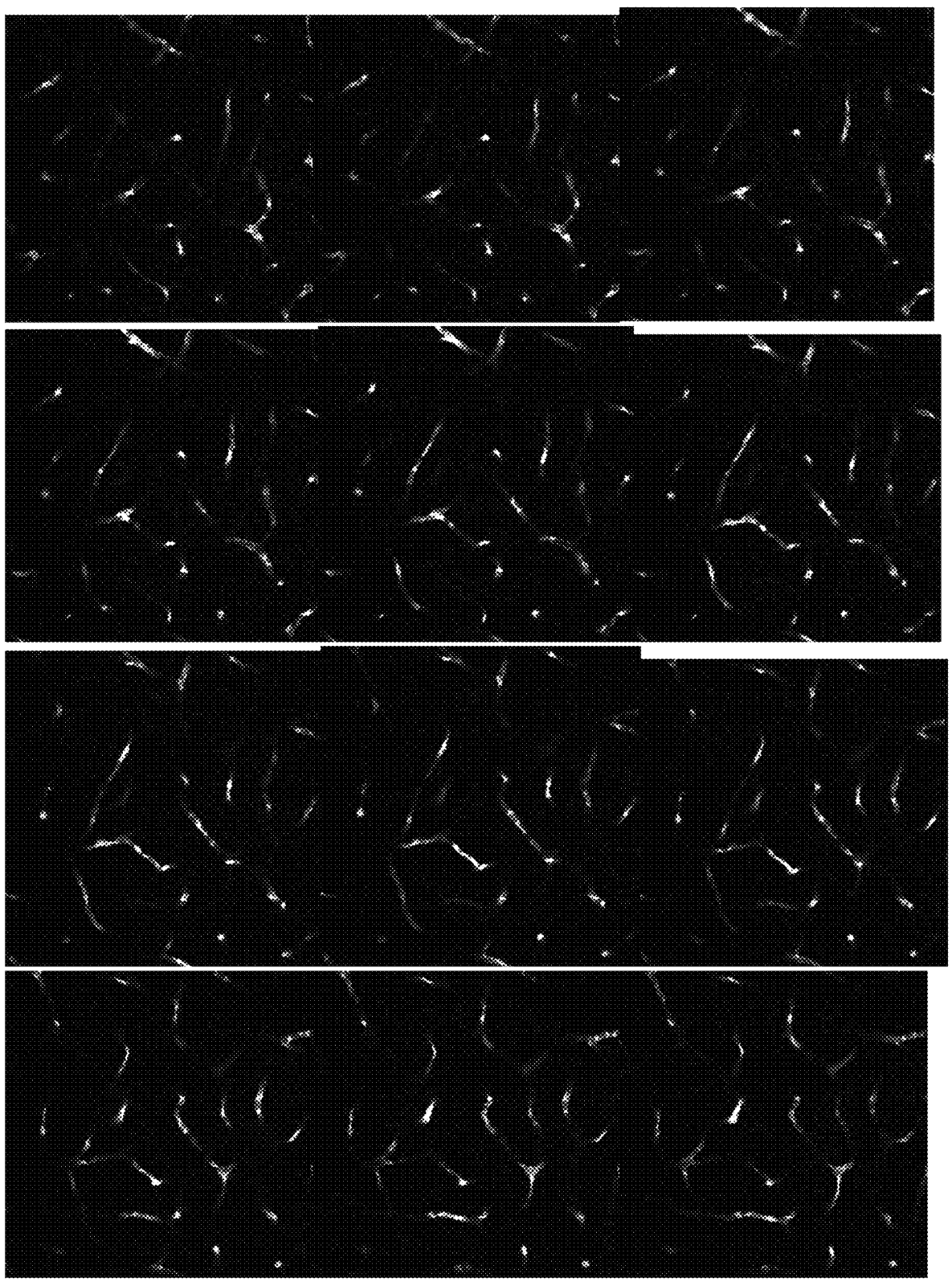
Figure 15C:
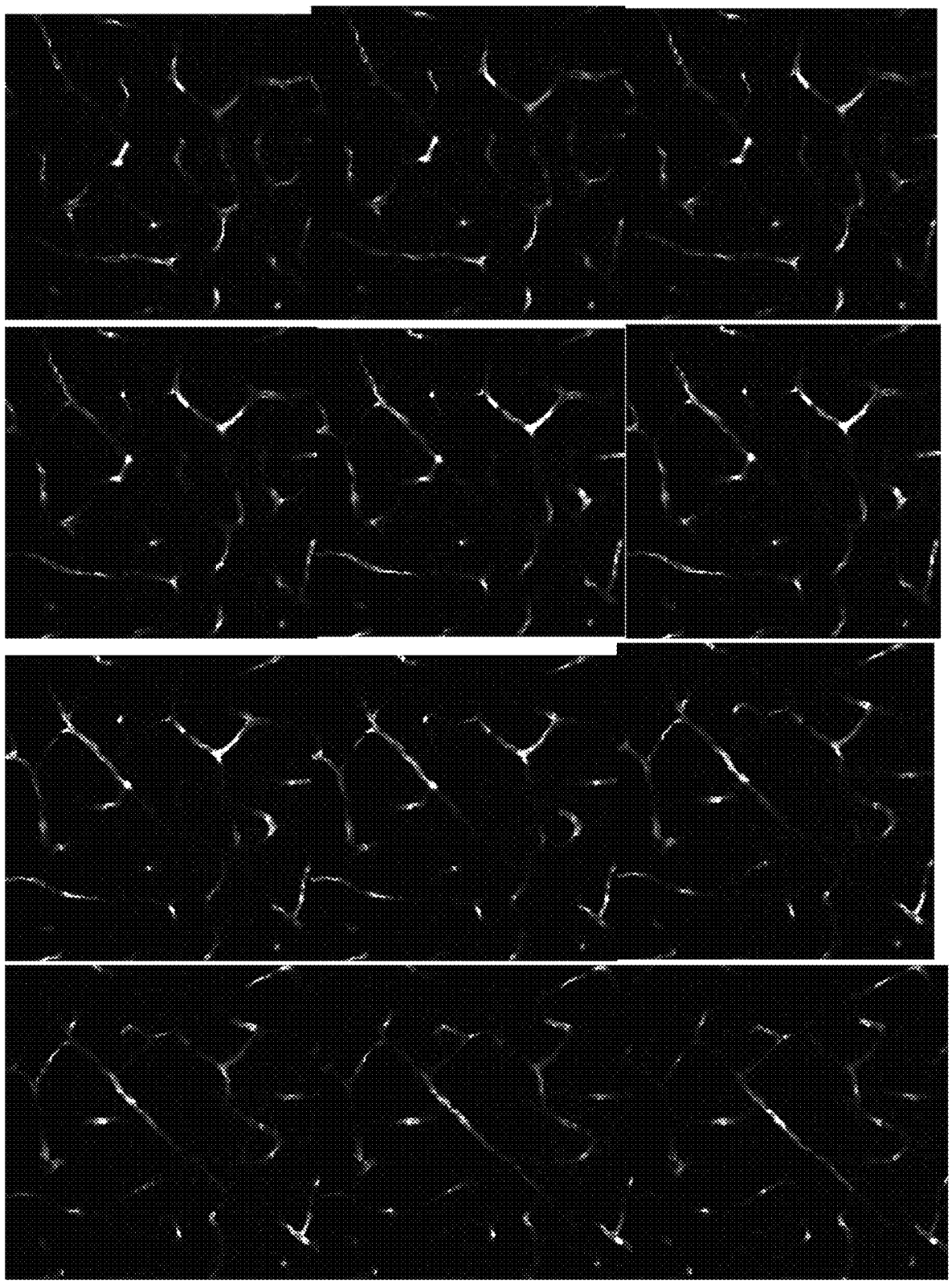
Figure 15D:
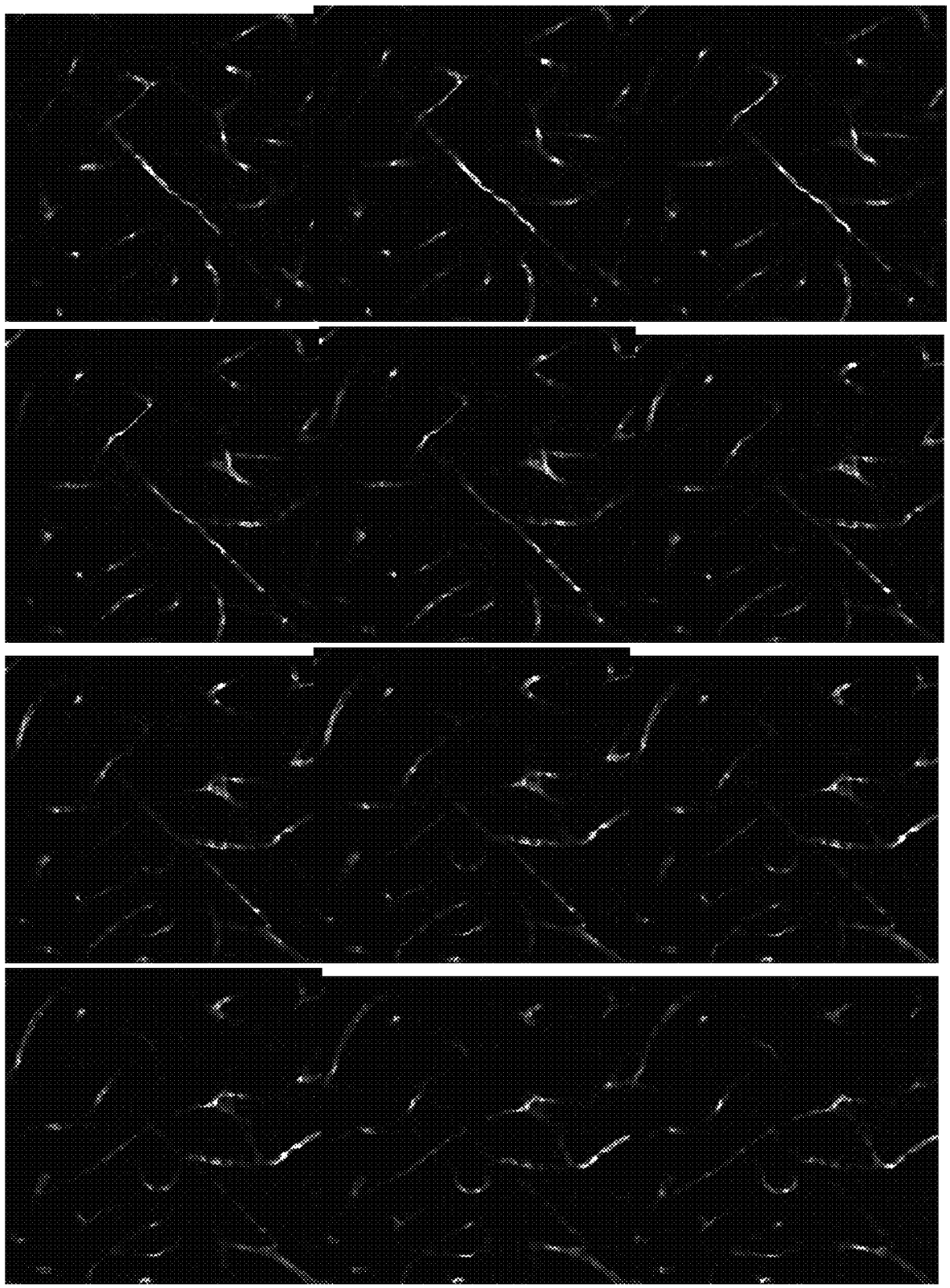
Figure 15E:
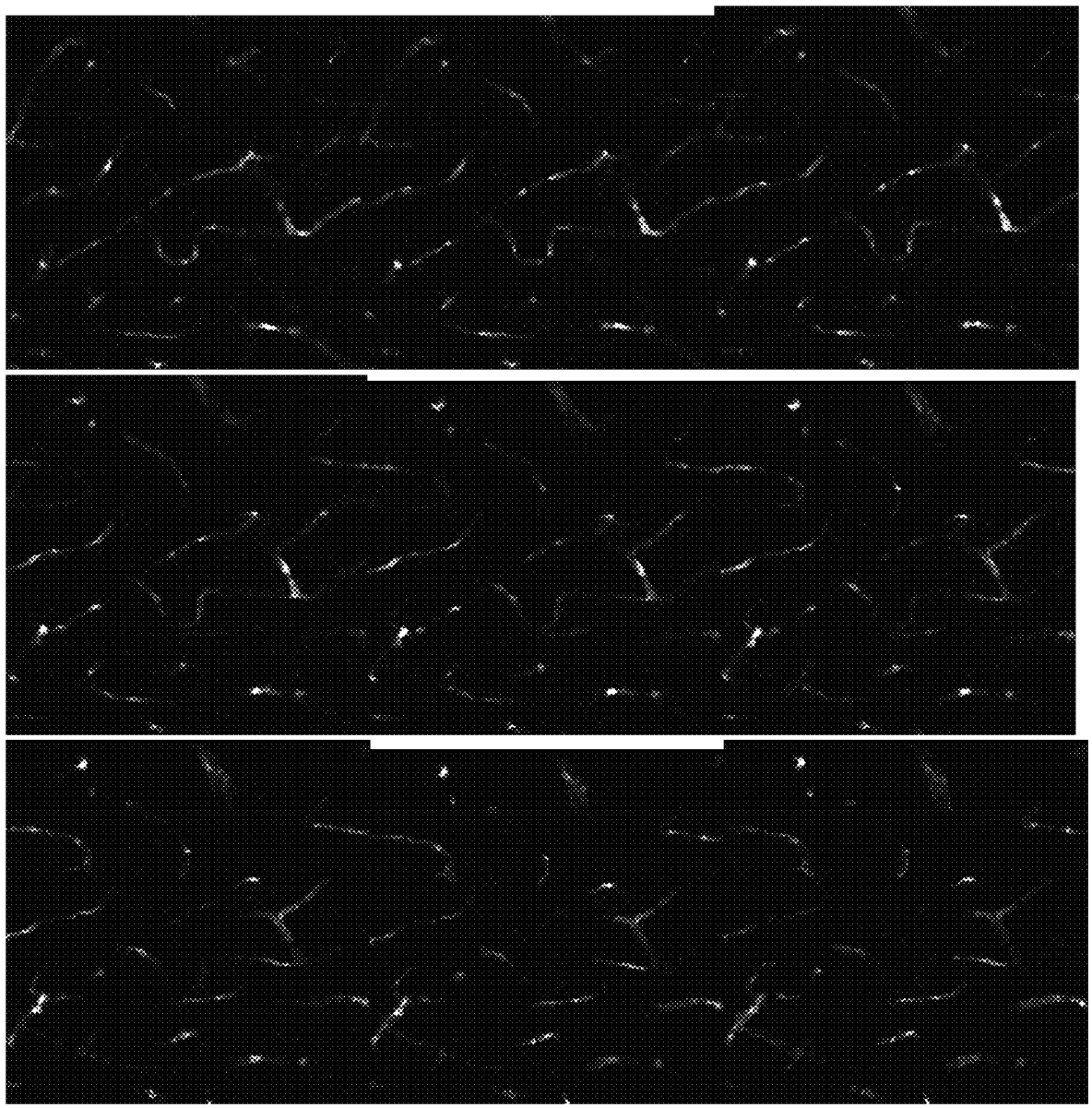
Figure 15F:
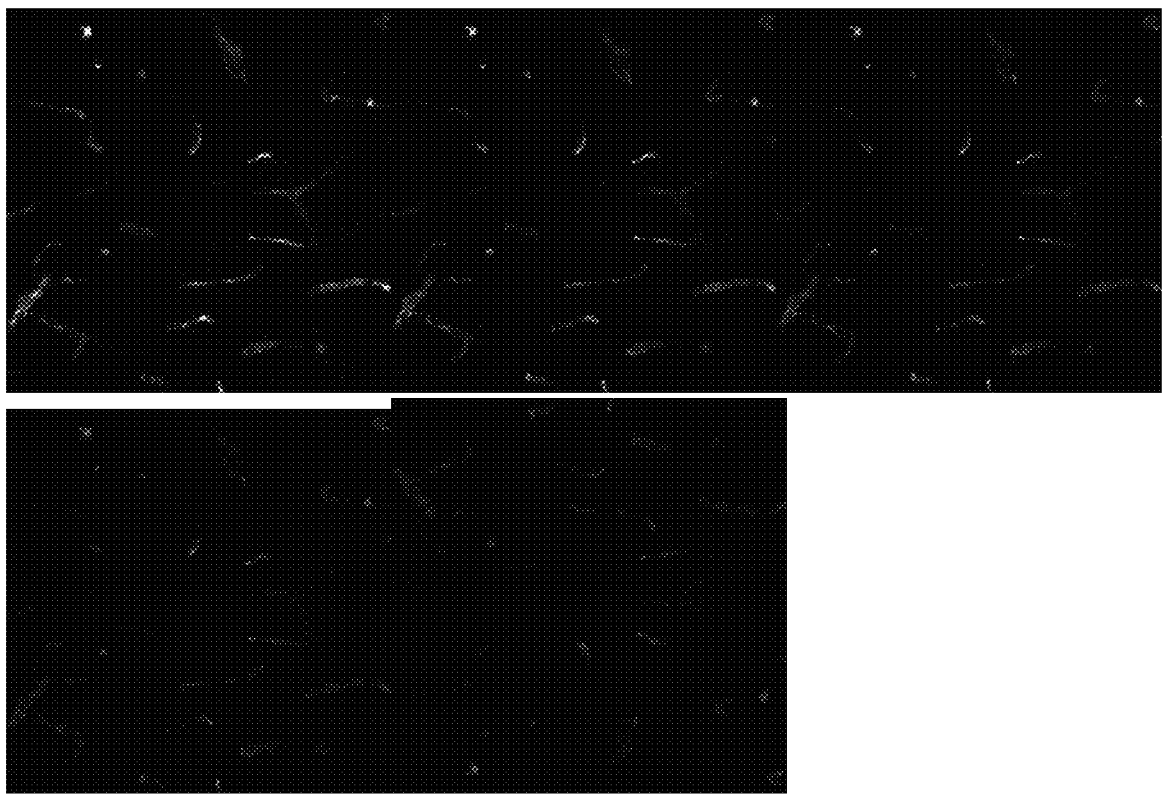
Figure 16A:
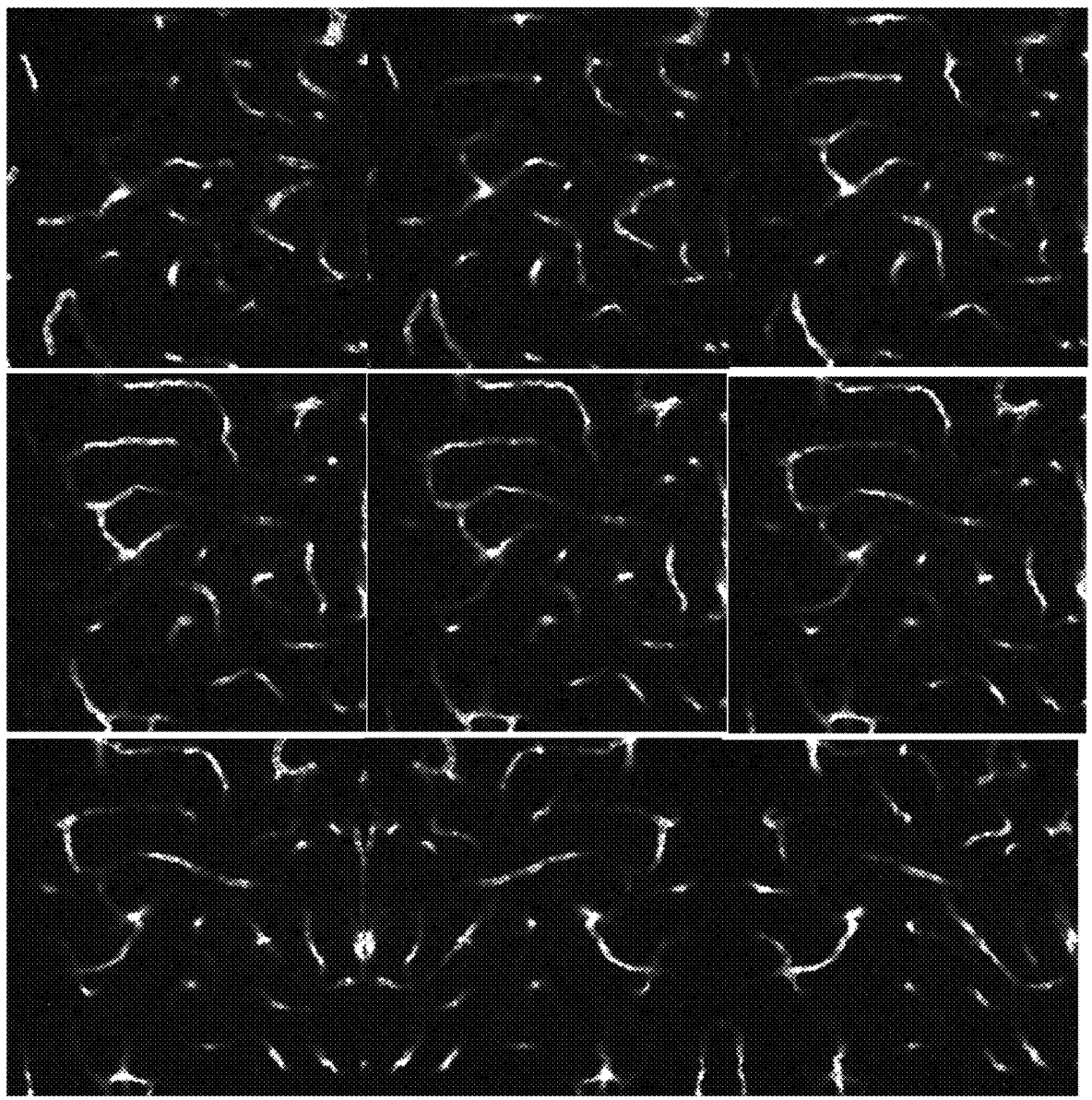
FIGS. 16A-16C show sample vasculature images after pre-processing according to an aspect of the invention.
Figure 16B:
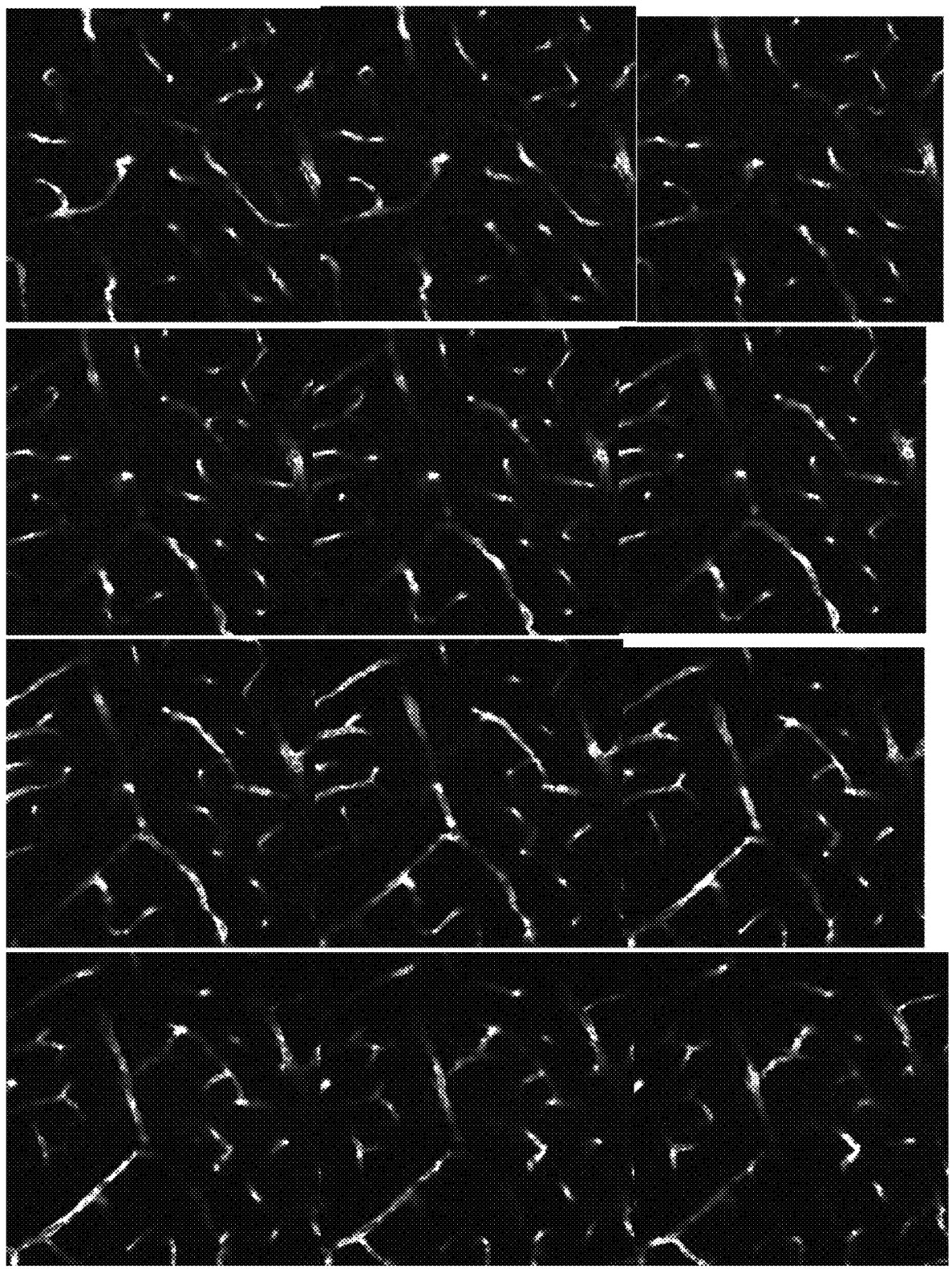
Figure 16C:
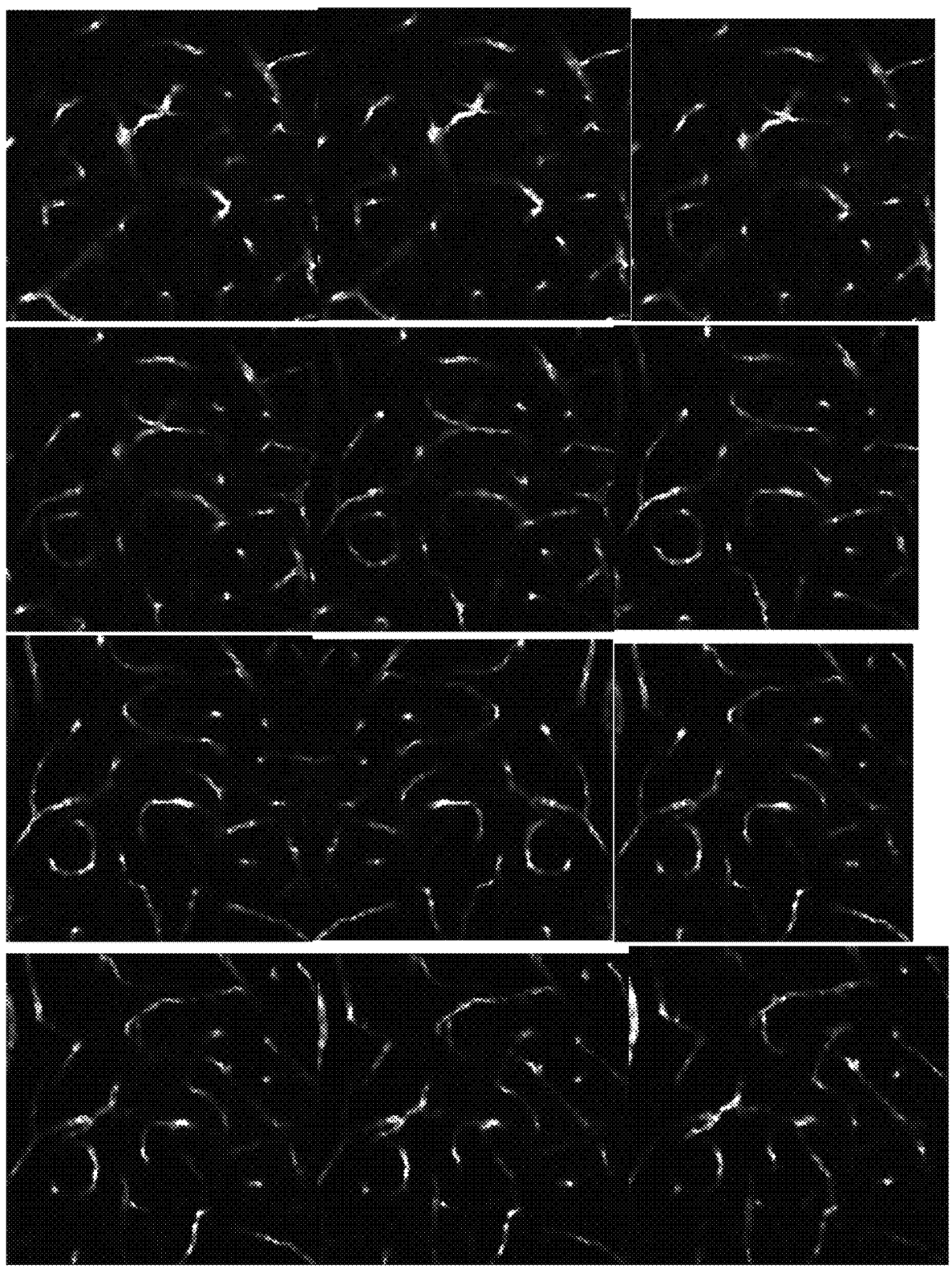

The regression-based scaling exponents are based on the theory that any vessel's radius and length are proportional to the number of downstream vessel tips. The radial regression-based scaling exponents may be the slope of the line of best-fit in a log-log plot of vessel radius vs. number of downstream vessel tips. The length distribution-based scaling exponent may be the slope of the line of best-fit in a log-log plot of vessel length vs. number of downstream vessel tips. FIG. 4B shows a sample graph of machine learning results of regression-based scaling exponents logistic regression. FIG. 5I shows a regression-based calculation of the radial exponent (a) from ischemic stroke obtained via experiment. FIG. 6I shows a regression-based calculation of the radial exponent (a) from non-stroke brain vasculature (non-ischemic hemisphere) obtained via experiment. FIG. 10I shows a regression-based calculation of the radial exponent (a) from post-stroke vasculature in the peri-infarct region obtained via experiment. FIG. 5J shows a regression-based calculation of the length scaling exponent (b) from ischemic stroke obtained via experiment. FIG. 6J shows a regression-based calculation of the length scaling exponent (b) from non-stroke brain vasculature (non-ischemic hemisphere) obtained via experiment. FIG. 10J shows a regression-based calculation of the length scaling exponent (b) from post-stroke vasculature in the peri-infarct region obtained via experiment.

The asymmetric scaling exponent for the entire vasculature may be computed using the following equation:

$$\delta = \frac{\ln(2)}{\ln(2) - \ln(\beta_\mu^2 + \beta_v^2 \gamma_v)} \quad \text{Equation 13}$$

For each vessel in the vascular network, the tortuosity value may be computed using the distance metric method by dividing the arc length of the vessel segment by the straight-line distance between the starting point and endpoint of the vessel segment. Alternatively, the tortuosity may be computed using the inflection point count method, which is computed as: (number of inflection points+1) times (distance metric tortuosity). Alternatively, the tortuosity may be computed using the sum of angles metric (SOAM), in which the curvature of a blood vessel is summed along a sampled space curve and is normalized by the arc length of the blood vessel. In other embodiments, the tortuosity may be computed using other methods. The mean, median, and standard deviation tortuosity metric may be computed for each vessel in the vasculature.

The total capillary volume may be computed by summing the volume of each vessel in the network with a diameter less than 10 μm. A capillary density metric may then be computed by dividing the total capillary volume by the total volume of the three-dimensional medical image. The total surface area for each vessel in the network with a diameter less than 10 μm may be computed and divided by the total surface area of the three-dimensional medical image. In other embodiments, these values may be calculated for vessels with diameters greater than 10 μm.

For each additional of the following 7 vascular features, the mean, median, and standard deviation may be computed for each vessel in the entire vasculature:
1. Vessel Diameter
2. Vessel Length
3. Branching Angle
4. Branching Frequency is computed for each vessel as $$\frac{n_k}{l_k},$$

where $n_k$ is the number of vessel children and $l_k$ is the vessel length.
5. Number of Vessel Tips
6. Number of Vessel Children 7. Number of Arterial or Venous Branch Points
8. Hierarchical Fractal Dimension is computed as:

$$D = \frac{\ln(r_b)}{\ln(r_l)},$$

where $$rb = \frac{N_m}{N_{m+1}}$$

and $N_m$ is the number of blood vessels at level m, and $$r_l = \frac{h_{m+1}}{h_m},$$

where $h_m$ is the average length of blood vessels at level m.

The total number of loops in the vasculature, which occur when a blood vessel splits into multiple children vessel, some of which converge into the same child vessel.

The total number of branch points, defined as locations in the vasculature where a vessel splits into two or more vessel children, may be counted and divided by the total volume of vasculature.

The total number of vessel tips, defined as locations in the vasculature where a vessel has no vessel children, may be counted and divided by the total volume of vasculature.

Fractal analysis measures the degree to which an object fills an available space and derives from scaling laws. Fractal analysis may be used to quantify the irregularity of vasculature. It is an important feature in the classification and diagnosis of medical images. Types of fractal analysis may include box counting analysis, lacunarity analysis, and multifractal analysis which are used to compute a Hausdorff fractal dimension, lacunarity dimension, and multifractal dimension, respectively. The open-source fractal analysis software FracLAC may be used to compute these different types of fractal dimensions.

The Hausdorff dimension is computed as follows. For a three-dimensional image of vasculature, the number of cubes N(s) of side length s required to cover the vasculature is counted. The number of cubes N(s) is counted for several side lengths s. The box-counting dimension $D_F$ may then be computed by plotting log(N(s)) versus $$\log\left(\frac{1}{s}\right)$$

and determining the slope of a best-fit line to this graph. For two-dimensional images of vasculature, the box-counting dimension can be computed similarly by covering the vasculature with N(s) squares of side length s. Alternatively, a sliding box algorithm may be used to compute the box-counting dimension.

The lacunarity dimension measures how fractals fill space and can quantify rotational invariance and heterogeneity. Patterns with more or larger gaps correspond to higher values of lacunarity. A two-dimensional or three-dimensional box counting algorithm may be used to cover the entire image of vasculature in boxes of varying side length s. The number of pixels in each box is counted. Let $\mu_s$ be the mean number of pixels per box and let $\sigma_s$ be the standard deviation of pixels per box. The lacunarity can then be computed as:

$$\lambda_s = \left(\frac{\sigma_s}{\mu_s}\right)^2 \quad \text{Equation 14}$$

Multifractal analysis demonstrates how a pattern behaves if distorted in certain ways. A box counting algorithm is first used to cover the image with two or three-dimensional boxes and the number of pixels in each box is recorded. The probability P of a number of pixels x appearing in a box j varies as box size s to some exponent α. There are three types of generalized fractal dimension $D_Q$, which can be computed by setting Q equal to 1 (the information dimension) or 2 (the correlation dimension). These generalized fractal dimensions can be computed from the following equations:

$$D_{Q=1} = -\lim_{s \to 1} \frac{P_j \ln(P_j)}{\ln(s)} \quad \text{Equation 15}$$

$$D_{Q=2} = \lim_{s \to 0} \frac{\ln I_{Q,s}}{\frac{\ln s^{-1}}{1-Q}} \quad \text{Equation 16}$$

$$I_{Q,s} = \sum_j P_{j,s}^Q \quad \text{Equation 17}$$

$$P_{j,s} = (pixels_{j,s}) \bigg/ \left(\sum_j pixels_{j,s}\right) \quad \text{Equation 18}$$

Data sets consisting of each vasculature image's vessel features may be compiled. Each data set contains two columns of two separate vessel features and a third column to indicate the status of disease (0=no disease, 1=diseased).

The features of the vasculature may then undergo selection (109). Feature selection may be performed using an Elastic Net algorithm to select the most prominent features from the original data set. The Elastic Net algorithm may be a regularized regression algorithm that selects groups of correlated variables. Elastic Net can be estimated using LASSO (least absolute shrinkage and selection operator) using the following equations:

$$\widehat{\beta^*} = \text{argmin} \|y^* - X^*\beta^*\|_2^2 + \gamma\|\beta^*\|_1 \quad \text{Equation 19}$$

$$\hat{\beta} = \text{argmin} \|y - X\beta\|^2 + \lambda_2\|\beta\|_2^2 + \lambda_1\|\beta\|_1 \quad \text{Equation 20}$$

In the above recited equations, X is a vector of quantitative vessel features $x_1, x_2, \ldots x_n$ and β is a vector minimization coefficient consisting of $\beta_1, \beta_2, \ldots \beta_n$. The optimal parameter β computed for fixed $\lambda_1, \lambda_2$ according to Equation 19.

Elastic Net may be implemented in one or more software programs. For example, Elastic Net may be implemented in MATLAB using the built-in LASSO function that utilizes α, X, and y, where X is a matrix containing the vessel features in which the rows represent each vessel and each column represents one of the vessel features. Additionally, y is a binary classification label vector in which each element of y represents a row of X, where 1 indicates diseased vasculature and where 0 indicates non-diseased vasculature. The built-in LASSO function may output the regression coefficients in a matrix β and outputs a matrix F that lists how many features each column vector has and the λ of each where F is used to find the most prominent features of the data set and the λ used. Finally, the data may be sorted to rank the prominent features' coefficients in descending order based on their magnitude.

In other embodiments, LASSO or Ridge regression algorithms may be used in feature selection. LASSO may be implemented in one or more software programs. For example, the LASSO may be implemented in MATLAB using the built-in LASSO function. Ridge regression may similarly be implemented by one or more software programs. For example, Ridge regression may be implemented in MATLAB according to various embodiments. Other software programs capable of implementing LASSO and/or Ridge regression may be used interchangeably according to various embodiments.

The features of the vasculature may then undergo extraction (111). Feature extraction may be performed using Principal Component Analysis (PCA). PCA finds an even lower-dimensional representation of the data that preserves features that are prominent and linearly uncorrelated.

PCA may be implemented in one or more software programs. For example, PCA may be implemented in MATLAB. The PCA code takes prominent features from Elastic Net in the matrix X as an input. Using the built-in singular-value decomposition (SVD) function, the code performs SVD of X and uses "u" from SVD to output the first several principal components (PC), uses "v" from SVD to create the projection matrix, and uses "s" from SVD for the variance of each principal component.

The data sets may be randomly divided into training sets (58%) and testing sets (42%). Alternatively, the data sets can consist of more than two vessel features at a time and can be split into training sets (85%) and testing sets (15%).

The vascular images may then undergo classification (113). The training data set may be used to train machine learning algorithms. For example, the machine learning algorithms may be a two-variable logistic regression model and a two-variable Naïve Bayes Classifier model (FIGS. 3A-3L show sample graphs of machine learning results). However, other machine learning algorithms suitable for conducting this method may be used interchangeably according to various embodiments. Some embodiments may include multi-variable (e.g. more than two) hypothesis. The two-variable logistic regression model may be implemented in MATLAB and may learn the following equation:

$$P(y=1 \mid x) = h_\theta(x) = \frac{1}{1+\exp(-\theta^T x)} = \sigma(\theta^T x) \quad \text{Equation 21}$$

In the above recited equation, $$\sigma(x) = \frac{1}{1+\exp(-x)}$$

is the sigmoid function. The sigmoid function is a logistic S-shaped function that utilizes the value of $\theta^T x$ in the range [0, 1] so that $h_\theta(x)$ can be a probability. A cost function measure how well the machine learning algorithm predicts for the training set. The cost function may be represented by the following equation:

$$J(\theta) = -\Sigma_i(y(i)\log(h_\theta(x(i))) + (1-y(i))\log(1-h_\theta(x(i)))) \quad \text{Equation 22}$$

To train the model, the above recited cost function may be minimized by taking the derivative of J(θ) with respect to θ according to the following equation:

$$\nabla_\theta J(\theta) = \Sigma_i x(i)(h_\theta(x(i)) - y(i)) \quad \text{Equation 23}$$

The two-variable Naïve Bayes Classifier model may be a probabilistic classifier that applies Bayes' theorem of conditional probability according to the following equation:

$$P(c \mid x) = \frac{P(X \mid C)P(c)}{P(x)} \quad \text{Equation 24}$$

In the above recited equation P(c|x) is the posterior probability of class c given predictor x, where P(c) is the prior probability of class c. The probability of predictor x given class c is represented by P(x|c). The prior probability of predictor x given class c is represented by P(x).

In the above recited steps of FIG. 1, an algorithm, such as a Naïve Bayes Classifier, may be implemented in one or more software programs, such as MATLAB, using an algorithm, such as a built-in Naïve Bayes Classifier, fitcnb. The models may then be tested. Given the testing set's features, the models classify the vasculature images as diseased or non-diseased. The model's predictions may then be compared against the testing set's actual outcomes. The model's accuracy may then be determined as a ratio of correct classifications divided by total classifications made. FIG. 7 shows a table of accuracies of a logistic regression program and a Naïve Bayes Classifier in detecting ischemic stroke from analysis of vasculature.

In other embodiments, alternative artificial intelligence algorithms may be applied. The alternative artificial intelligence algorithms may be machine learning algorithms, which may include but are not limited to: artificial neural networks, convolution neural networks, recurrent neural networks, decision trees, support vector machines, alternate Bayesian algorithms, clustering algorithms, deep learning, and instance-based algorithms. In some embodiments, multi-stage classification schemes may be implemented rather than single-stage classification schemes. In some embodiments, the testing of the machine learning models can be performed using area under the curve (AUC), receiver operating characteristic (ROC), or cross validation.

Figure 2:
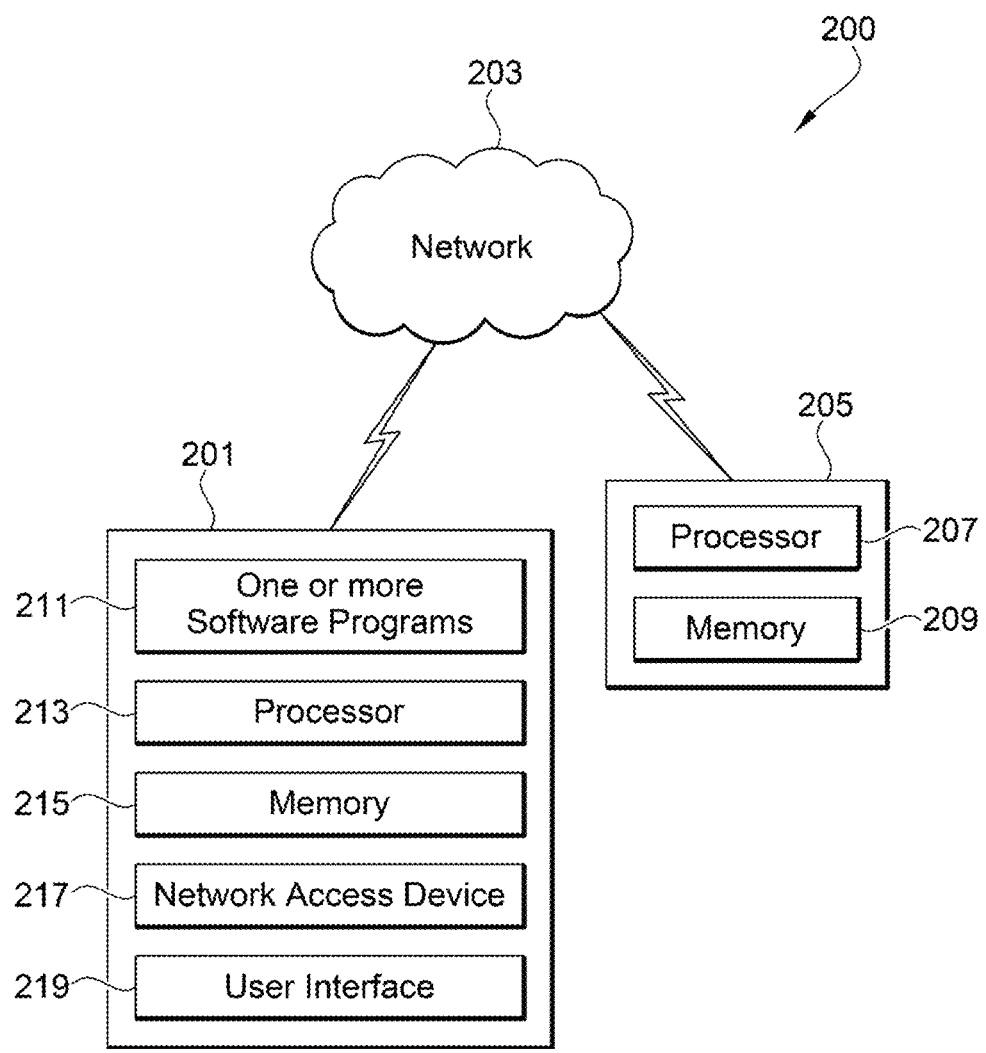
FIG. 2 is a system for implementing the process for disease detection in FIG. 1 according to an aspect of the invention.
Figure 3A:
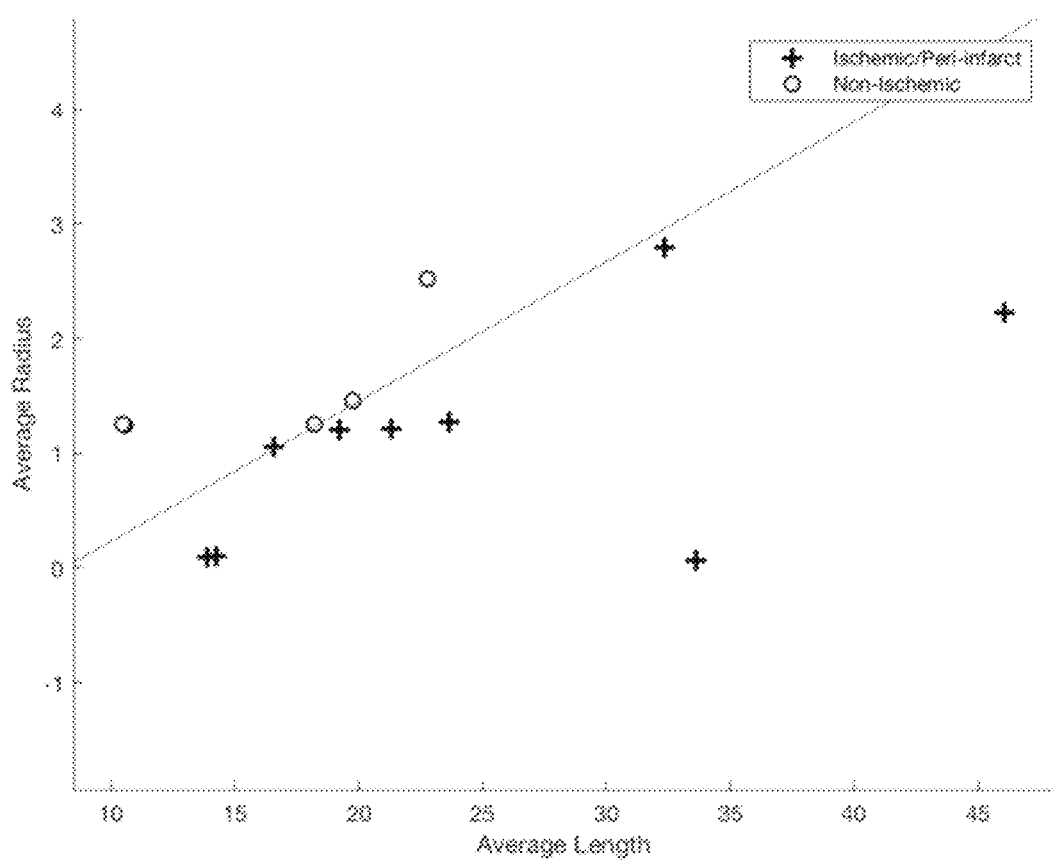
Figure 3B:
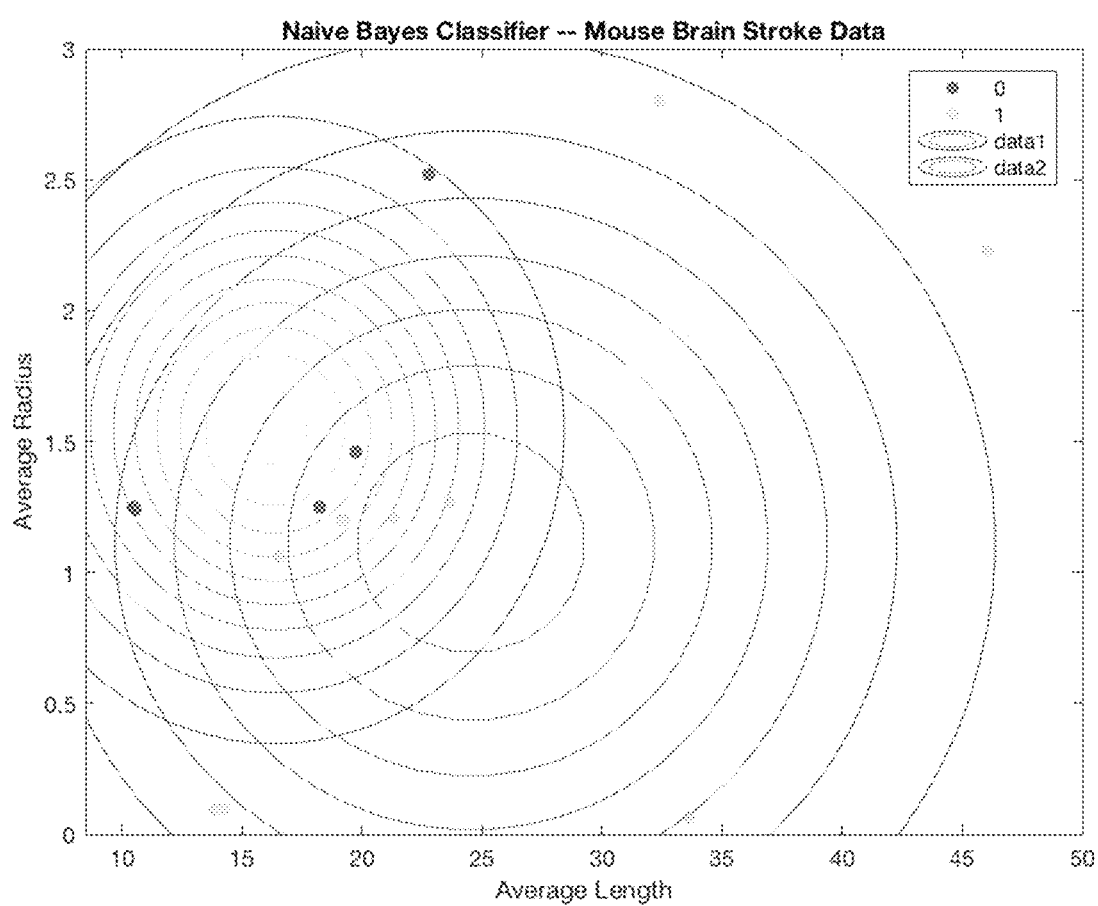
Figure 3C:
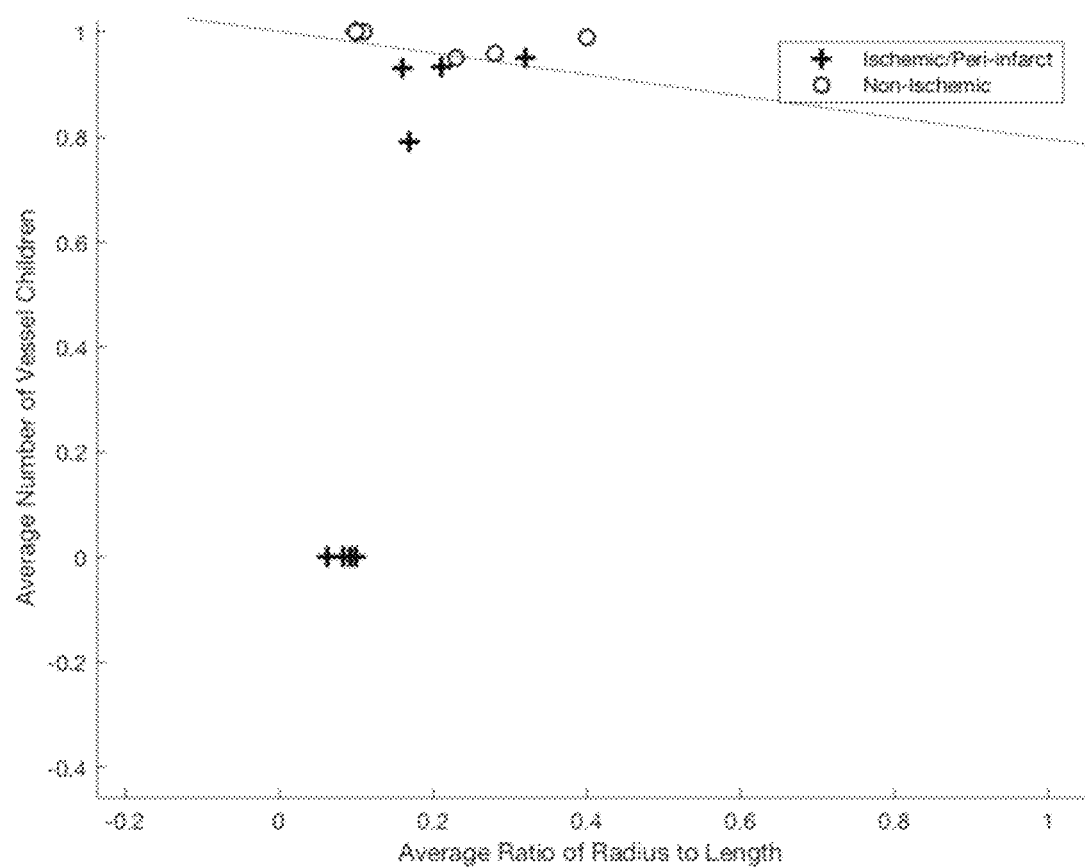
Figure 3D:
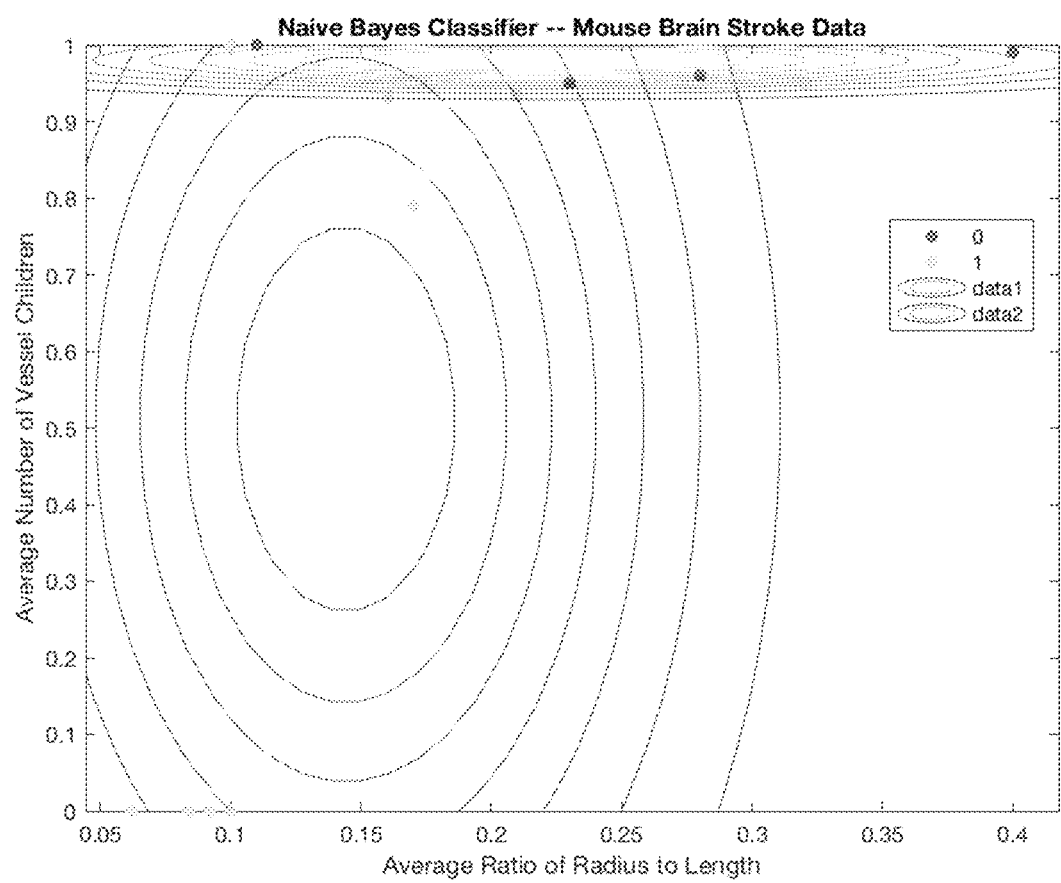
Figure 3E:
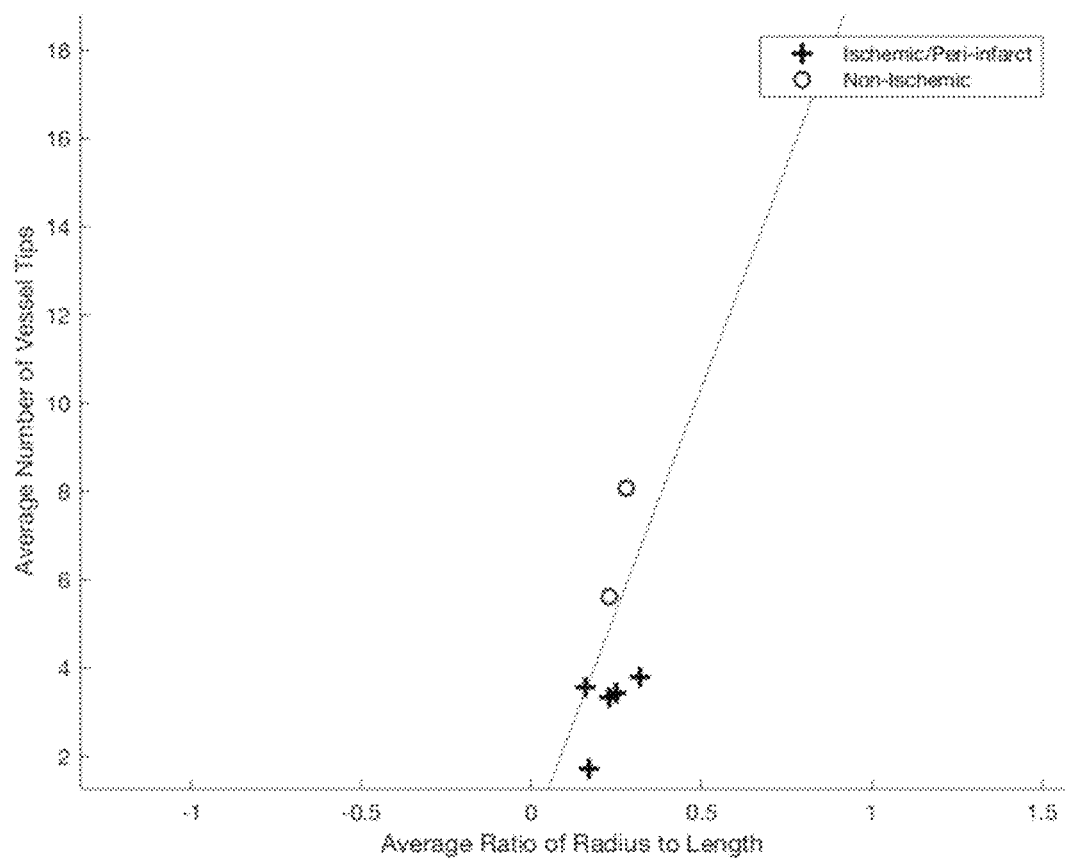
Figure 3F:
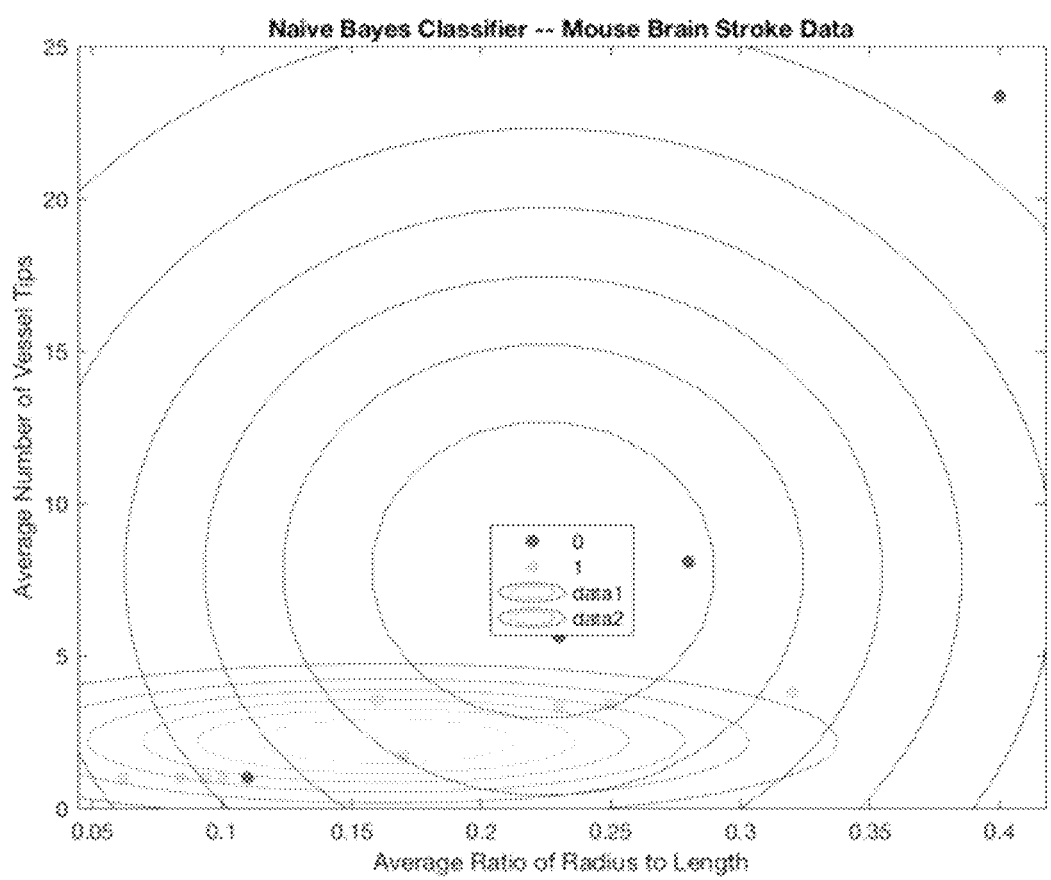
Figure 3G:
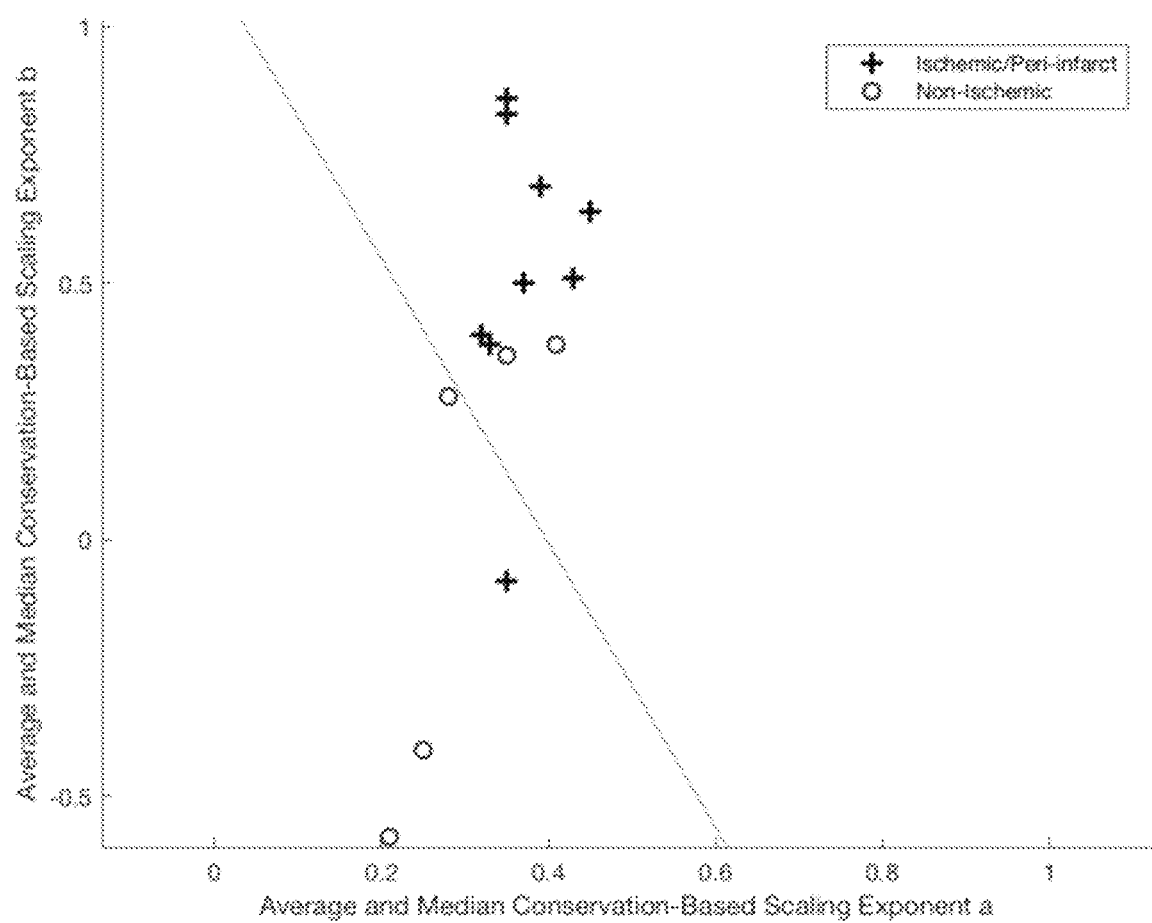
Figure 3H:
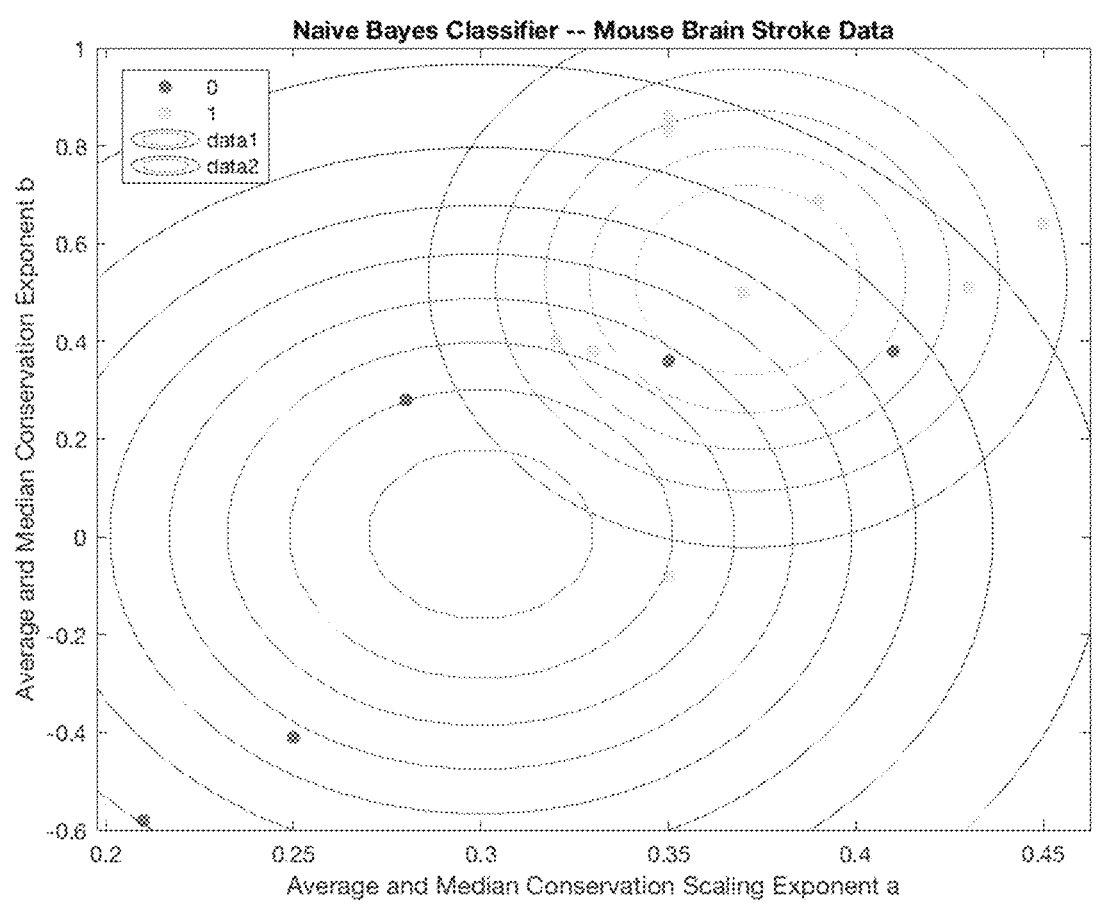
Figure 31:
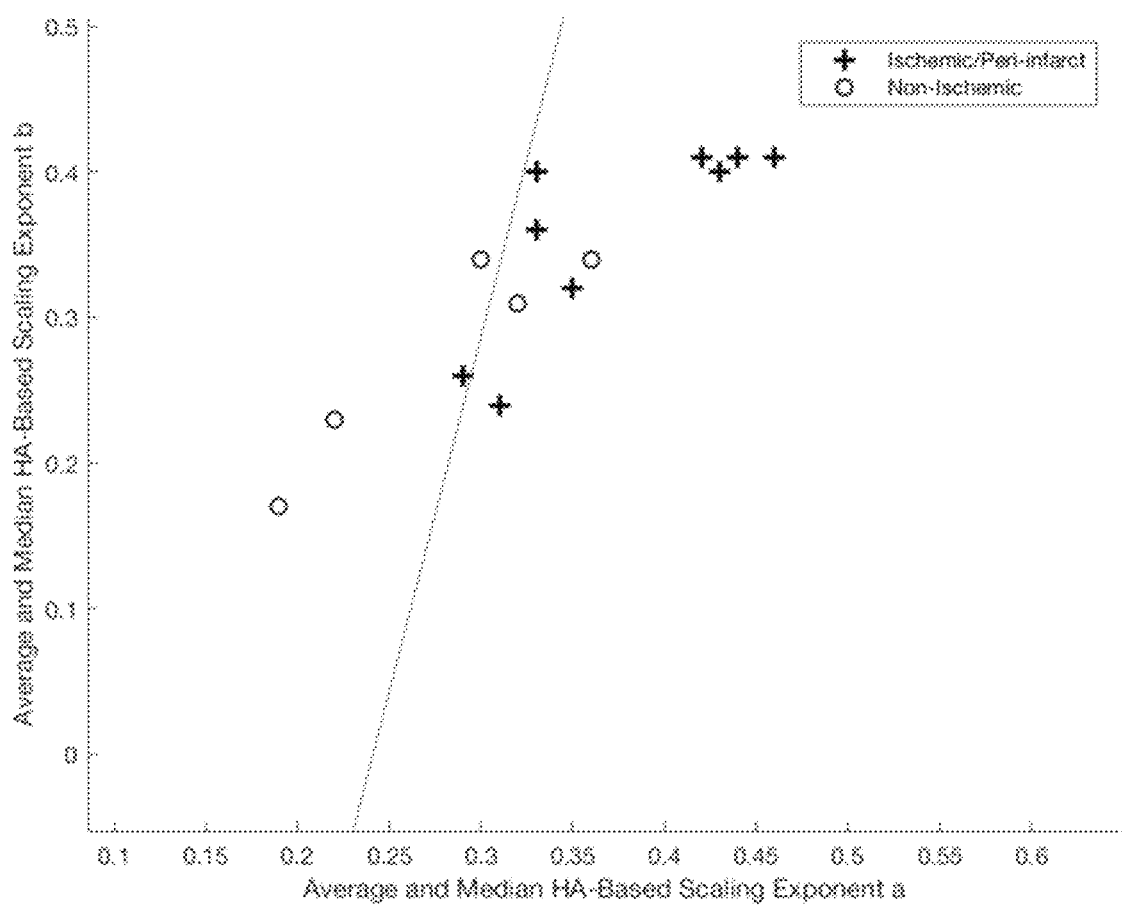
Figure 3J:
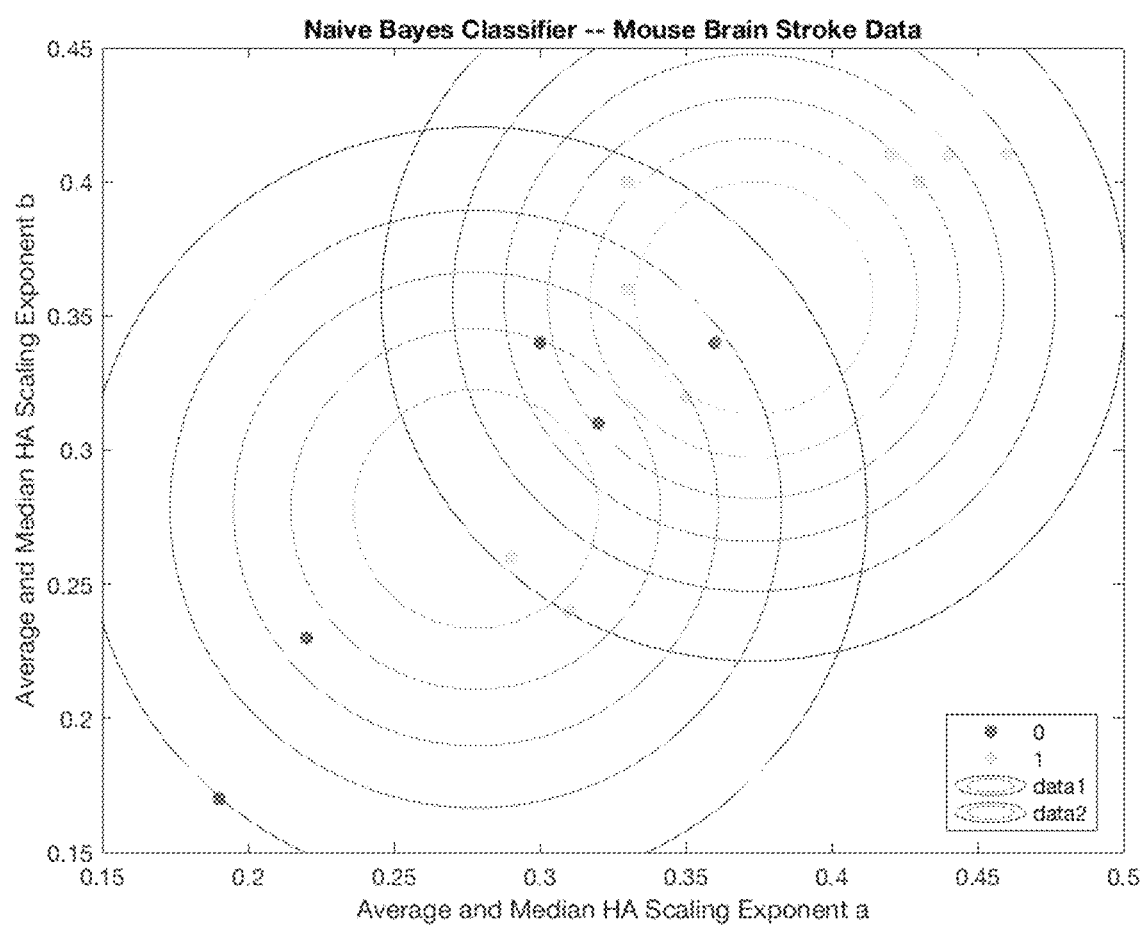
Figure 3K:
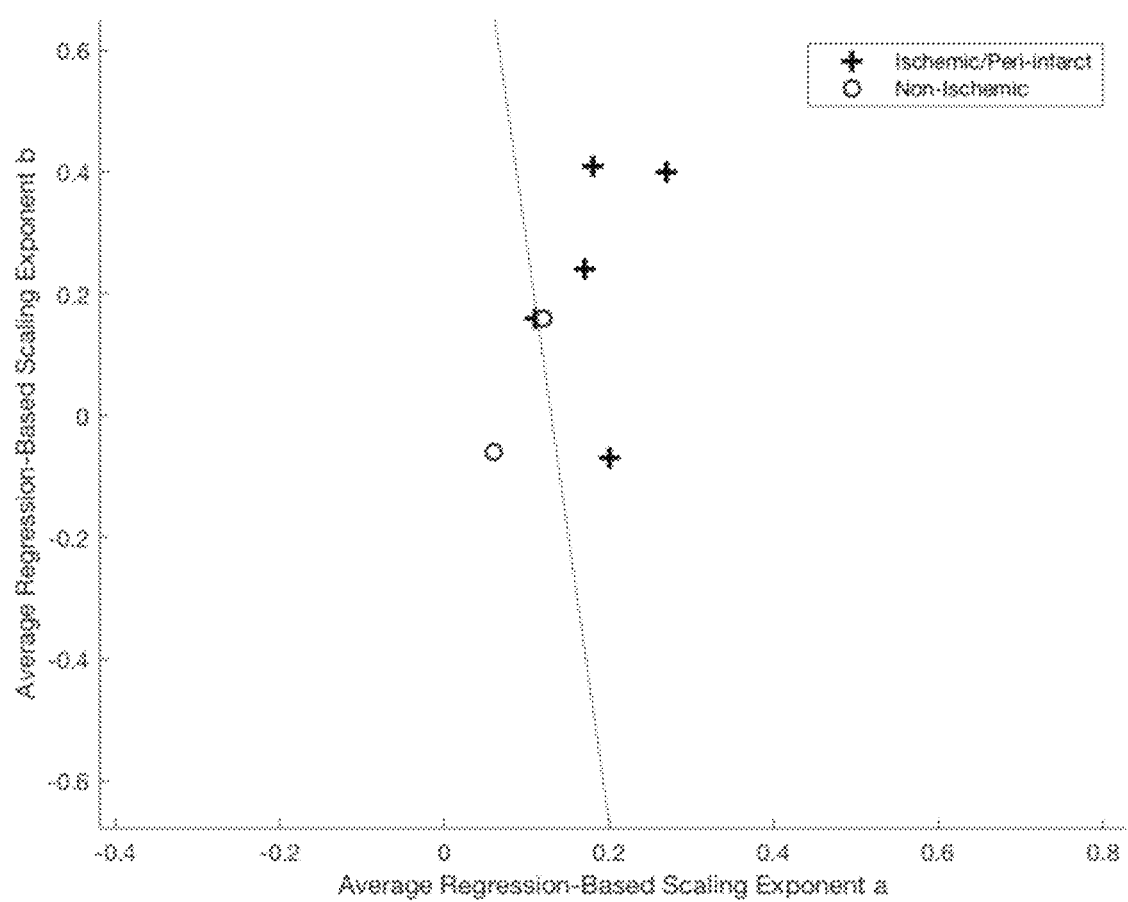
Figure 3L:
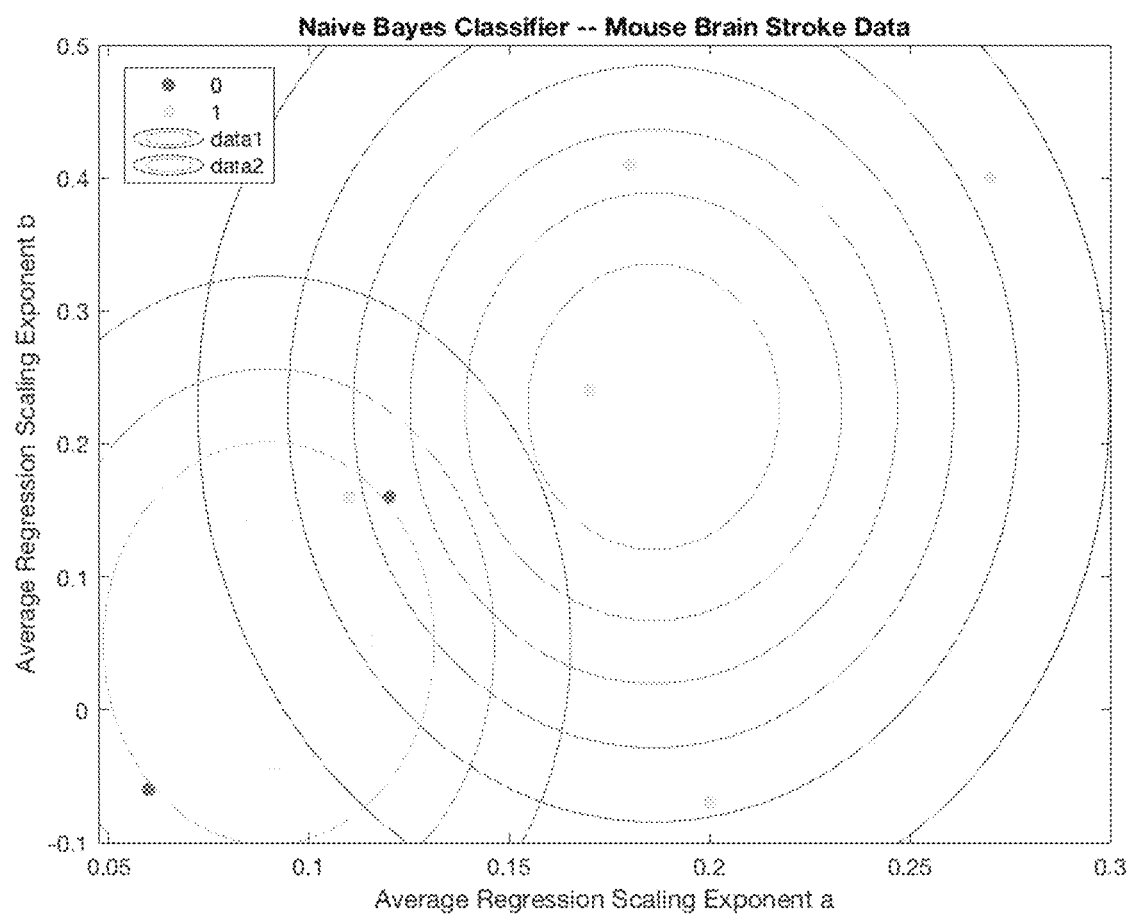

FIG. 2 shows a system 200 for performing a method/process for detecting disease in vasculature. For example, the system 200 may perform the process 100 disclosed in relation to FIG. 1. The system may include a computing device 201. The system may include a network 203 and/or a server 205. The server 205 may have a processor 207 and a memory 209. The different components, such as the computing device 201 and the server 205 may interconnect among each other through the network 203.

The computing device 201 may have one or more software programs 211 loaded on the computing device 201 for performing a method for detecting disease in vasculature. The computing device 201 may download the one or more software programs 211 from the server 205. The computing device 201 includes a processor 213 and a memory 215. The computing device 201 may include a network access device 217 for accessing the network 203. The computing device 201 may include a user interface 219 that receives input from a user, such as a medical practitioner or researcher. However, the computing device 201 may receive input from other kinds of users according to various embodiments.

The one or more software programs 211 may be stored in the memory 215. In other embodiments, the one or more software programs 211 may be located on the server 205 or otherwise available via the network 203. The memory 215 may store instructions to execute on the processor 213 and may include one or more a RAM or other volatile or non-volatile memory. The memory may 215 be a non-transitory memory or a data storage device, such as a hard disk drive, a solid-state disk drive, a hybrid disk drive, or other appropriate data storage, and may further store machine-readable instructions, which may be loaded and executed by the processor 213.

The one or more software programs 211 may include, interface and/or interact with a user interface 219. The user interface 219 may include any device capable of receiving user input, such as a button, a keyboard, a mouse, a dial, a microphone, a graphical user interface or a touch screen, and any device capable of output, e.g., a display, a speaker, or a refreshable braille display. The user interface 219 allows a user to communicate with the one or more software programs 211. For example, the user may be able to provide data to the one or more software programs 211 such as user input, and/or receive feedback from the one or more software programs 211 via the user interface 219.

The network access device 217 may include a communication port or channel, such as one or more of USB port, a Wi-Fi unit, a Bluetooth® unit, a radio frequency identification (RFID) tag or reader, or a cellular network unit for accessing a cellular network (such as 3G or 4G). The network 203, such as Bluetooth Low Energy (BLE) network, a local area network (LAN), a wide area network (WAN), a cellular network, the Internet, or combination thereof, may connect the computing device 201 to the server 205.

The computing device 201 may obtain images of vasculature (see 101 of FIG. 1). The computing device 201 may obtain the images via a user uploading, downloading, or otherwise acquiring the images on the computing device 201. The processor 213 may perform image smoothing and/or denoising on the images (see 103 of FIG. 1). The image smoothing and/or denoising may be performed using the one or more software programs 211 located in the memory 215 of the computing device 201. In other embodiments, the image smoothing and/or denoising may be performed using the one or more software programs 211 located on the server 205 or otherwise available via the network 203. In some embodiments, the image smoothing and/or denoising may be initiated by a user via the user interface 219. In other embodiments, the image smoothing and/or denoising may be initiated automatically by the computing device 201.

The processor 213 may perform image processing on the images (see 105 of FIG. 1). The image processing may be performed using the one or more software programs 211 located in the memory 215 of the computing device 201. In other embodiments, the image processing may be performed using the one or more software programs 211 located on the server 205 or otherwise available via the network 203. In some embodiments, the image processing may be initiated by a user via the user interface 219. In other embodiments, the image processing may be initiated automatically by the computing device 201.

The processor 213 may determine vascular features of the vasculature (see 107 of FIG. 1). The determination of vascular features may be performed using algorithms located in the memory 215 of the computing device 201. In some embodiments, the algorithms may be a part of the one or more software programs 211 located in the memory 215 of the computing device 201. In other embodiments, the determination of vasculature features may be performed using algorithms located on the server 205 or otherwise available via the network 203. In some embodiments, the algorithms may be part of the one or more software programs 211 located on the server 205 or otherwise available via the network 203. In some embodiments, the determination of vasculature features may be initiated by a user via the user interface 219. In other embodiments, the determination of vasculature features may be initiated automatically by the computing device 201.

The processor 213 may select the features of the vasculature (see 109 of FIG. 1). The selection of vasculature features may be performed using algorithms located in the memory 215 of the computing device 201. In some embodiments, the algorithms may be a part of the one or more software programs 211 located in the memory 215 of the computing device 201. In other embodiments, the selection of vasculature features may be performed using algorithms located on the server 205 or otherwise available via the network 203. In some embodiments, the algorithms may be part of the one or more software programs 211 located on the server 205 or otherwise available via the network 203. In some embodiments, the selection of vasculature features may be initiated by a user via the user interface 219. In other embodiments, the selection of vasculature features may be initiated automatically by the computing device 201.

The processor 213 may extract the features from the vasculature (see 111 of FIG. 1). The extraction of the features of the vasculature may be performed using the one or more software programs 211 located in the memory 215 of the computing device 201. In other embodiments, the extraction of the features of the vasculature may be performed using the one or more software programs 211 located on the server 205 or otherwise available via the network 203. In some embodiments, the extraction of the features of the vasculature may be initiated by a user via the user interface 219. In other embodiments, the extraction of the features of the vasculature may be initiated automatically by the computing device 201.

The processor 213 may classify the images of the vasculature (see 113 of FIG. 1). The classification of the images of the vasculature may be performed using algorithms located in the memory 215 of the computing device 201. In some embodiments, the algorithms may be a part of the one or more software programs 211 located in the memory 215 of the computing device 201. In other embodiments, the classification of the images of the vasculature may be performed using algorithms located on the server 205 or otherwise available via the network 203. In some embodiments, the algorithms may be part of the one or more software programs 211 located on the server 205 or otherwise available via the network 203. In some embodiments, the classification of the images of the vasculature may be initiated by a user via the user interface 219. In other embodiments, the classification of the images of the vasculature may be initiated automatically by the computing device 201.

Stroke Data for Invention

Nineteen micro-CT scans of mice brain vasculature were obtained. Eight of the nineteen micro-CT scans were of healthy/non-ischemic vasculature. Eleven of the nineteen micro-CT scans were of vasculature seven days after the onset of induced ischemic stroke (thrombotic stroke). Micro-CT scans from three different mice include imaging of vasculature from the ischemic hemisphere of the brain, from the peri-infarct region of the brain, and from the non-ischemic hemisphere of the brain. FIGS. 14A-14F, 15A-15F, and 16A-16C show sample vasculature images after pre-processing obtained via experiment.

Angicart++ may then be used to extract measurement data from the imaging of the vasculature. More specifically, Angicart++ may be used to extract eight qualitative and quantitative features from the imaging of the vasculature. FIG. 9A shows a finished Angicart++ processing image of non-stroke vasculature obtained via experiment. FIG. 9B shows a finished Angicart++ processing image of peri-infarct stroke obtained via experiment. FIG. 9C shows a finished Angicart++ processing image of stroke vasculature obtained via experiment.

Figure 8A:
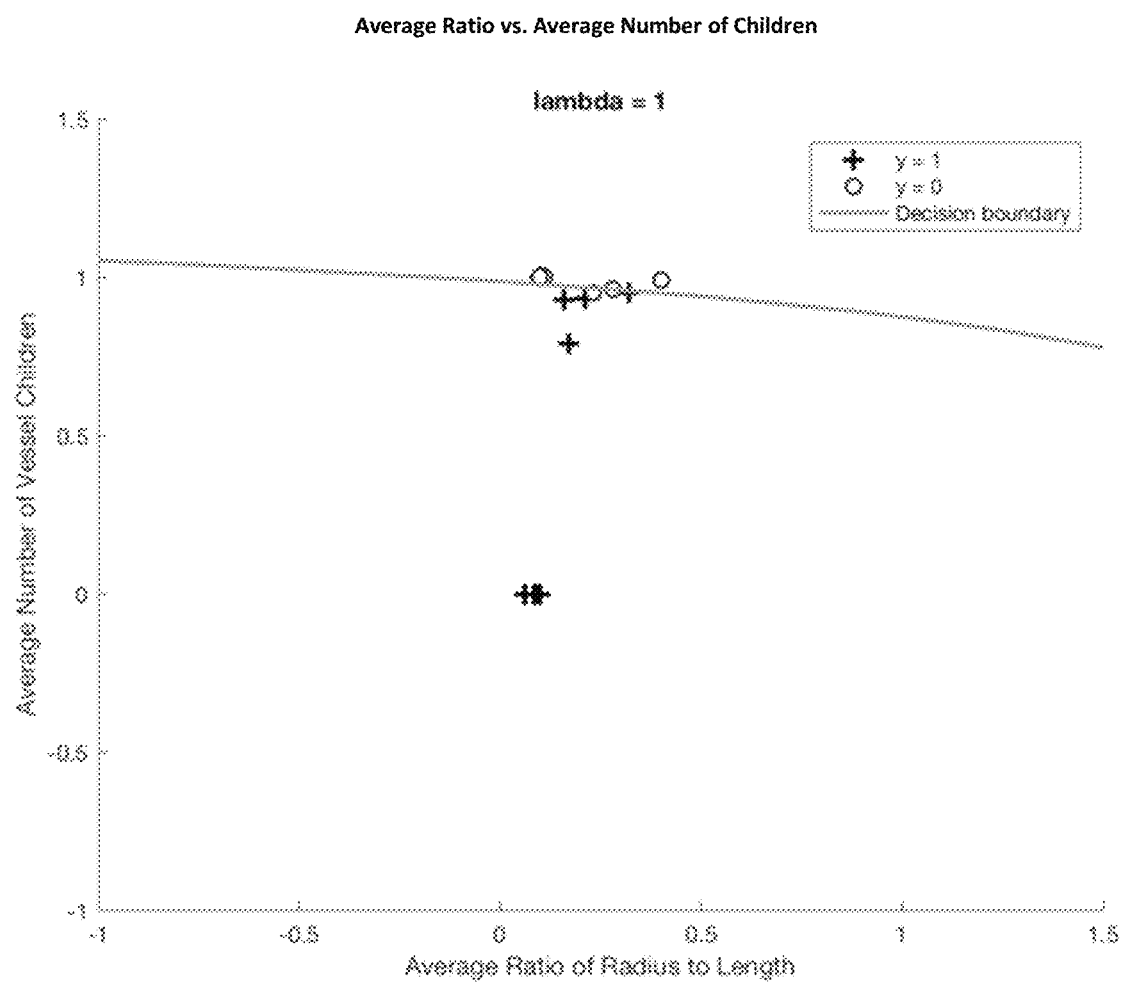
FIG. 8A shows a sample graph in which regularized logistic regression is used to classify several scans of non-stroke and ischemic stroke vasculature based on analysis of the average ratio of vessel radius to length vs. average number of vessel children according to an aspect of the invention.
Figure 8B:
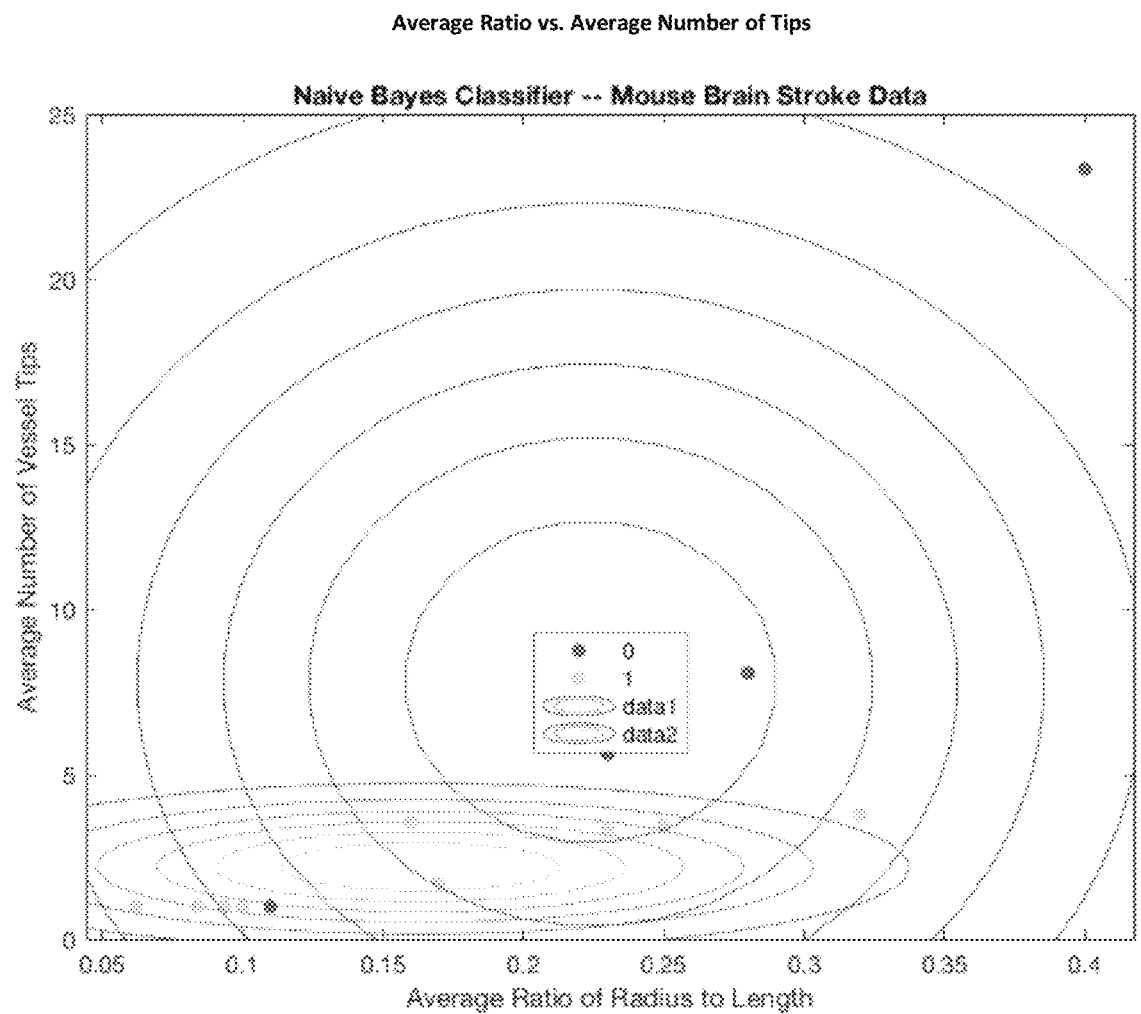
FIG. 8B shows a sample graph in which Naïve Bayes classifier is used to classify several scans of non-stroke and ischemic stroke vasculature based on analysis of the average ratio of vessel radius to length vs. average number of downstream vessel tips according to an aspect of the invention.

For each image, voxel dimensions may be computed and the optimal threshold value may be determined by testing at various thresholds with increments of 0.005. For each vessel within the network, the vessel name, the vessel radius, the vessel length, the vessel volume, the vessel parent, the number of vessel children, and the number of downstream vessel tips may be extracted. FIG. 8A shows a sample graph in which regularized logistic regression is used to classify several scans of non-stroke and ischemic stroke vasculature based on analysis of the average ratio of vessel radius to length vs. average number of vessel children. FIG. 8B shows a sample graph in which Naïve Bayes classifier is used to classify several scans of non-stroke and ischemic stroke vasculature based on analysis of the average ratio of vessel radius to length vs. average number of downstream vessel tips. FIGS. 11A-11E, 12A-12E, and 13A-13C show sample output Angicart++ data files obtained via experiment.

The MATLAB program may automatically compute and graph the scaling exponents, along with additional statistic information such as the mean, median, standard deviation, 95% confidence interval, and non-adjusted $R^2$ value. FIG. 4A shows a sample graph of machine learning results of distribution-based scaling exponents logistic regression. FIG. 4B shows a sample graph of machine learning results of regression-based scaling exponents logistic regression. FIG. 5A shows a sample graph of the distribution of conservation-based calculations of the radial exponent (a) from brain vasculature after the onset of ischemic stroke obtained via experiment. FIG. 6A shows a sample graph of the results of conservation-based calculation of the radial exponent (a) from non-stroke brain vasculature (non-ischemic hemisphere) obtained via experiment. FIG. 10A shows a sample graph of the distribution of conservation-based calculation of the radial exponent (a) from post-stroke vasculature in the peri-infarct region obtained via experiment. FIG. 5B shows a sample graph of distribution of conservation-based calculation of the length scaling exponent (b) from brain vasculature after the onset of ischemic stroke obtained via experiment. FIG. 6B shows a sample graph of the results of conservation-based calculation of the length scaling exponent (b) from non-stroke brain vasculature (non-ischemic hemisphere) obtained via experiment. FIG. 10B shows a sample graph of the distribution of conservation-based calculation of the length scaling exponent (b) from post-stroke vasculature in the peri-infarct obtained via experiment.

FIG. 5C shows a distribution-based calculation of the radial exponent (a) from brain vasculature after the onset of ischemic stroke obtained via experiment. FIG. 6C shows a sample graph of the results of distribution-based calculation of the radial exponent (a) from non-stroke brain vasculature (non-ischemic hemisphere) obtained via experiment. FIG. 10C shows a sample graph of the results of distribution-based calculation of the radial exponent (a) from post-stroke vasculature in the peri-infarct obtained via experiment. FIG. 5D shows a distribution-based calculation of the length scaling exponent (b) from brain vasculature after the onset of ischemic stroke obtained via experiment. FIG. 6D shows a sample graph of the results of distribution-based calculation of the length scaling exponent (b) from non-stroke brain vasculature (non-ischemic hemisphere) obtained via experiment. FIG. 10D shows a sample graph of the results of distribution-based calculation of the length scaling exponent (b) from vasculature in the peri-infarct region of the brain obtained via experiment.

FIG. 5G shows a sample graph of the results of ratio-based calculation of the radial exponent (a) from ischemic stroke obtained via experiment. FIG. 6G shows a sample graph of the results of ratio-based calculation of the radial exponent (a) from non-stroke brain vasculature (non-ischemic hemisphere) obtained via experiment. FIG. 10G shows a distribution of ratio-based calculation of the radial exponent (a) from post-stroke vasculature in the peri-infarct obtained via experiment. FIG. 5H shows a sample graph of the results of ratio-based calculation of the length scaling exponent (b) from ischemic stroke obtained via experiment. FIG. 6H shows a sample graph of the results of ratio-based calculation of the length scaling exponent (b) from non-stroke brain vasculature (non-ischemic hemisphere) obtained via experiment. FIG. 10H shows a distribution of ratio-based calculations of the length scaling exponent (b) from post-stroke vasculature in the peri-infarct region obtained via experiment.

FIG. 5I shows a regression-based calculation of the radial exponent (a) from ischemic stroke obtained via experiment. FIG. 6I shows a regression-based calculation of the radial exponent (a) from non-stroke brain vasculature (non-ischemic hemisphere) obtained via experiment. FIG. 10I shows a regression-based calculation of the radial exponent (a) from post-stroke vasculature in the peri-infarct region obtained via experiment. FIG. 5J shows a regression-based calculation of the length scaling exponent (b) from ischemic stroke obtained via experiment. FIG. 6J shows a regression-based calculation of the length scaling exponent (b) from non-stroke brain vasculature (non-ischemic hemisphere) obtained via experiment. FIG. 10J shows a regression-based calculation of the length scaling exponent (b) from post-stroke vasculature in the peri-infarct region obtained via experiment.

Data sets containing quantitative data such as scaling exponents may be randomly divided into training and testing sets. For example, the data sets may be randomly divided into training sets (64%) and testing sets (36%). The logistic regression and Naïve Bayes Classifier program may be training with the training sets. The programs may then predict the occurrence of stroke from the testing set and the test accuracies may then be recorded. FIGS. 3A-3L show sample graphs of the machine-learning results from this experiment.

Logistic Regression was the most accurate of the two machine learning algorithms tested in detecting the occurrence of ischemic stroke, with an average test accuracy of 74.6%. The Naïve Bayes Classifier had an average test accuracy of 59.7%. This is an important step in improving accurate diagnosis of ischemic stroke, which is correctly diagnosed only 31% of the time using convention methods (Tyan et al., 2014). By informing physicians to treat patents to prevent the onset of future strokes, the disclosure herein can potentially save many lives and significantly reduce medical costs. FIG. 7 shows a table of accuracies of a logistic regression program and a Naïve Bayes Classifier in detecting ischemic stroke from analysis of vasculature.

The limitations of the above-described results include that only nineteen micro-CT scans of vascular imaging were obtained. This led to fewer data points to train the machine learning model. At least a couple hundred images (micro-CT scans) would likely be needed to train and test the machine learning model. Potential sources of error may include image noise processing by Angicart++.

In another embodiment, torsion may be computed to quantify the curviness of the vasculature because stroke recovery vasculature contains loops. In another embodiment, more imaging of stroke recovery vasculature may be obtained, on the order of several hundred images, in order to have more data points to train and test the machine learning model. Additionally, in another embodiment, neural networks may be implemented to improve the machine learning model.

It is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications to or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations of these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

What is claimed is:

1. A method for predicting the presence of cancer or potential stroke by measuring vasculature in tissues suspected of containing cancer or susceptibility to stroke wherein said vasculature is characterized by a pattern of parent vessels and child vessels branching therefrom wherein each said vessel has a length and a radius, the improvement comprising:
    (a) obtaining images of said suspect tissue having sufficient resolution to permit measurements of said vasculature in said suspect tissue;
    (b) computing voxel dimensions of said images;
    (c) extracting vessel measurements from said images, including each vessel's radius, length and the number of said child vessels branching from each said parent vessel;
    (d) determining a starting point and end point of each vessel and calculating a tortuosity value for each vessel by dividing the arclength of each vessel by the straight-line distance between said starting point and said endpoint of each vessel;
    (e) determining the collective capillary density of said images by calculating the total volume of vessels within said images having a diameter less than 10 um divided by the total volume of said images;
    (f) processing data obtained from said images to determine the mean, median, and standard deviation value for the following parameters for each vessel: individual vessel scaling exponents, ratio of vessel surface area to total area, ratio of vessel volume to total volume, vessel branch angle, vessel branching frequency, number of vessel tips, number of vessel children, and vessel fractal dimension;
    (g) recording the results of steps (b) though (f) in a first data set;
    (h) repeating steps (b) though (f) for a data set of images of comparable tissues known to be healthy tissues and recording the results in a second data set; and
    (i) applying artificial intelligence algorithms to compare the results of said first data set with said second data set to make a prediction of whether said cancer or said susceptibility to stroke is present in said suspect tissue.

2. The method of claim 1, wherein said vessel measurements are automatically extracted.

3. The method of claim 1, wherein said vessel measurements are extracted from a plurality of vessels.

4. The method of claim 1, wherein said extracted vessel measurements comprise at least one of vessel name, vessel radius, vessel length, three-dimensional coordinates of a vessel, a number of vessel children, or a number of downstream vessel tips.

5. The method of claim 1, wherein said parameters for each vessel further include at least one of the following: scaling exponents, asymmetric scaling exponents, tortuosity, curvature, microvascular density, vessel diameter, vessel length, vessel volume, vessel surface area, number of branch points, number of vessel loops, hierarchical fractal dimension, Hausdorff dimension, lacunarity dimension, and generalized fractal dimension.

6. The method of claim 1, wherein said artificial intelligence algorithms are applied to train a model based on vascular structure features.

7. The method of claim 6, further comprising applying feature selection to select said vascular structure features that correlate most strongly to diagnosis of the disease.

8. The method of claim 6, further comprising applying feature extraction to select said vascular structure features that correlate most strongly to diagnosis of the disease.

* * * * *